United States Patent [19]

Casad et al.

[11] Patent Number: 4,687,058

[45] Date of Patent: Aug. 18, 1987

[54] SOLVENT ENHANCED FRACTURE-ASSISTED STEAMFLOOD PROCESS

[75] Inventors: Burton M. Casad; Yogendra Soni; Jeff J. Jurinak, all of Ponca City, Okla.

[73] Assignee: Conoco Inc., Ponca City, Okla.

[21] Appl. No.: 866,488

[22] Filed: May 22, 1986

[51] Int. Cl.$^4$ .................. E21B 43/17; E21B 43/24; E21B 43/40

[52] U.S. Cl. .................. 166/263; 166/266; 166/271; 166/272

[58] Field of Search .............. 166/263, 271, 272, 273, 166/274, 303, 266

[56] References Cited

U.S. PATENT DOCUMENTS

| | | |
|---|---|---|
| 2,288,857 | 7/1942 | Subkow . |
| 2,862,558 | 12/1958 | Dixon . |
| 2,897,894 | 8/1959 | Draper et al. . |
| 2,969,226 | 1/1961 | Huntington . |
| 3,221,813 | 12/1965 | Closmann et al. .................. 166/271 |
| 3,280,909 | 10/1966 | Closmann et al. .................. 166/263 |
| 3,342,258 | 9/1967 | Prats . |
| 3,400,762 | 9/1968 | Peacock et al. .................. 166/271 X |
| 3,455,383 | 7/1969 | Prats et al. .................. 166/254 |

(List continued on next page.)

FOREIGN PATENT DOCUMENTS

| | | |
|---|---|---|
| 836325 | 3/1970 | Canada . |
| 1016862 | 9/1977 | Canada . |
| 1025350 | 1/1978 | Canada . |
| 1061713 | 9/1979 | Canada . |
| 1112956 | 5/1968 | United Kingdom . |

OTHER PUBLICATIONS

"The Saner Ranch Pilot Test of Fracture-Assisted Steamflood Technology", by Stang et al., presented at the 59th Annual Technical Conference and Exhibition held at Houston, Tx., on Sep. 16-19, 1984.
Journal of Petroleum Technology, Mar. 1983, pp. 511-522, "The Street Ranch Pilot Test of Fracture-Assisted Steamflood Technology", Britton et al.
Petroleum Society of CIM Paper No. 85-36-4, "Simulation of the Saner Ranch Fracture-Assisted Steamflood Pilot", by Soni et al., presented at the 36th Annual Technical Meeting of Petroleum Society of CIM, Jun. 2-5, 1985.
Paper No. SPE 14223 of Shu et al., "Effect of Solvent on Steam Recovery of Heavy Oil", presented at the 60th Annual Technical Conference and Exhibition of the Society of Petroleum Engineers, Las Vegas, Nev., Sep. 22-25, 1985.
Paper No. SPE 13035, "Commercial Application of Steamflooding in an Oil Field Comprised of Multiple Thin-Sand Reservoirs", by Powers et al.

Primary Examiner—George A. Suchfield
Attorney, Agent, or Firm—A. Joe Reinert

[57] ABSTRACT

The addition of vaporized solvent to injected steam in a fracture-assisted steamflood process provides surprisingly significant enhancement of the process as compared to both the basic fracture-assisted steamflood process of the Britton et al. U.S. Pat. No. 4,265,310 patent and to a conventional matrix drive type steamflood process utilizing solvent. Much lower solvent losses to the formation are observed than are generally provided by conventional matrix drive type steamflood processes utilizing solvent. Dramatically different effects of the addition of heat-scavenging water follow-up after the steam injection phase are observed as compared to a conventional process utilizing solvent. Directly opposite effects are observed from changes in solvent composition as compared to conventional matrix drive type steamflood processes utilizing steam; for the present invention SOR is decreased by going to lighter solvents, whereas with a conventional process, lighter solvents increase the SOR. Furthermore, the solvent enhanced fracture-assisted steamflood process provides significantly lower overall SOR and significantly higher percentages of recovery of original oil in place, as compared to a conventional steamflood process utilizing solvent.

85 Claims, 65 Drawing Figures

U.S. PATENT DOCUMENTS

| | | | |
|---|---|---|---|
| 3,513,914 | 5/1970 | Vogel | 166/271 |
| 3,637,018 | 1/1972 | Kelly et al. | 166/272 |
| 3,800,873 | 4/1974 | Kelly et al. | 166/272 |
| 3,908,762 | 9/1975 | Redford | 166/263 |
| 3,997,004 | 12/1976 | Wu | 166/251 |
| 4,068,716 | 1/1978 | Allen | 166/271 |
| 4,119,149 | 10/1978 | Wu et al. | 166/266 |
| 4,127,170 | 11/1978 | Redford | 166/252 |
| 4,166,503 | 9/1979 | Hall et al. | 166/263 |
| 4,207,945 | 6/1980 | Hall et al. | 166/272 |
| 4,265,310 | 5/1981 | Britton et al. | 166/259 |
| 4,271,905 | 6/1981 | Redford et al. | 166/263 |
| 4,324,291 | 4/1982 | Wong et al. | 166/252 |
| 4,418,752 | 12/1983 | Boyer et al. | 166/267 |
| 4,429,744 | 2/1984 | Cook | 166/263 |
| 4,429,745 | 2/1984 | Cook | 166/263 |
| 4,456,066 | 6/1984 | Shu | 166/272 |
| 4,461,350 | 7/1984 | Hunt, III | 166/272 |
| 4,484,630 | 11/1984 | Chung | 166/263 |
| 4,487,264 | 12/1984 | Hyne et al. | 166/300 |
| 4,503,910 | 3/1985 | Shu | 166/263 |
| 4,503,911 | 3/1985 | Hartman et al. | 166/272 |
| 4,558,740 | 12/1985 | Yellig, Jr. | 166/272 |

(CASE 1)

(CASE 1)

(CASE 2)

STEAM-TO-OIL RATIO, 1% DECANE INJECTION WITH STEAM (CASE 2)

TAR RECOVERY, 1% DECANE INJECTION WITH STEAM (CASE 3)
STEAM-TO-OIL RATIO, 5% DECANE INJECTION WITH STEAM (CASE 3)
TAR RECOVERY, 5% DECANE INJECTION WITH STEAM (CASE 4)
STEAM-TO-OIL RATIO, 10% DECANE INJECTION WITH STEAM (CASE 4)
TAR RECOVERY, 10% DECANE INJECTION WITH STEAM

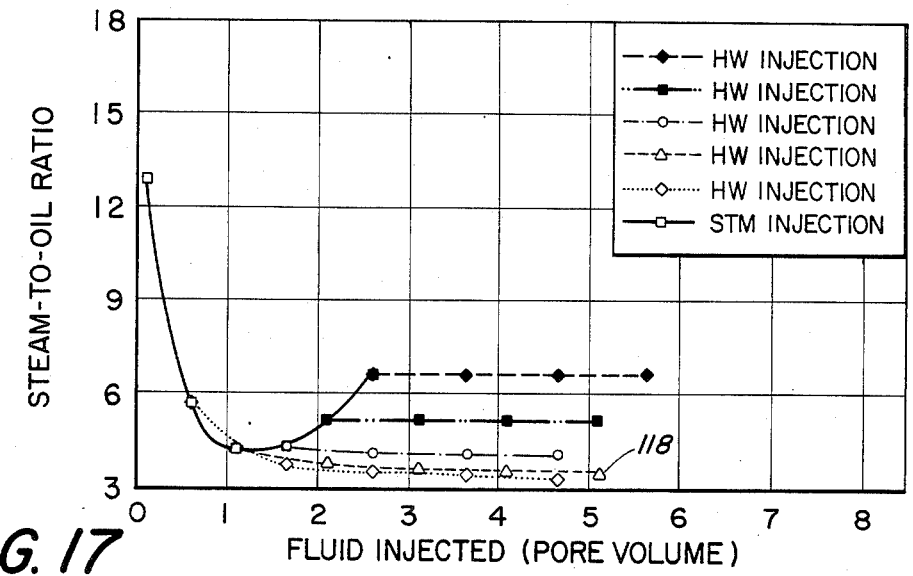
FIG. 17 (CASE 5) STEAM-TO-OIL RATIO, 15% DECANE INJECTION WITH STEAM
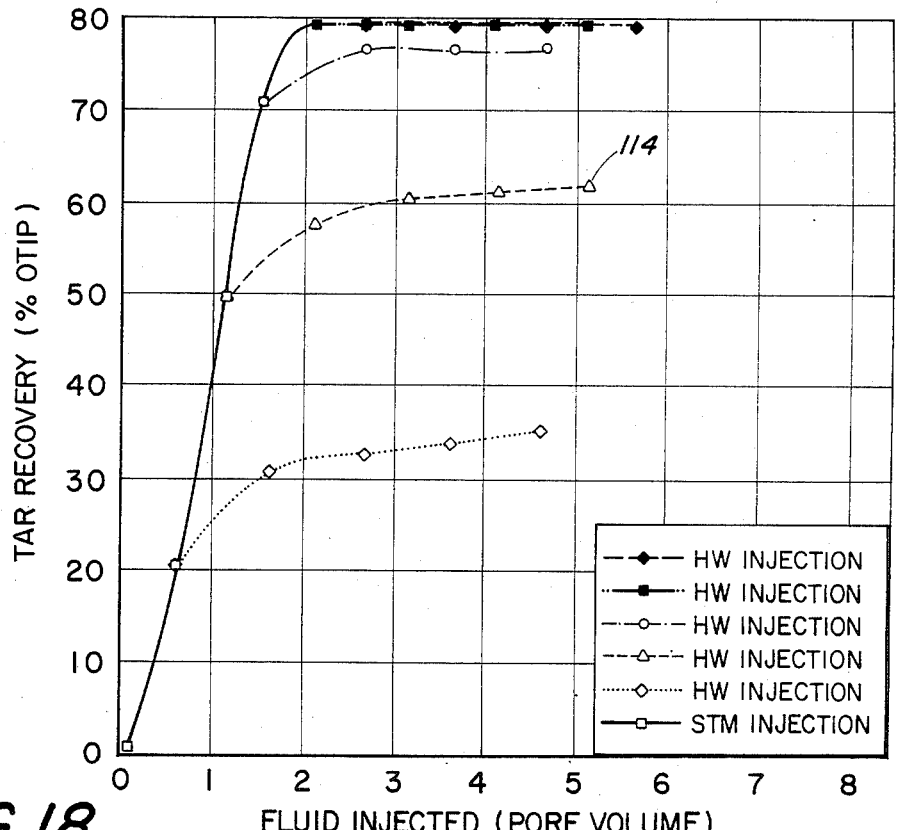
FIG. 18 (CASE 5) TAR RECOVERY, 15% DECANE INJECTION WITH STEAM (CASE 6)

STEAM-TO-OIL RATIO, 6.7% HEXANE INJECTION WITH STEAM (CASE 6)

TAR RECOVERY, 6.7% HEXANE INJECTION WITH STEAM (CASE 7)

STEAM-TO-OIL RATIO, 10% DECANE INJECTED WITH FIRST 0.5 PORE VOLUMN OF STEAM (CASE 7)

TAR RECOVERY, 10% DECANE INJECTED WITH FIRST 0.5 PORE VOLUMN OF STEAM (CASE 8)
STEAM-TO-OIL RATIO, STEAM/SOLVENT INJECTION IN FRAC ONLY (CASE 8)
TAR RECOVERY, STEAM/SOLVENT INJECTION IN FRAC ONLY

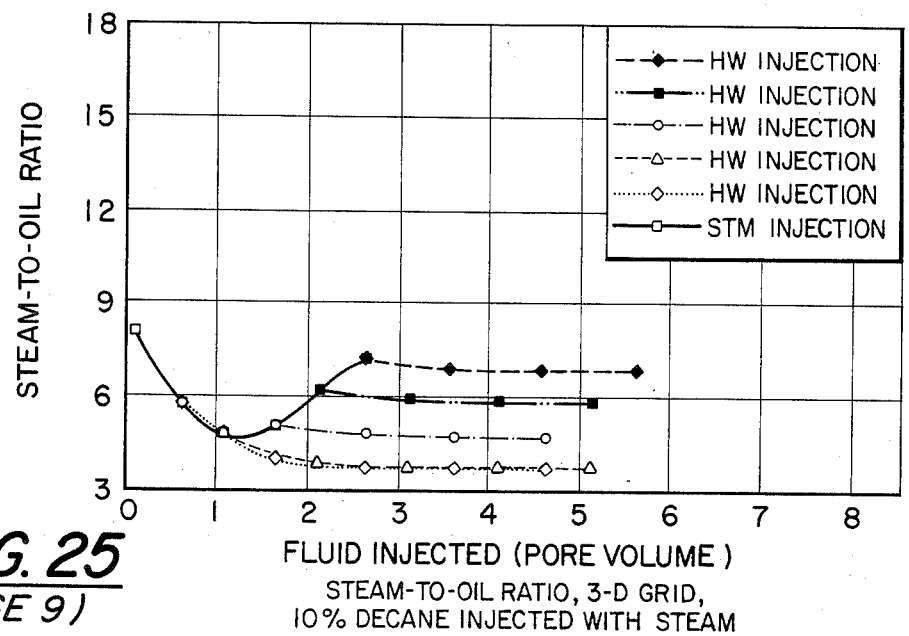
FIG. 25 (CASE 9)
STEAM-TO-OIL RATIO, 3-D GRID,
10% DECANE INJECTED WITH STEAM
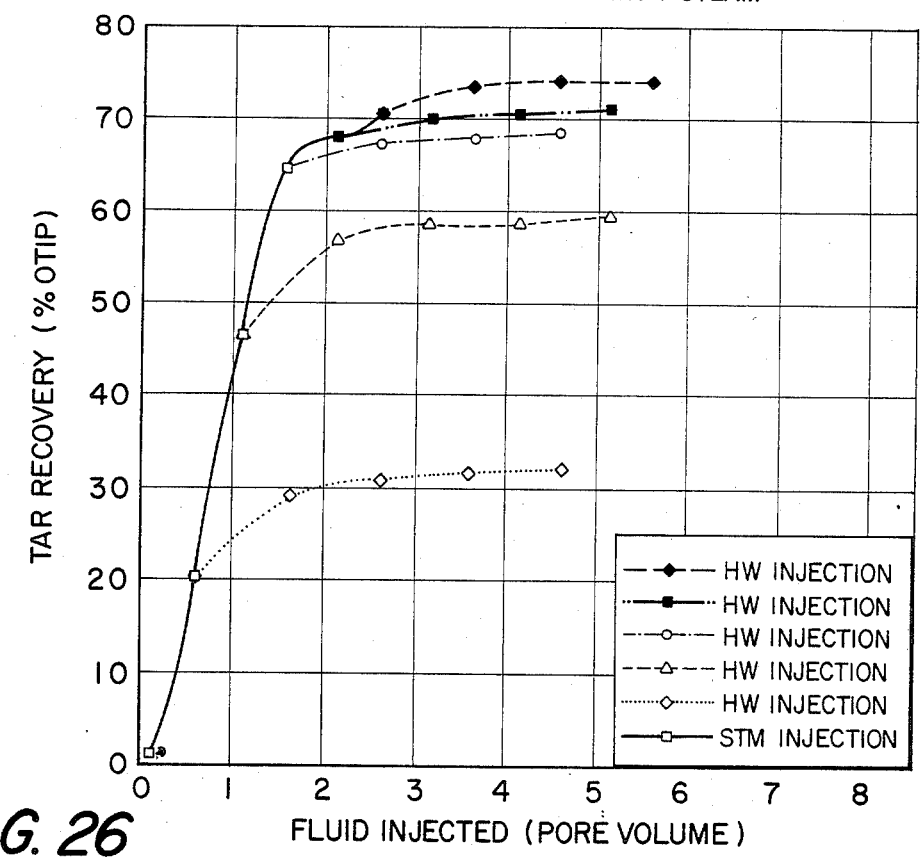
FIG. 26 (CASE 9)
TAR RECOVERY, 3-D GRID,
10% DECANE INJECTED WITH STEAM (CASE 10)

STEAM-TO-OIL RATIO, 3-D GRID,
15% DECANE INJECTED WITH STEAM (CASE 10)

TAR RECOVERY, 3-D GRID,
15% DECANE INJECTED WITH STEAM

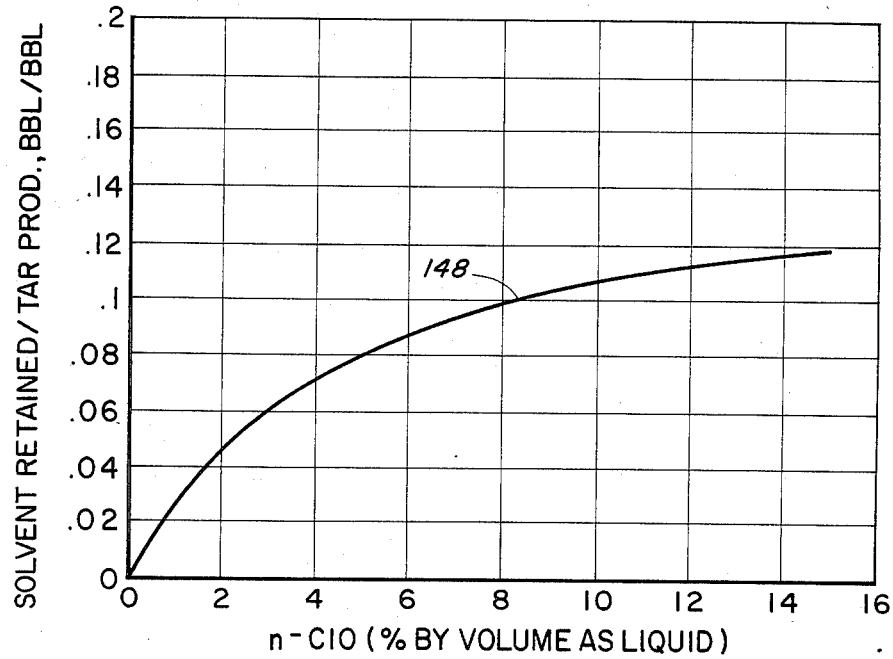
FIG. 31 (SOLVENT RETENTION IN THE RESERVOIR AS A FUNCTION OF SOLVENT INJECTION CONCENTRATION – FRACTURE ASSISTED PROCESS)
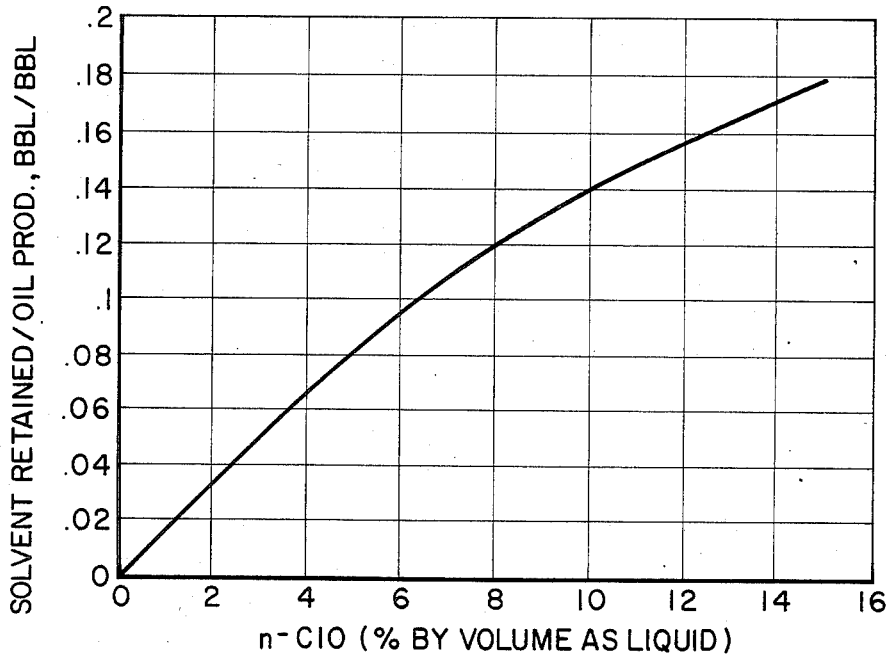
FIG. 32 (SOLVENT RETENTION IN THE RESERVOIR AS A FUNCTION OF SOLVENT INJECTION CONCENTRATION – CONVENTIONAL PROCESS)

(TWO PHASE GAS-OIL RELATIVE PERMEABILITY)

(THREE PHASE OIL RELATIVE PERMEABILITY)

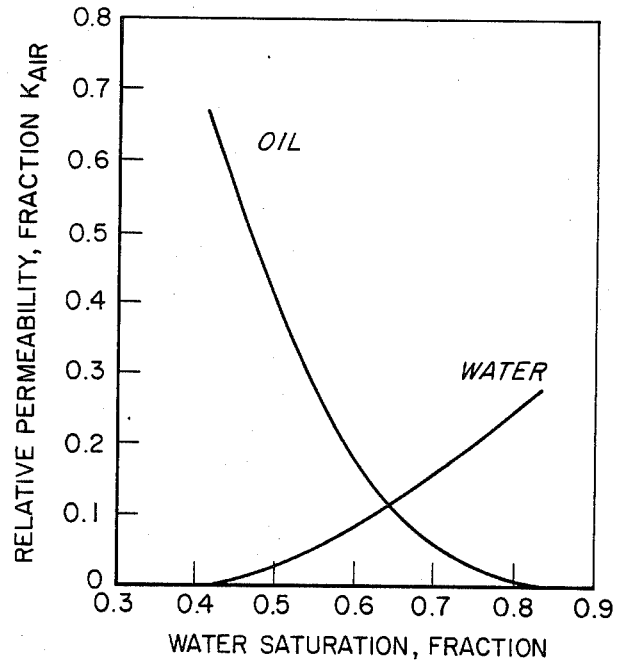
FIG. 37 (CAT CANYON OIL-WATER RELATIVE PERMEABILITY)
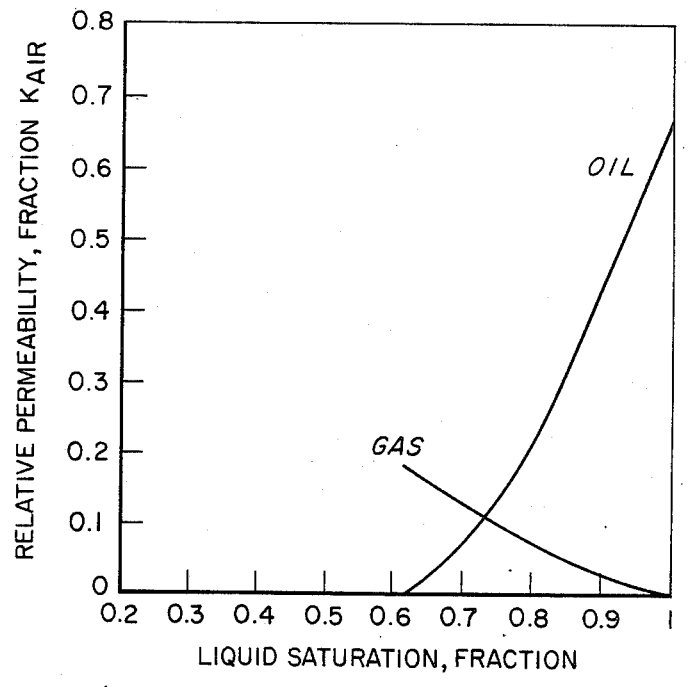
FIG. 38 (CAT CANYON GAS-OIL RELATIVE PERMEABILITY)

(CASE II - CONVENTIONAL PROCESS)

(CASE II - CONVENTIONAL PROCESS)

(CASE 12 - CONVENTIONAL PROCESS)

(CASE 12 - CONVENTIONAL PROCESS)

(CASE 12 - CONVENTIONAL PROCESS)

(CASE 12 - CONVENTIONAL PROCESS)

(CASE 13-CONVENTIONAL PROCESS)

(CASE 13-CONVENTIONAL PROCESS)

(CASE 14 - CONVENTIONAL PROCESS)

(CASE 14 - CONVENTIONAL PROCESS)

(CASE 14 - CONVENTIONAL PROCESS)

(CONVENTIONAL PROCESS)

(CONVENTIONAL PROCESS)

(CONVENTIONAL PROCESS)

*(CASE 15 - CONVENTIONAL PROCESS)*

*(CASE 15 - CONVENTIONAL PROCESS)*

(CASE 15 - CONVENTIONAL PROCESS)

(CASE 16 - CONVENTIONAL PROCESS)

(CASE 16 - CONVENTIONAL PROCESS)

(CASE 16 - CONVENTIONAL PROCESS)

*(CONVENTIONAL PROCESS)*

*(CONVENTIONAL PROCESS)*

(CONVENTIONAL PROCESS)

SOLVENT ENHANCED FRACTURE-ASSISTED STEAMFLOOD PROCESS

BACKGROUND OF THE INVENTION

1. Field of the Invention

The invention relates to the recovery of heavy oil deposits, and particularly relates to improvements in fracture-assisted steamflood technology.

2. Brief Description of the Prior Art

There are many subterranean formations containing heavy oil deposits throughout the world from which the oil cannot be recovered by conventional means because of the high viscosity of the heavy oil deposits.

One technique which has been developed for recovering this heavy oil involves steamflooding through a generally horizontal hydraulically induced fracture network. The assignee of the present invention has recently developed such a fracture-assisted steamflood technology as is disclosed in detail in U.S. Pat. No. 4,265,310 to Britton et al., the details of which are incorporated herein by reference.

The fracture-assisted steamflood technology disclosed in the Britton et al. '310 patent consists of four distinct phases. Those phases are producer stimulation, preheat, matrix steam injection, and the heat-scavenging phase.

In the producer stimulation phase, the production wells are notched and horizontally fractured. Steam is injected through the notch at high rate and then, after perforation of the producers, over the entire reservoir interval.

The preheat phase is initiated by fracturing the central injection well and injecting steam at a rate and pressure sufficiently high to keep the horizontal fracture parted. Heavy oil production begins in this phase.

Once a heated link is established between the injection and production wells, the injector is perforated over the entire reservoir interval and steam is injected at a reduced rate during the matrix steam injection phase.

After a predetermined steam slug is injected, warm water is injected to recover heat and mobile heavy oil from the reservoir in the heat-scavenging phase.

The assignee of the present invention has performed two field pilot tests of the basic Britton et al. '310 process, and the results of those tests have been published in Society of Petroleum Engineers of AIME Paper No. SPE 13036, titled "The Saner Ranch Pilot Test Of Fracture-Assisted Steamflood Technology", by Stang et al., presented at the 59th Annual Technical Conference and Exhibition held at Houston, Tex., on Sept. 16-19, 1984, and in *Journal of Petroleum Technology*, March 1983, page 511-522, "The Street Ranch Pilot Test Of Fracture-Assisted Steamflood Technology" by Britton et al.

Although the two pilot tests described in the two above-referenced articles have shown the process of the Britton et al. '310 patent to be technically a success, it is recognized that it is important to improve as much as possible upon the efficiency of that process in order to make it economically successful.

SUMMARY OF THE INVENTION

The present invention provides an improvement upon the basic fracture-assisted steamflood technology disclosed in the Britton et al. '310 patent. By means of the present invention, the basic process is enhanced through the addition of a relatively small portion of a volatile solvent with the steam that is injected into the injection well.

It has been determined that the injection of relatively small amounts of relatively light solvents with steam in the fracture-assisted steamflood process developed by the assignee of the present invention provides dramatically different and unexpected results as compared to the injection of solvent with steam in typical prior art matrix drive type steamflood processes.

It is believed that this great enhancement of the efficiency of the steamflood process occurs because of the different manner in which the vaporized solvent is distributed into the formation and the different manner in which heavy oil and condensed solvent are produced from the formation by the fracture-assisted steamflood process as compared to conventional matrix type steamflooding.

One very significant improvement of the solvent enhanced fracture-assisted steamflood process of the present invention as compared to a typical prior art matrix drive type steamflood process utilizing solvent, is that there is a significantly lower solvent retention in the formation with the process of the present invention. This is believed to be due to the different mechanism by which solvent is transported into and produced from the formation in the process of the present invention. This lower solvent retention dramatically improves the economic feasibility of solvent injection as compared to prior art processes which have utilized solvent.

Another dramatic difference between the solvent enhanced fracture-assisted steamflood process of the present invention and a typical prior art matrix drive type process utilizing solvent is that with the present invention a very substantial additional oil recovery at negligible cost can be achieved by following the steam injection phase with a heat scavenging water phase. Also, much additional solvent is recovered from the formation during this heat scavenging phase. By contrast, a typical prior art matrix drive type steamflood process utilizing solvent is relatively unaffected by the use of heat scavenging water.

Another dramatically different aspect of the solvent enhanced fracture-assisted steamflood process of the present invention as compared to a typical prior art matrix drive steamflood process utilizing solvent, is that with the present invention, the process is enhanced by going to lighter solvents, whereas with a prior art matrix drive type steam injection process, the better results are achieved by going to heavier solvents. One very significant aspect of this difference is that solvent retention by the formation dramatically increases as heavier solvents are injected, thus optimum performance of the process of the present invention can be achieved with light solvents and with correspondingly low solvent retention in the formation, whereas with prior art processes optimum recoveries may have to be sacrificed due to economically unacceptable levels of solvent loss to the formation. The desirability of the present invention in this regard is further enhanced by the previously mentioned fact that solvent retention by the formation is generally lower with the present invention even as compared to a prior art process utilizing the same solvent.

Another advantage of the present invention is that it achieves substantially lower steam-to-oil ratios than does a typical prior art matrix drive type steamflood process utilizing solvent.

Furthermore, the process of the present invention provides significantly higher percentages of recovery of the original heavy oil in place in a formation than does a typical prior art matrix drive type steamflood process utilizing solvent.

Thus, the solvent enhanced fracture-assisted steamflood process of the present invention provides dramatically enhanced results as compared to either the basic fracture-assisted steamflood process without solvent, or to a typical prior art matrix drive type steamflood process utilizing solvent.

The enhancement which has been achieved by the particular solvent enhanced fracture-assisted steamflood process of the present invention is dramatically different both in kind and in degree than would have been suggested by prior art results utilizing solvent in a conventional matrix drive type steamflood process.

The following disclosure provides detailed numerical simulations of both the solvent enhanced fracture-assisted steamflood process of the present invention and a typical prior art matrix drive type steamflood process utilizing solvent. A comparison of these extensive numerical analyses shows the dramatically different and unexpected results outlined above.

Numerous other objects, features and advantages of the present invention will be readily apparent to those skilled in the art upon a reading of the following disclosure when taken in conjunction with the accompanying drawings.

BRIEF DESCRIPTION OF THE DRAWINGS

FIGS. 9 through 29 are graphical representations of the results of various numerical simulations of the solvent enhanced fracture-assisted steamflood process of the present invention.

FIGS. 9 and 10 graphically illustrate the steam-to-oil ratio (SOR) and the percentage of oil recovery, respectively, as a function of the volumes of injected steam and of heat-scavenging water for a base Case 1 where no solvent was included with the injected steam.

FIGS. 11 and 12 graphically display SOR and percentage of oil recovery, respectively, for Case 2 where 1% decane was injected with steam. The percentages of solvent set forth in FIGS. 11 and 12, and throughout this specification, are expressed in terms of liquid equivalents and by volume.

FIGS. 13 and 14 graphically display SOR and percentage of oil recovery, respectively, for Case 3 where 5% decane was injected with steam.

FIGS. 15 and 16 graphically display SOR and percentage of oil recovery, respectively, for Case 4 where 10% decane was injected with steam.

FIGS. 17 and 18 graphically display SOR and percentage of oil recovery, respectively, for Case 5 where 15% decane was injected with the steam.

FIGS. 19 and 20 graphically display SOR and percentage of oil recovery, respectively, for Case 6 where 6.7% hexane was injected with steam.

FIGS. 21 and 22 graphically display SOR and percentage of oil recovery, respectively, for Case 7 where 10% decane was injected with the first 0.5 pore volumes of steam to determine the effect of non-continuous solvent injection.

FIGS. 23 and 24 graphically display SOR and percentage of oil recovery, respectively, for Case 8 where 10% decane was injected with steam only through the parted fracture system to determine the significance of perforating the injection well prior to steam and solvent injection.

FIGS. 25 and 26 graphically display SOR and percentage of oil recovery, respectively, for Case 9 where 10% decane was injected with steam and the numerical modeling was done on a three-dimensional basis using a three-dimensional numerical grid.

FIGS. 27 and 28 graphically display SOR and percentage of oil recovery, respectively, for Case 10 where 15% decane was injected with steam and the numerical modeling was done on a three-dimensional basis using a three-dimensional numerical grid.

FIG. 29 summarizes the data from FIGS. 9–18 by graphically displaying SOR as a function of percentage of solvent injected with a series of four curves representing different levels of recovery of original oil in place.

FIG. 31 graphically illustrates the amount of solvent lost to the formation during the solvent enhanced fracture-assisted steamflood process of the present invention. On the vertical axis solvent lost is displayed as a portion of the volume of oil produced, and that data is displayed as a function of the concentration of solvent injected which is displayed on the horizontal axis.

FIG. 32 graphically illustrates in a manner similar to FIG. 31 the amount of solvent lost to the formation during a conventional matrix drive type steamflood process utilizing solvent.

FIG. 37 is a graphic illustration of the oil-water relative permeabilities for the formation upon which the numerical modeling for the conventional matrix drive type steamflood process was based.

FIG. 38 is a graphical representation of the gas-oil relative permeabilities for the formation upon which the numerical modeling for the conventional matrix drive type steamflood process was based.

FIGS. 43 and 44 graphically display SOR and percentage of oil recovery, respectively, for Case 11 where steam only was injected in the conventional matrix drive type steamflood process.

FIGS. 45, 46 and 47 graphically display SOR, percentage of oil recovery, and solvent recovery factor, respectively, for Case 12 where five percent decane was injected with steam in a conventional matrix drive type steamflood process.

FIGS. 48, 49 and 50 graphically display SOR, percentage of oil recovery, and solvent recovery factor, respectively, for Case 13 where ten percent decane was injected with steam in a conventional matrix drive type steamflood process.

FIGS. 51, 52 and 53 graphically display SOR, percentage of oil recovery, and solvent recovery factor, respectively, for Case 14 where fifteen percent decane was injected with steam in a conventional matrix drive type steamflood process.

FIG. 54 graphically displays the effect of solvent concentration on the SOR for a conventional matrix drive type steamflood process utilizing solvent.

FIG. 55 graphically displays the effect of solvent concentration upon the percentage of oil recovery for a conventional matrix drive type steamflood process utilizing solvent.

FIG. 56 graphically displays the effect of solvent concentration upon the solvent recovery factor for a conventional matrix drive type steamflood process utilizing steam.

FIGS. 57, 58 and 59 graphically display SOR, percentage of oil recovery, and solvent recovery factor, respectively, for Case 15 where ten percent hexane was injected with steam in a conventional matrix drive type steamflood process utilizing solvent.

FIGS. 60, 61 and 62 graphically display SOR, percentage of oil recovery, and solvent recovery factor, respectively, for Case 16 where ten percent tetradecane was injected with steam in a conventional matrix drive type steamflood process utilizing solvent.

FIG. 63 graphically displays the effect of solvent composition upon SOR for a conventional matrix drive type steamflood process utilizing solvent.

FIG. 64 graphically displays the effect of solvent composition upon the percentage of oil recovery for a conventional matrix drive type steamflood process utilizing solvent.

FIG. 65 graphically displays the effect of solvent composition upon the solvent recovery factor for a conventional matrix drive type steamflood process utilizing solvent.

DETAILED DESCRIPTION OF THE PREFERRED EMBODIMENT

FIGS. 1-4 illustrate sequential stages of one presently preferred embodiment of the invention as described above in the "Brief Description Of The Drawings".

Figure 1:
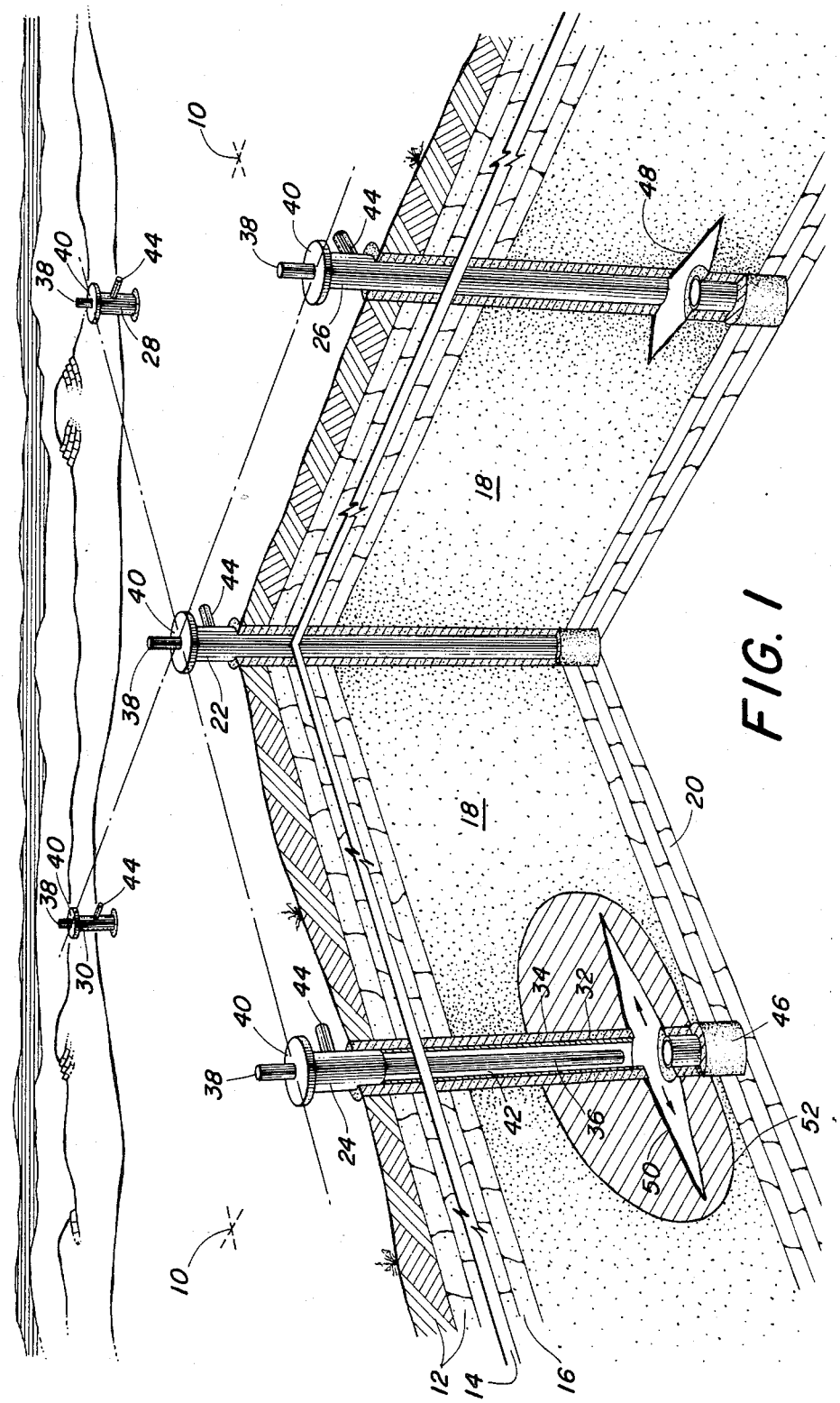
FIG. 1 illustrates in semi-schematic fashion, a cut-away section of a subsurface formation containing heavy oil deposits in which a presently preferred mode of the invention is underway, employing an inverted five-spot well configuration at a point in time following hydraulic fracturing and steam stimulation of the left foreground well and notching in preparation for hydraulic fracturing of the right foreground well of the five-spot formation. It is noted that all of the production wells may be stimulated simultaneously.

Referring to FIG. 1, terrain 10 comprising overburden 12 shown with breakline 14 and overburden 16 lie over a subsurface formation 18 which is underlain by stratum 20.

A five-spot pattern of well bores including a central injection well 22 and four outlying producing wells 24, 26, 28 and 30 penetrate the formation 18.

It is noted that although FIGS. 1-4 illustrate the process of the present invention in the context of a five-spot pattern, the invention is equally applicable to any other well pattern, such as for example a seven-spot or a nine-spot pattern. The numerical modeling discussed below was based upon a seven-spot pattern, but the results of that modeling are equally representative of the results which would be achieved with other patterns such as the five-spot pattern of FIGS. 1-4.

Each of the wells is constructed from a casing 32 cemented to the formation 18 by cement 34 and having a tubing 36 communicating to external facilities via outlet 38 through well head 40. An annulus 42 between the tubing 36 and casing 32 communicates to external facilities through outlet 44. The wells are set through the formation 18 into the underlying stratum 20 by cement 46.

Each of the outlying wells such as 24 and 26 is first notched, as indicated at 48 in FIG. 1 regarding well 26, by rotating a hydraulic cutting tool to form the notch 48 as is described in greater detail in U.S. Pat. No. 4,265,310 to Britton, et al., which is incorporated herein by reference.

Subsequent to notching, each of the outlying production wells is hydraulically fractured by conventional means to create a generally horizontally outward extending fracture such as the fracture 50 indicated in FIG. 1 with regard to well 24.

Subsequent to fracturing, each of the outlying production wells is stimulated by injecting steam into the production well to part the fracture 50 and impart heat to it.

If sufficient equipment and materials are available, all of the producing wells 24, 26, 28 and 30 may be stimulated simultaneously.

In FIG. 1, a zone 52 of the formation 18 represents the portion of formation 18 which is heated by this stimulation step. Zone 52 may generally be referred to as a preheated zone 52 surrounding production well 24.

The steam injected into well 24 during this stimulation step may more generally be referred to as a hot aqueous fluid at a temperature above 100° C.

Figure 2:
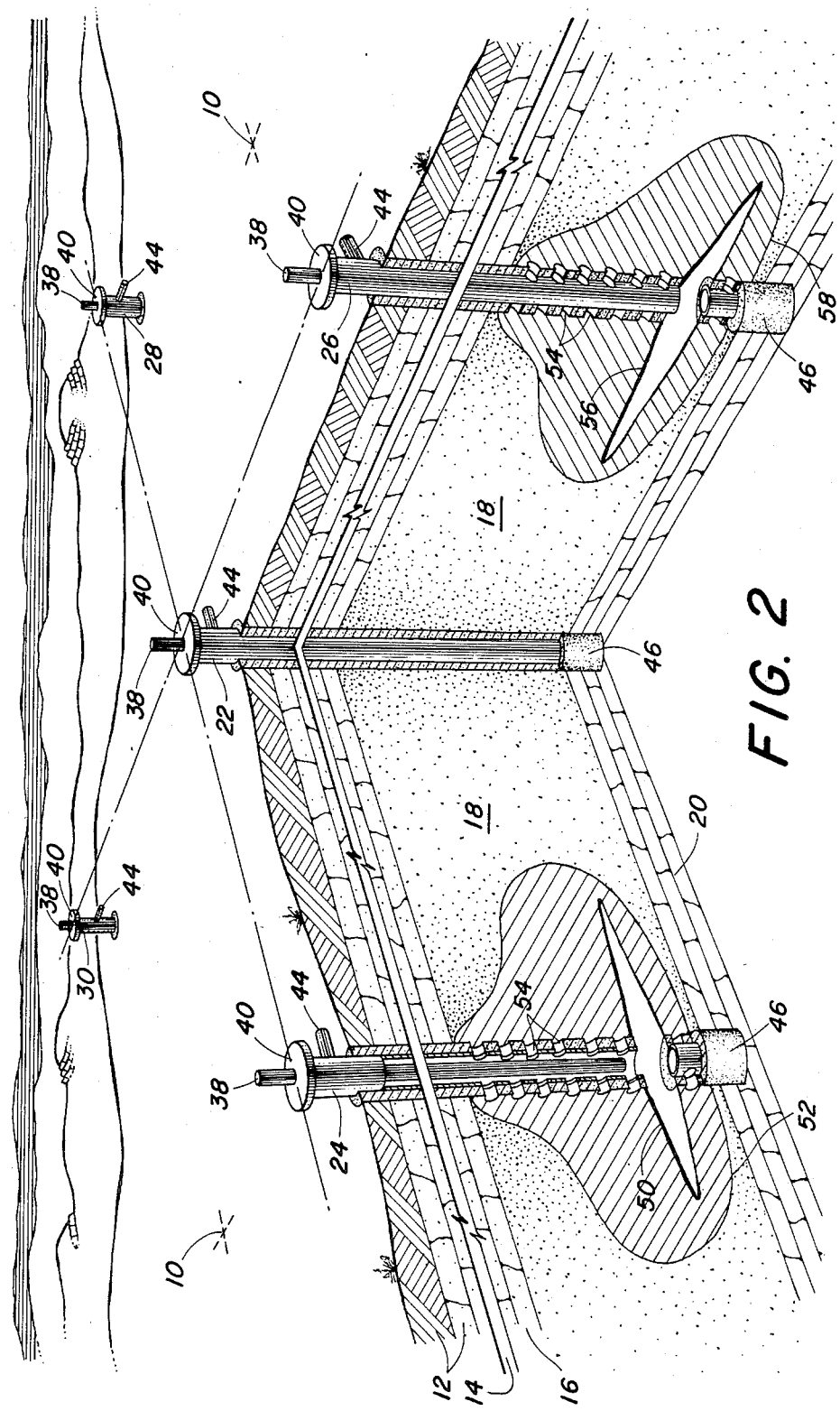
FIG. 2 illustrates in semi-schematic cut-away cross section the process at a period in time following fracturing and steam stimulation of both of the outlying wells shown in the cross section.

As a further part of the stimulation of outlying production wells such as the wells 24 and 26, those production wells are perforated as indicated by perforations 54, along a substantial portion of the entire interval of subsurface formation 18. As illustrated in FIG. 2, the perforations 54 may extend over the entire interval of formation 18. If the formation 18 is very thick, for example 80 to 90 feet thick, it may be preferable to perforate only a substantial sub-interval of formation 18 adjacent the fracture 50.

Subsequent to the perforation of the production wells, steam is injected both into the fractures 50 and 56 of wells 24 and 26, respectively, and through the perforations 54 so that the zone 52 which is heated around production well 24 and a similar zone 58 which has been heated around production well 26 are created, as illustrated in FIG. 2.

It should be noted that the production wells may be notched, fractured and perforated prior to beginning steam stimulation thereof if desired.

The steam injected into the outlying producer wells 24, 26, 28 and 30 during the producer stimulation phase of the process may include a substantially vaporized volatile solvent of the same type that is to later be injected into the central injection well 22. The preferred nature and proportions of this solvent are discussed in further detail below with regard to the injection of steam and solvent into the central injection well 22.

Figure 3:
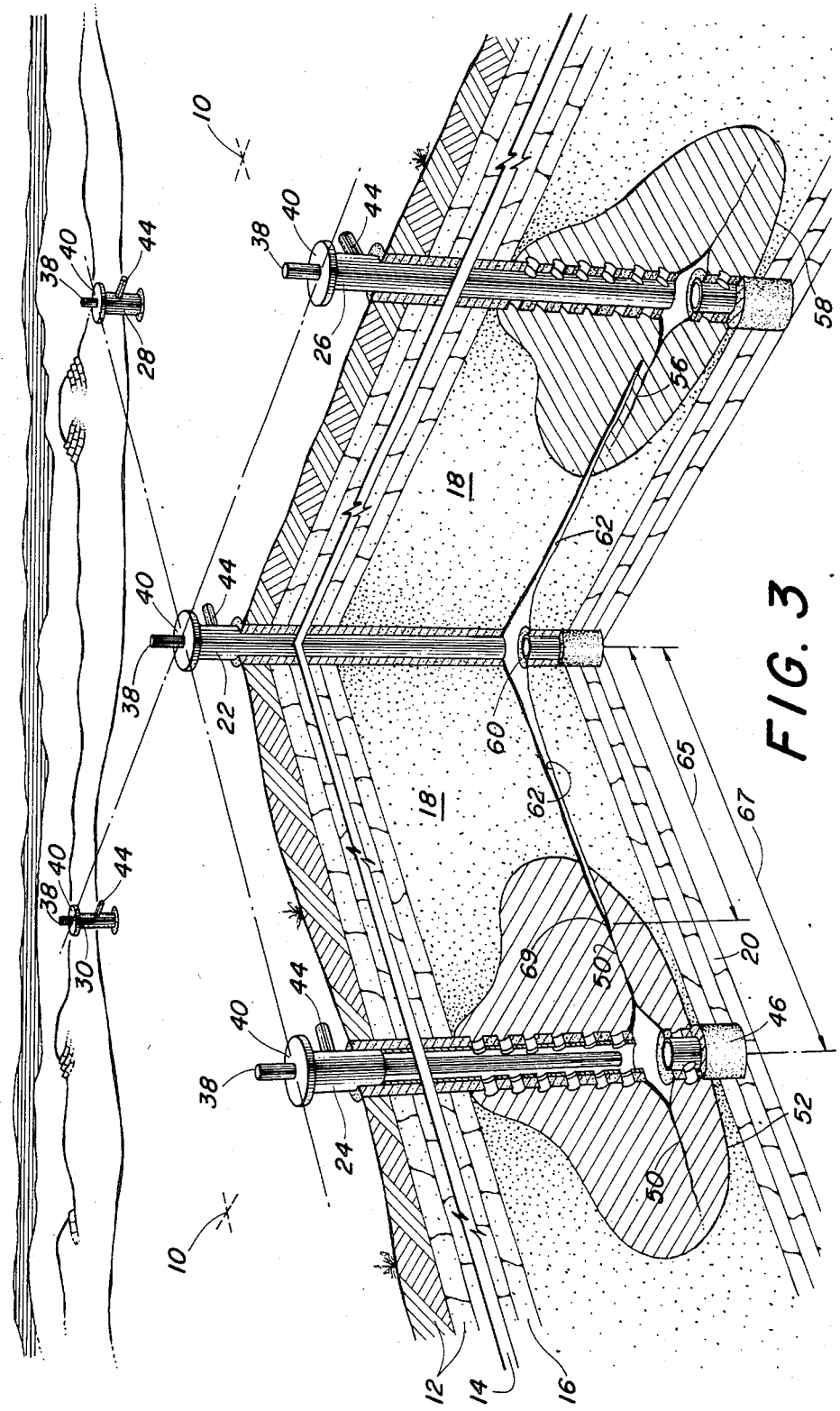
FIG. 3 illustrates in semi-schematic cut-away fashion the process at a period in time following notching and fracturing of the central injection well so as to form a generally horizontal fracture system extending from the injection well toward each of the production wells.

Substantially simultaneously with the notching and fracturing of the outlying producing wells, the central injection well 22 is notched at 60 in FIG. 3. The injection well 22 may also be perforated as indicated at 64 in FIG. 4, prior to steam stimulation of the producing wells.

When the steam or steam and solvent are injected into the producing wells, during the producer stimulation phase, the injector well 22 may be produced.

Producing the central injection well 22 may be necessary in a confined, multiple pattern operation, as otherwise the pressure in the formation 18 would rise and reduce the heating inside the pattern by diverting hot fluids away from the pattern.

After the producer stimulation phase, the central injection well 22 is hydraulically fractured as illustrated in FIG. 3 from the notch 60 out toward the surrounding production wells thus creating a generally horizontal fracture system 62. The fracture system 62 extends into the vicinity of the preheated zones such as 52 and 58 surrounding the production wells, thus providing fluid communication between the central injection well 22 and all of the outlying production wells 24, 26, 28 and 30.

Figure 4:
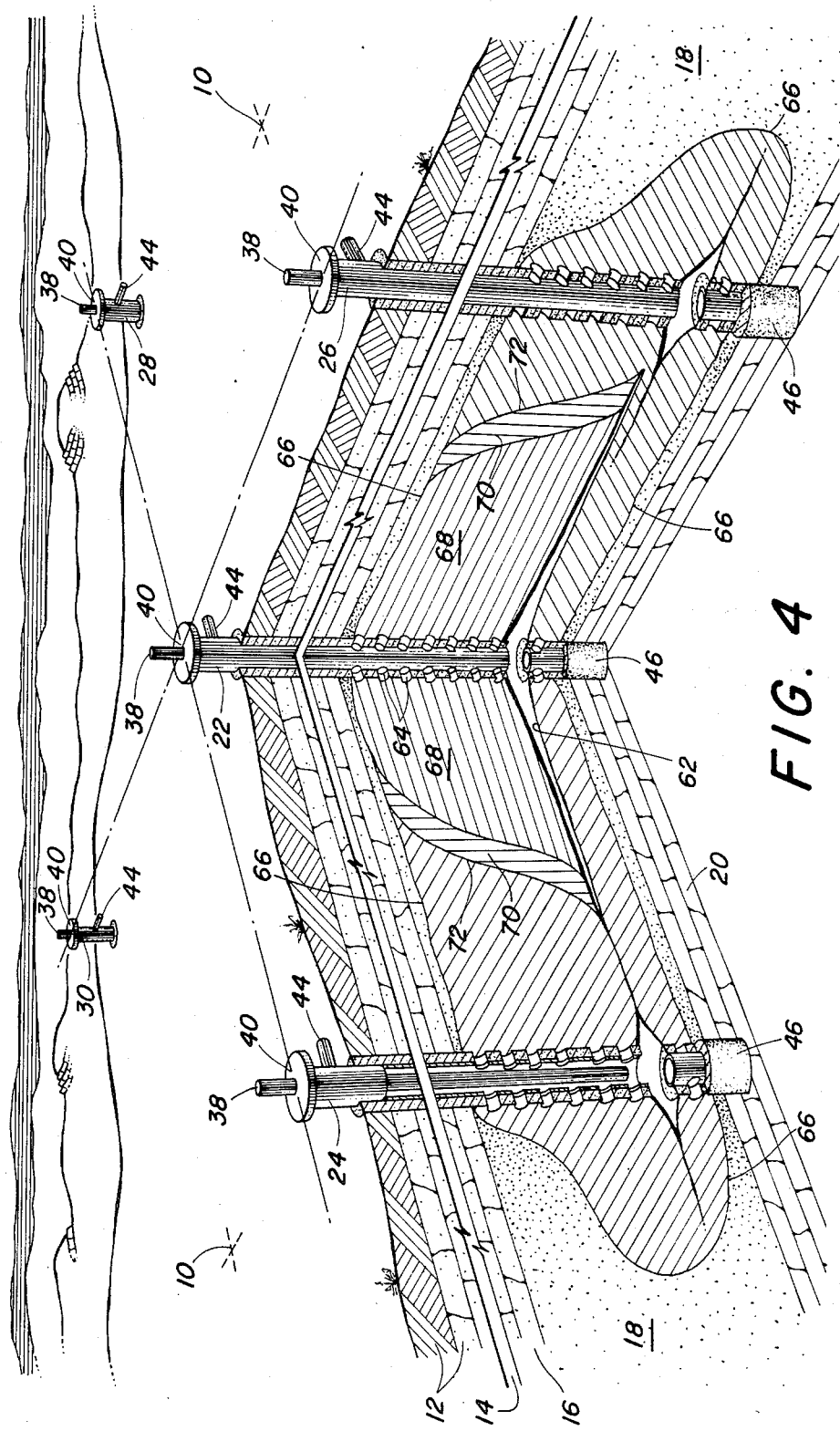
FIG. 4 illustrates in semi-schematic cut-away fashion the process at a further point in time after a solvent and steam mixture has been injected in the central injection well for sufficient time to create a steam chest growing radially outward from the central injection well and upward from the horizontal fracture system, with a bank of condensed liquid solvent formed in front of the advancing steam chest.

Referring now to FIG. 4, subsequent to the creation of the fracture system 62, the central injection well 22 is also perforated as indicated by perforations 64 along a substantial portion of entire vertical interval of formation 18. A mixture of steam and a substantially vaporized volatile solvent is injected into injection well 22 and into the formation 18 through perforations 64 and into the generally horizontally extending fracture system 62 at a very high rate and at a pressure sufficient to maintain the fracture system 62 in a parted condition for a substantial portion 65 of a distance 67 from the injection well 22 to the production well 24.

As seen in FIG. 3, the generally horizontal fracture system 62 extending from injection well 22 terminates such as indicated at point 69 short of the production well such as 24, and in the preheated zone such as 52 surrounding each of the production wells such as 24.

The distance 65 over which the generally horizontal fracture system 62 is maintained in a parted state is generally in a range from about 30% to about 90% of the total distance 67 from injection well 22 to production well 24. Preferably, the parted portion of horizontal fracture system 62 will extend from about ⅔ to about ¾ of the distance 67, so that the distance 65 can be said to preferably be in the range of about 67% to about 75% of the total distance 67.

As illustrated in FIGS. 3 and 4, the parted, generally horizontally extending fracture system 62 extending from injection well 22 towards the outlying producing wells may intersect with the fractures such as 50 and 56 generated from the outlying producing wells during the producer stimulation phase, although it need not do so. In FIG. 3, the parted, generally horizontal fracture system 62 is shown as intersecting the closed fracture 50 extending from producing well 24, but it is shown as not intersecting the fracture 56 extending from producing well 26.

As will be understood by those skilled in the art, it is not generally possible to exactly control the location of a well fracture, and it is not generally possible to cause the fracture extending from the injection well 22 to actually intersect the fractures extending from the surrounding producing wells.

It is only necessary that the fracture system 62 extend into the vicinity of the preheated zones such as 52 and 58 surrounding each of the production wells, so that a heated permeable zone or path is formed between the injection wells and each of the surrounding producing wells so that a mixture of heavy oil and liquid solvent which will drain to the parted fracture system 62 can be mobilized and produced along this heated permeable path to the producing wells.

It is noted that although in most cases the steam and solvent will be mixed together at the ground surface prior to being introduced into the injection well 22, there may be situations where it is preferable to run a solvent injection line into the well bore down to a location adjacent the formation 18. Then the mixing of steam and solvent would take place in the well bore. In either event, however, the solvent will be substantially vaporized by the heat of the steam as the mixture flows into the formation 18.

Also, there may be situations in which it is preferable to inject the steam and solvent into the injection well 22 separately at different times. Generally speaking, the solvent may be injected before, during or after steam injection, and may be introduced continuously or intermittently. A further explanation of preferred solvent injection schedules is found below in the discussion of Case 7. In any event, the solvent will be vaporized by the steam and a resulting vaporous mixture of steam and solvent will permeate the formation in a manner described in greater detail below.

In FIG. 4, the heated zones such as 52 and 58 surrounding each of the producing wells 24, 26, 28 and 30 have merged with a heated zone emanating from the central injection well 22 to form a combined heated zone 66.

The mixture of steam and vaporized solvent which is injected into the central injection well 22 and into the formation 18 through the fracture system 62 travels from well 22 radially outward along the fracture system 62 and upward therefrom thus forming a steam chest 68 which steadily grows radially outward from well 22 and upward from fracture system 62 and advances through the formation 18 toward the outlying producing wells.

The vaporized solvent is uniformly distributed through the steam-solvent mixture making up the steam bank 68. As the vaporous steam-solvent mixture of the steam bank 68 contacts relatively cold heavy oil deposits in the formation 18, the vaporous solvent condenses to form a liquid solvent bank 70 along a front line 72 of the advancing steam chest.

It is noted that steam from the vaporous steam-solvent mixture making up the steam bank 68 will also condense as it contacts relatively cold heavy oil deposits in the formation 18 to form liquid water in the formation 18. Some of that water will in fact be mixed with the solvent bank 70, but it is not indicated in the drawing since it is of no significance to the present explanation of the invention.

The liquid solvent bank 70 mixes with the heavy oil deposits in the formation 18 to form a mobilized mixture of heavy oil and liquid solvent which drains readily downward to the horizontal fracture system 62 from which it is swept toward the outlying producing wells.

This mixture of heavy oil and liquid solvent is produced from the outlying producing wells 24, 26, 28 and 30.

It is noted that FIG. 4 illustrates the manner in which the steam transports the vaporized solvent into the formation forming the steam chest 68 and liquid solvent bank 70 only in a very schematic fashion. The boundaries of the solvent bank 70 will probably not actually be nearly so distinct as illustrated in FIG. 4.

Instead, there will be a zone which gradually varies as one moves radially outward through the outer portions of the steam chest 68. An interior zone will be present within the steam chest 68, wherein the pore spaces of the formation are primarily filled with a vaporous steam-solvent mixture since the heavy oil deposits have been removed. As one moves outward from the interior portions of the steam chest 68 through what has graphically been illustrated as the liquid solvent bank 70, the solvent concentration will increase, and the percentage of the solvent which has condensed to a liquid form will increase. Along the front 72 of the advancing steam chest 68 and liquid solvent bank 70 there will be zones where there is a high degree of mixing of liquid solvent with heavy oil deposits, thus reducing the viscosity of the heavy oil deposits with that reduced viscosity mixture of heavy oil and liquid solvent beginning to drain downward toward the horizontal fracture system 62. As one moves radially outward beyond the advancing front 72, the relative presence of solvent will gradually decrease.

In a fracture-assisted steamflood process wherein pure steam (without solvent) is injected, the reduction in viscosity in the heavy oil deposits is due solely to heating. With the addition of solvent, however, a second mechanism is provided for reducing the viscosity of the heavy oil deposits. The numerical modeling has shown that the effect of the solvent is to significantly reduce the viscosity of oil deposits in advance of those zones of the formation which have been substantially heated.

Also, it should be noted that if during the producer stimulation phase, solvent is included with the injected steam injected into the producers, there will already be some presence of solvent within portions of the formation 18 surrounding each of the producing wells. If solvent is injected with the injected steam into the producing wells during the producer stimulation phase, it will be transported into the formation 18 by the injected steam during the producer stimulation phase in a manner similar to that which has just been illustrated and described with regard to FIG. 4 for the injection of steam and solvent into central injection well 22.

During the heat-scavenging phase of the process, liquid water is injected into the injection well 22 and into the formation 18. This scavenging water collapses the steam chest 68 and generally lowers temperatures within the formation 18.

In spite of the lowered temperatures, however, the mixture of heavy oil and solvent remaining in formation 18 is maintained at a substantially lower viscosity than the heavy oil originally had. This is due to the presence of the solvent.

The heat-scavenging water drives the mixture of heavy oil and solvent to the producing wells. This is continued for so long as there is any significant oil production, which may require injection of 3 to 4 pore volumes of water.

This ability of the heat-scavenging water to provide significant additional recoveries of heavy oil and solvent is due to the manner in which the solvent is transported into the formation and the manner in which the heavy oil and solvent are produced from the formation. As is apparent from viewing FIG. 4, the heavy oil and solvent located in and around the zone schematically illustrated as the solvent bank 70 can drain through the area 68 previously occupied by the now-collapsed steam chest because the heavy oil has been substantially removed from the pore spaces within the zone 68.

That heavy oil and solvent which drain to the heated permeable zone adjacent the horizontal fracture system 62 is transported through the heated permeable zone in and adjacent fracture system 62 to the outlying producing wells by the heat-scavenging water flowing from the injection well 22 to the outlying producing wells.

As is further explained below in the portion of this specification comparing the process of the present invention to a typical prior art matrix drive type steamflood process utilizing steam, this is dramatically different from the effect of utilizing heat-scavenging water in such a prior art process.

Due to the effectiveness of the use of heat-scavenging water following the steam injection phase of the solvent enhanced fracture-assisted steamflood process of the present invention, significant additional amounts of heavy oil are recovered from the formation and significant additional amounts of injected solvent are recovered, both at a negligible additional cost. This significantly improves the overall steam-to-oil ratio for the process, and also significantly reduces the amount of solvent lost to the formation, both of which dramatically improve the economic feasibility of a given project.

Also, it is noted that prior to injecting the heat-scavenging water, it is sometimes desirable to allow the formation to blow down, thus lowering the pressure required to inject the heat-scavenging water.

In a preferred embodiment of the invention, the liquid solvent is separated from the mixture of heavy oil and liquid solvent which is produced. This separated liquid solvent may be saved for later use in another steamflood project, or it may be sold or otherwise disposed of.

At this point, it should be noted that the improved process of the present invention as illustrated in FIG. 4 varies in several aspects from the process generally disclosed in Britton et al. U.S. Pat. No. 4,265,310 other than with regard to the injection of solvent with the steam.

For one thing, it has been determined that it is preferable for the fracture system 62 to be located toward the lower extremity of the formation 18, because the steam and vaporized solvent tend to rise from the fracture system 62 due to gravitational effects. Thus, the fracture system 62 shown in FIG. 4 of the present application is located closer to the lower extremity of the formation 18, whereas in the disclosure of U.S. Pat. No. 4,265,310, the fracture system was illustrated as being located substantially in the vertical central portion of the formation.

Figure 5:
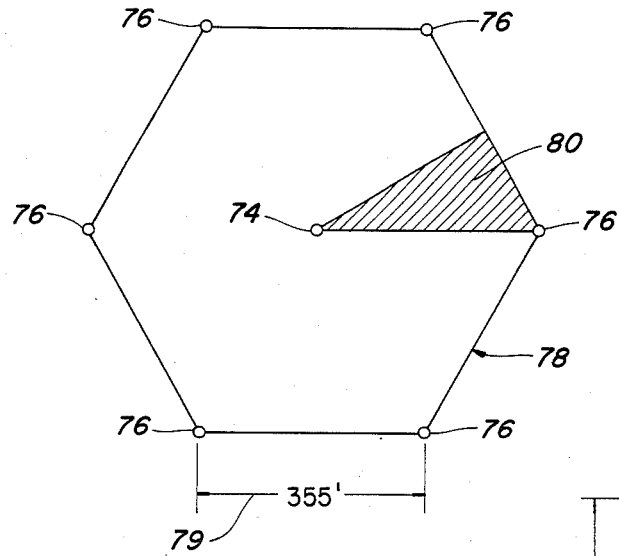
FIG. 5 illustrates an inverted seven-spot steamflood pattern which was used for numerical modeling of the process of the present invention. A one-twelfth symmetry element of the pattern, which element was used for the numerical modeling, is shaded.

Additionally, in the Britton et al. process as originally disclosed in the '310 patent, there was a distinct preheat phase as illustrated in FIGS. 3 and 4 thereof wherein steam was injected into the central injection well and into the formation solely through the horizontal fracture system, prior to perforation of the central injection well. Subsequently, as shown in FIG. 5 of Britton et al., U.S. Pat. No. 4,265,310, the central injection well was perforated, the injection pressure was reduced to below that required to float the fracture system, and the steam injection process was completed as a matrix drive type of steam injection.

As disclosed in the present application, it is now preferred that the central injection well 22 be perforated at substantially the beginning of the steam injection process and that steam and solvent be injected through the central injection well 22 into the formation 18 both through the perforations 64 and through the horizontal fracture system 62 during substantially the entirety of the total time of steam injection.

It should be noted, however, that in its broadest aspects, the present invention including solvent with injected steam can certainly be utilized in the original Britton et al. process wherein there are distinct preheat and matrix drive phases before and after, respectively, the perforation of the central injection well.

Also, in Britton et al. U.S. Pat. No. 4,265,310, the fracture system was illustrated as being floated or parted for the entire distance from the injection well to the surrounding producing wells as illustrated in FIGS. 2, 3 and 4 thereof.

It is now preferred, however, that the generally horizontally extending fracture system 62 be parted only a portion of the way to the surrounding producing wells as illustrated in FIGS. 3 and 4 of the present application. It has been determined through numerical modeling that if the fracture system is in fact parted along the entire distance between the injection well and the surrounding producing wells, that most of the steam or steam-solvent mixture injected into the central injection well will flow directly through the parted fracture to the surrounding producing wells rather than dispersing into the formation 18 to form the steam bank 68 as is desired.

Description Of The Numerical Modeling Of The Solvent Enhanced Fracture-Assisted Steamflood Process In order to verify the performance of the process of the present invention, a number of numerically simulated tests have been performed.

This has been accomplished by first numerically modeling one of the actual field tests of the process disclosed in Britton et al. U.S. Pat. No. 4,265,310, and then modifying that numerical model to simulate the addition of solvent to the injected steam.

The numerical modeling was based upon the Saner Ranch pilot test performed by the assignee of the present invention, as previously mentioned and as discussed and explained in detail in Society of Petroleum Engineers of AIME Paper No. SPE 13036, titled "The Saner Ranch Pilot Test Of Fracture-Assisted Steamflood Technology", by Stang et al., presented at the 59th Annual Technical Conference and Exhibition held at Houston, Tex., on Sept. 16-19, 1984.

This actual previous pilot test was numerically modeled with a commercially available numerical simulator program known as the Volatile Oil Steamflood Simulator developed by Todd, Dietrich and Chase, Inc.

A detailed explanation of the manner in which the Saner Ranch field test was originally simulated through the use of the Todd, Dietrich and Chase simulator can be found in Petroleum Society of CIM Paper No. 85-36-4, "Simulation Of The Saner Ranch Fracture-Assisted Steamflood Pilot" by Soni et al., presented at the 36th Annual Technical Meeting of the Petroleum Society of CIM held jointly with the Canadian Society of Petroleum Geologists in Edmonton, Canada, June 2-5, 1985, which is incorporated herein by reference.

The simulation study of the solvent enhanced fracture-assisted steamflood process employed a two-dimensional, vertical Cartesian (X-Z) grid to represent a one-twelfth symmetry element of a 7.5 acre inverted seven-spot pattern.

It is noted that the numerical modeling was based upon a seven-spot pattern, whereas the prior physical description of the process of the present invention was based upon a five-spot pattern as illustrated in FIGS. 1-4. The arrangement of the pattern does not change the nature of the process, and as previously mentioned, the process of the present invention can be used with any well pattern.

FIG. 5 schematically illustrates the inverted seven-spot pattern which includes a central injection well 74 surrounded by six equally spaced outlying producing wells 76.

The producing wells 76 define a hexagonally shaped steamflood injection pattern designated by the numeral 78 having six sides of equal length 79.

The one-twelfth symmetry element utilized for numerical modeling of the Saner Ranch pilot steamflood project is indicated by the numeral 80 in FIG. 5 and has been shaded. As will be appreciated, the entire steamflood pattern illustrated in FIG. 5 is made up of twelve triangular sections, each equivalent to the one-twelfth symmetry element 80, thus to simplify the numerical modeling, it is only necessary to model one of the triangular elements 80.

Figure 6:
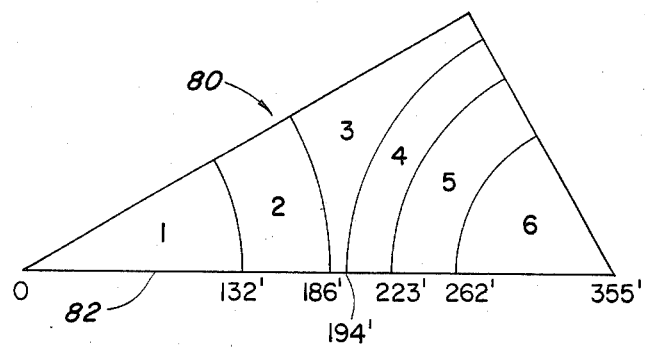
FIG. 6 illustrates an equal volume areal grid for the triangular one-twelfth pattern symmetry element of FIG. 5.

An equal volume areal grid for the pattern symmetry element 80 is shown in FIG. 6.

In FIG. 6, the one-twelfth symmetry element 80 is illustrated and it is divided into six areas designated by the numerals 1 through 6.

Along a lower side 82 of the triangular element 80, the relative locations of the lines dividing the six sections 1 through 6 are indicated as distances form the left end of the side 82. The side 82 has a total length of 355 feet which is equal to the length of the side 79 of the hexagonal pattern seen in FIG. 5.

Thus, the dividing line between zone 1 and 2 in FIG. 6 is located 132 feet from the left end of side 82 and it is an arcuate line scribed from a center coincident with the left end of side 82.

Figure 7:
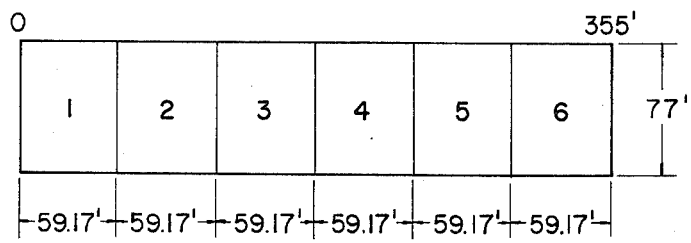
FIG. 7 represents a linear model of the actual grid of FIG. 6, as utilized in the numerical modeling.

FIG. 7 represents an equivalent linear model of the actual grid of FIG. 6. The block volumes and transmissibilities were modified appropriately.

Figure 8:
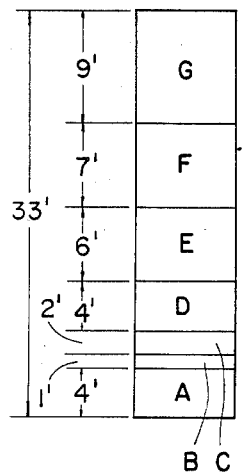
FIG. 8 illustrates a vertical grid system utilized for the numerical modeling.

The vertical grid system for the numerical model is illustrated in FIG. 8. As seen in FIG. 8, the vertical interval of the formation under consideration was broken into seven layers designated A, B, C, D, E, F and G having a total thickness of 33 feet and having individual thicknesses as indicated in FIG. 8.

The next-to-the-bottom layer in FIG. 8 designated as B represents the horizontal fracture system 62. As previously mentioned, the generally horizontal fracture system 62 seen in FIGS. 3 and 4 is preferably maintained in a parted position for a major portion 65 of the distance 67 from the injection well to the producing wells. From a termination point, as indicated at 69 in FIG. 3, of the parted horizontal fracture system to the producing well, the formation is closed and any flow therethrough will generally be a matrix type flow through the porous matrix of the formation 18.

The model this structure, the parted portion 65 of the generally horizontal fracture system 62 is numerically represented by a plug flow model, and the closed portion of the fracture system, or that distance from termination point 69 to the production well such as 24, is modeled as a one-foot thick reservoir layer B with a pressure dependent absolute permeability, thus representing a Darcy type flow.

The flow of fluids in the open fracture represented by the layer B was modeled using techniques developed to obtain a history match to actual data from the Saner Ranch pilot project previously mentioned.

Thus the formation 18 was modeled in the X direction as represented in FIG. 7 and the Z direction as represented in FIG. 8.

A two-dimensional model of a pattern flood inherently results in a 100 percent areal sweep of the pattern by injected fluids. An areal sweep efficiency factor of 0.85, which was derived from a previous study of these modeling techniques as compared to actual field data from the Saner Ranch pilot project, was employed to correct the oil production otherwise predicted by the two-dimensional model.

Reservoir Properties Utilized In The Numerical Modeling Of The Solvent Enhanced Fracture-Assisted Steamflood Process As previously mentioned, the numerical modeling was based upon a previous numerical model simulating the actual field pilot steamflood test conducted by the assignee of the present invention on the Saner Ranch in south Texas.

That pilot test involved the San Miguel-4 sand which is a tar-bearing formation in south Texas. It outcrops just north of the Maverick-Kinney county line and has a dip of 2 degrees. It is predominantly sandstone with many limestone stringers. The reservoir has a well developed caprock, and at most locations, it is divided into two zones by a dense limestone streak. The sand is well sorted, uniform in texture and weakly consolidated. The clay content of the sand is very low.

The San Miguel-4 formation in the pilot area is at a depth of about 1400 feet (427 m). The sand body has a gross thickness of 71 feet (21.6 m) separated into two nearly equal thickness sands, (32 and 34 feet or 9.8 and 10.4 meters thick ) by a fairly continous, impermeable hard streak that covers most of the reservoir area. In the lower sand, there are several thin limestone streaks but these are not continuous and each one covers only a fraction of the pilot area. The total pilot sand thicknes can be conveniently divided into 5 zones. The three lower zones form the lower lobe of the sand.

The steamflood was conducted in the lower lobe primarily because of high tar saturations. There were no appreciable variations in the porosity and permeability throughout the pilot area.

The tar present in the San Miguel-4 sand is perhaps the most dense and viscous hydrocarbon known to be produced by in-situ methods. The tar has a density ranging from $-2°$ to $+3°$ API (1,093 to 1,052 kg/m$^3$) and has a viscosity of up to 20 million centipoise at reservoir conditions. The tar is essentially immobile at reservoir temperature and has a pour point of 180° F. (82° C). The south Texas tar is significantly more viscous than the Athabasca deposits. The hydrogen to carbon atomic ratio in the tar is about 1.4. In addition, it has about 10 percent by weight sulfur.

Reservoir properties used for the Saner Ranch fracture-assisted steamflood technology pilot history match were employed in this numerical modeling and are set forth in the following Table I:

TABLE I

| TAR SAND RESERVOIR PROPERTIES | |
|---|---|
| Pay Thickness | 33 feet |
| Porosity | 0.28 |
| Compressibility | $15 \times 10^{-6}$ psi$^{-1}$ |
| Permeability | |
| Horizontal | 600 md |
| Vertical | 470 md |
| Rock Heat Capacity | 35.5 Btu/ft$^3$-°F. |
| Rock Thermal Conductivity | 30 Btu/day-ft-°F. |
| Over-/Under-Burden Heat Capacity | 32.5 Btu/ft$^3$-°F. |
| Over-/Under-Burden Thermal Conductivity | 31 Btu/day-ft-°F. |

Figure 33:
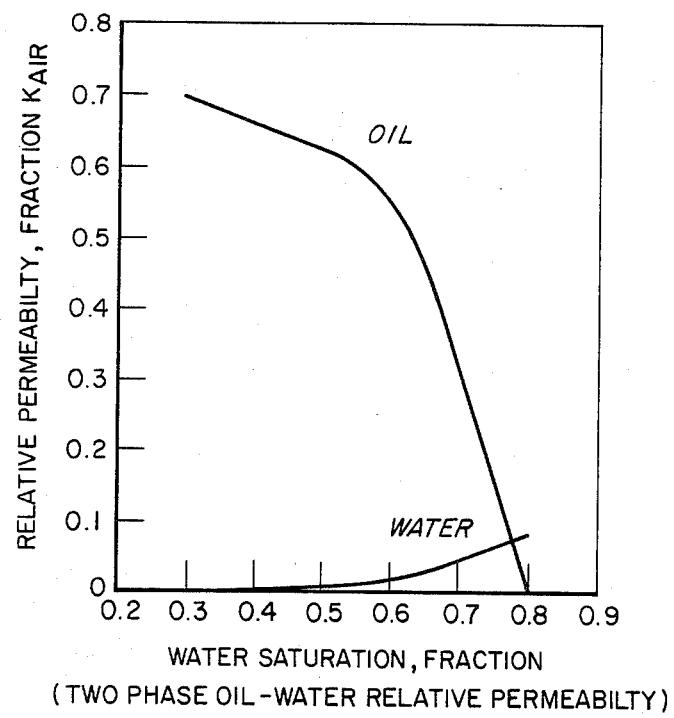
FIG. 33 is a graphic illustration of the oil-water relative permeabilities for the formation upon which the numerical modeling for the solvent enhanced fracture-assisted steamflood process was based.
Figure 34:
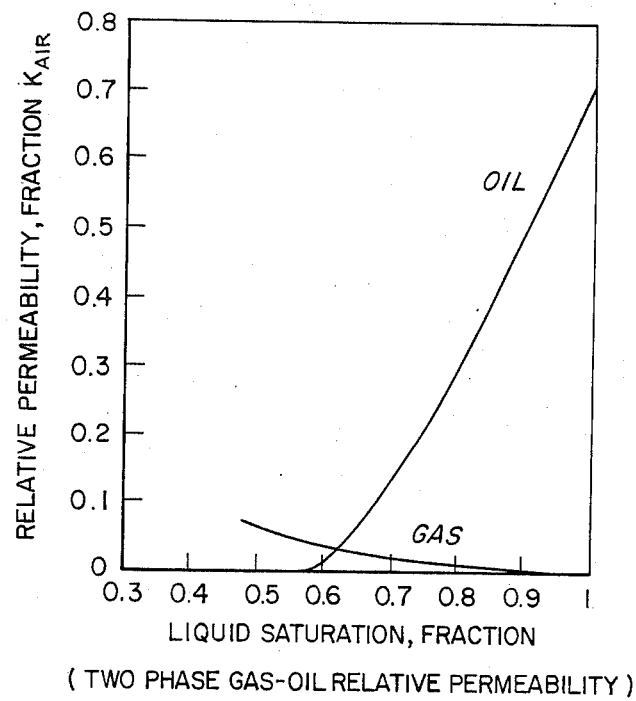
FIG. 34 is a graphical representation of the gas-oil relative permeabilities for the formation upon which the numerical modeling for the solvent enhanced fracture-assisted steamflood process was based.
Figure 35:
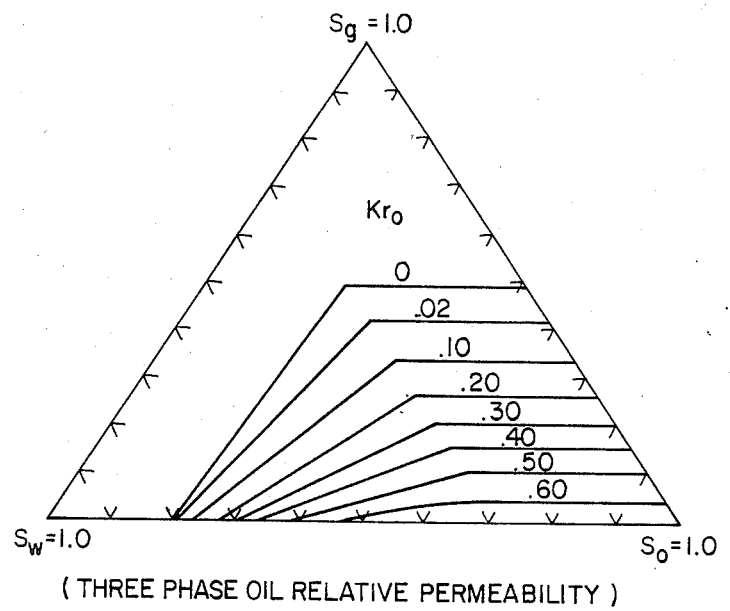
FIG. 35 is a graphical representation of the three-phase oil relative permeability for the formation upon which the numerical modeling for the solvent enhanced fracture-assisted steamflood process was based.

The oil-water and gas-oil relative permeabilities and the three-phase oil relative permeability diagrams are shown in FIGS. 33, 34, and 35, respectively.

The 3° API tar properties are given in the following Table II:

TABLE II
TAR PROPERTIES

| | |
|---|---|
| Molecular Weight | 500 |
| Density | 1.05 gm/cm$^3$ |
| Partial Molar Volume | 7.63 ft$^3$/mol |
| Compressibility | $5 \times 10^{-6}$ psi$^{-1}$ |
| Coe. of Thermal Expansion | $330 \times 10^{-6}$ °F.$^{-1}$ |
| Heat Capacity | 275 Btu/mole-°F. |

The properties of the decane and hexane solvents are given in the following Table III:

TABLE III
HEXANE AND DECANE PROPERTIES

| | N—hexane | N—decane |
|---|---|---|
| Molecular Wt. | 86.1 | 142.3 |
| Sp. Gravity (cm/cc) | .664 | .719 |
| Viscosity | | |
| at 100° F. (cp) | .26 | .74 |
| at 322° F. (cp) | .11 | .21 |
| at 489° F. (cp) | .07 | .12 |
| Heat Capacity (Btu/mole-°F.) | 63.0 | 78.2 |
| Vapor Pressure | | |

$$P_v(\text{psia}) = \exp\left(vp2 - \frac{vp1}{T(°R)}\right)$$

| | | |
|---|---|---|
| vp1 | 6,255.2 | 9,603.8 |
| vp2 | 12.853 | 14.498 |

The viscosity of solvent and heavy oil blends was determined in the numerical model by the power law mixing rule shown in the following equation 1:

$$\mu = \mu_S^{X_S} \mu_H^{X_H} \quad \text{(Equation 1)}$$

where $\mu$ is absolute viscosity, X is the component mol fraction, and the subscripts S and H refer to the solvent and heavy oil components, respectively.

Figure 36:
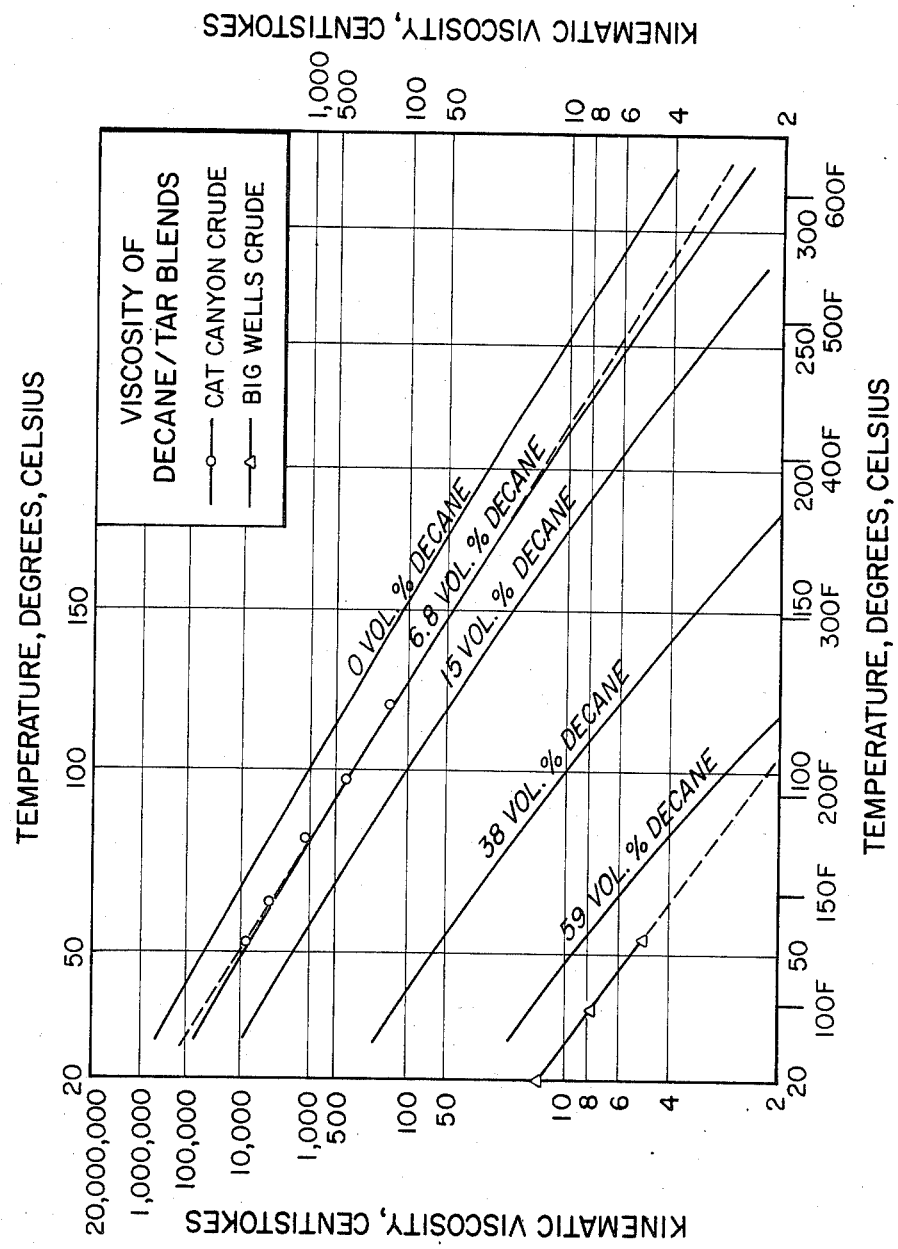
FIG. 36 graphically represents the viscosities of the tar-decane blends as computed by a power law mixing rule utilized in the numerical modeling.

Viscosities of the tar/decane blends computed by Equation 1 are shown in FIG. 36.

Operating Parameters

A total of ten different cases was simulated. In each case, the producer stimulation, steam injection, and heatscavenging phases were simulated.

Steam injection phase slug sizes of 0.5, 1.0, 1.5, 2.0 and 2.5 pore volumes of steam, each followed by the heat-scavenging phases, were modeled to select the optimum steam and hot water slug sizes for each case. The steam and hot water injection rates are given in the following Table IV.

TABLE IV
OPERATING PARAMETERS
INJECTION

| Phase | Fluid | Rate | Slug | Enthalpy Btu/lb |
|---|---|---|---|---|
| Producer Stimulation | Steam | 800 BPD per well | 24,000 Bbl | 1,000 |
| Steam Injection | Steam | 3,600 BPD | Up to 4 Pore Volumes | 1,000 |
| Heat Scavenging | Water | 4,500 BPD | Up to 3 Pore Volumes | 150 |

The injection well was jointly rate/pressure constrained with a maximum bottom hole pressure of 1,650 psia. Injected steam enthalpy was 1,000 Btu/lb at the sand face. The producers were pressure constrained at a 1,000 psia minimum bottom hole pressure.

A summary of the ten cases considered in the parametric study is shown in the following Table V. It is noted that all of the amounts of steam and solvent set forth in this specification are on a liquid volume equivalent basis. Thus, even though the steam and solvent are injected as a vapor, the amounts of injected vapor are set forth as the volume of liquid water or lidquid solvent required to provide the vapor which was injected.

TABLE V
PARAMETRIC STUDY SUMMARY
SOLVENT

| Case | Grid | Concentration % | Type | Remarks |
|---|---|---|---|---|
| 1 | 2D | 0 | N/A | Base Case; No Solvent |
| 2 | 2D | 1 | Decane | Effect of solvent concentration |
| 3 | 2D | 5 | Decane | |
| 4 | 2D | 10 | Decane | |
| 5 | 2D | 15 | Decane | |
| 6 | 2D | 6.7 | Hexane | To study the effect of solvent composition |
| 7 | 2D | 10 | Decane | Solvent injected only with the first 0.5 pore volume of steam |
| 8 | 2D | 10 | Decane | No perforations in the central injection well; steam injection only through notch |
| 9 | 3D | 10 | Decane | 3-D grid |
| 10 | 3D | 15 | Decane | |

The objective of these simulations included determining the effect of solvent concentration, type of solvent, injection strategy, and numerical grid simulation effects.

It is noted that most of the numerical modeling was based upon the use of pure decane as the injected solvent. This has been done only as a representative example, and it will be understood that the injected solvent generally will not be a pure substance, and it need not be decane. As described in a later portion of tis specification, any available mixture of solvents in the $C_6$ to $C_{14}$ range, which is compatible with a particular formation being stimulated, may be utilized.

Case 1: Base Case—No Solvent Injection

The base case used the two-dimensional model grid with no solvent injection. As was previously mentioned, the tar recovery was corrected with an areal sweep efficiency factor of 0.85. The model predicted a tar (i.e., heavy oil) recovery of 31.1% at a steam-to-oil ratio (SOR) of 7.06 bbl/bbl after injecting one pore volume of steam and four pore volumes of heat-scavenging water as shown in FIGS. 9 and 10.

The data displayed in FIGS. 9 and 10, and in FIGS. 11–28 which follow is interpreted as explained below.

Each figure displays in its upper right or lower right corner a schedule explaining the meaning of the various data point symbols displayed on the graphs. Thus, in FIG. 9, a solid square data point represents hot water injection after one pore volume of steam injection. An empty triangular data point represents hot water injection after two pore volumes of steam injection. An empty square data point represents steam injection.

Figure 9:
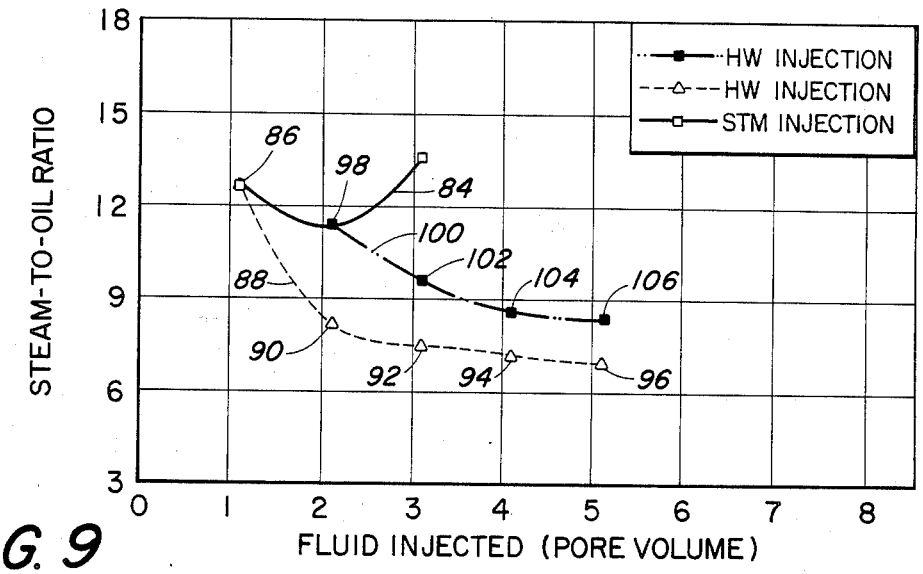
Figure 10:
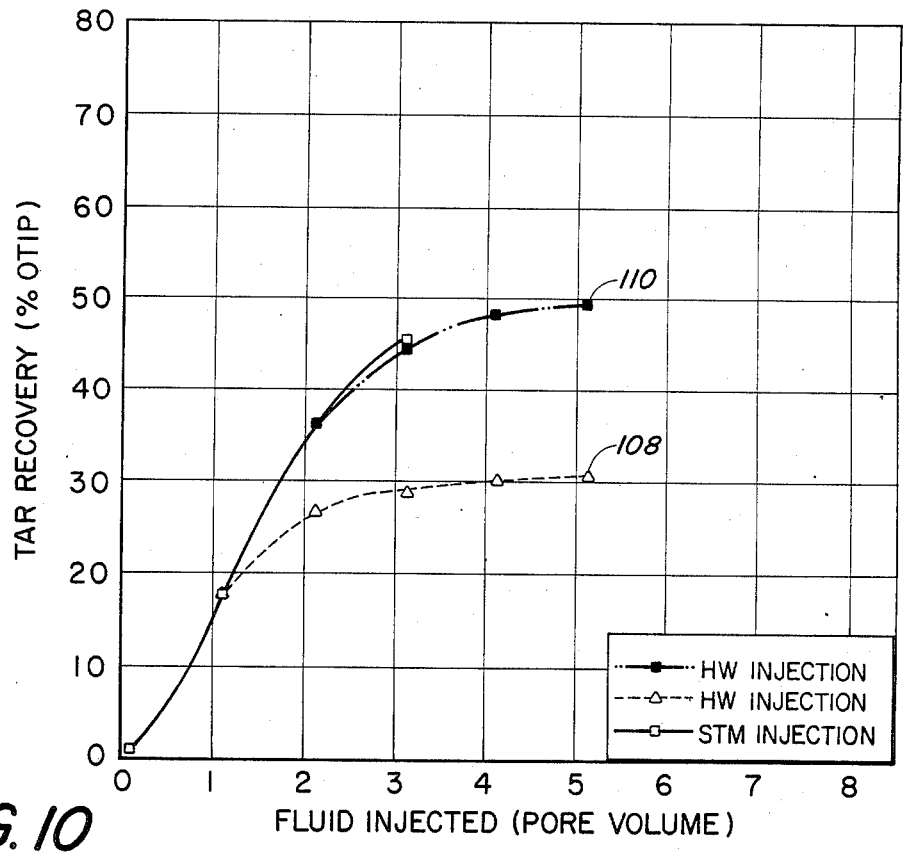
Figure 11:
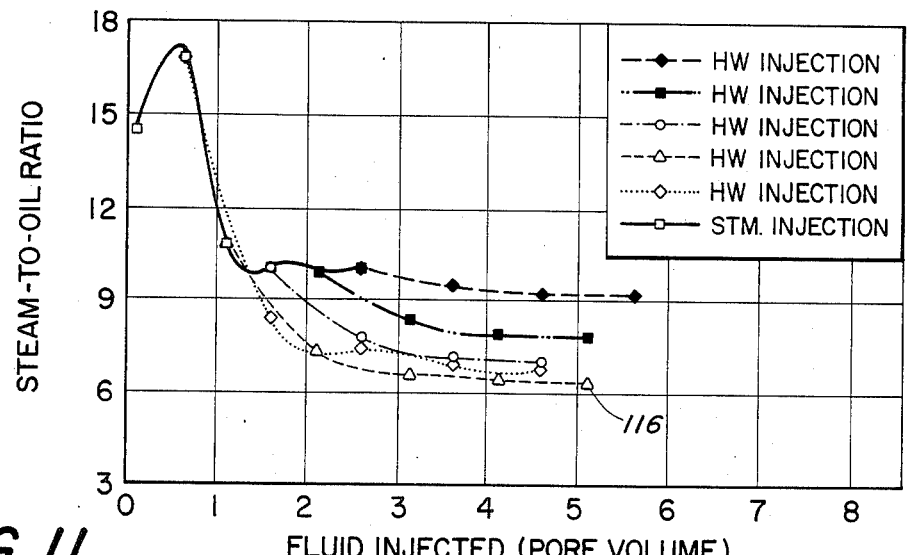
Figure 12:
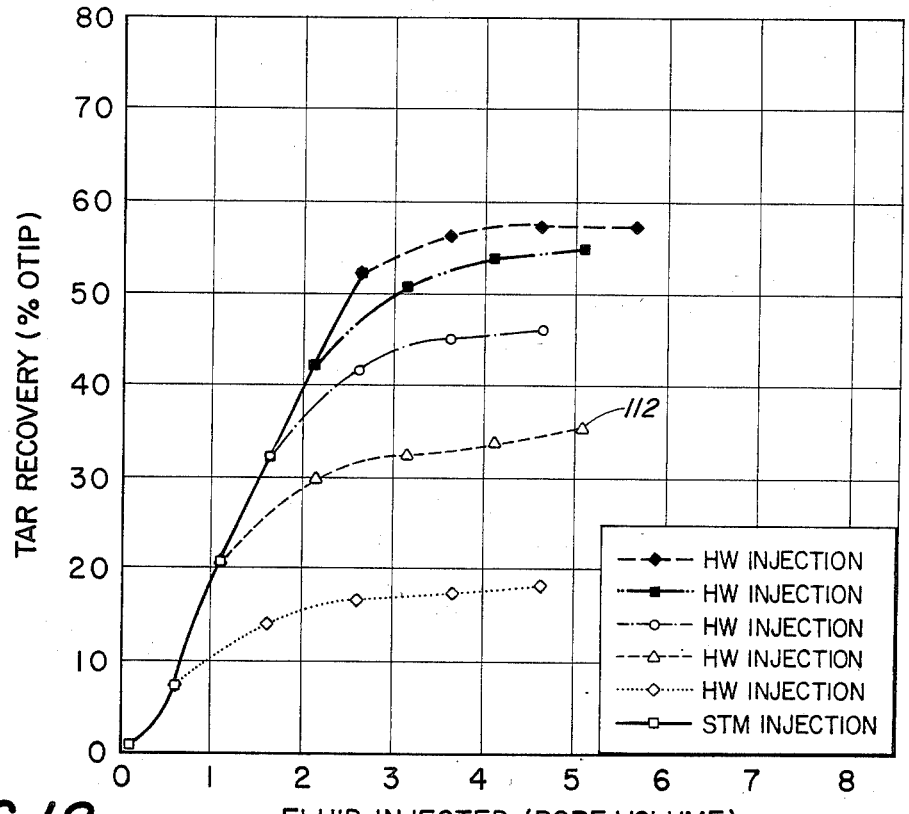

FIG. 9 displays the SOR at various points in two different fluid injection schedules. To interpret this data, it must be remembered that the steamflood process first includes a period of steam injection, and that the steam injection is then followed by a period of heat-scavenging water injection.

In FIG. 9, the solid line 84 connects the various empty square data points representing the steam injection phase.

The empty square data point at 86 represents the SOR at the time at which one pore volume of steam has been injected and no heat-scavenging water has been injected.

It is noted that each of the data points displayed on these figures is horizontally offset by a value of 0.1 pore volumes to the right of an integral marking on the horizontal axis. The reason for this is that in the numerical simulation, 0.1 pore volumes of steam or of steam and solvent mixture were injected into the producing wells during the producer stimulation phase, and this 0.1 pore volume is included in the total cumulative injected fluid set forth on the horizontal axis.

Thus, the empty square data point at 86 in FIG. 9, which was previously mentioned as representing the SOR at the time at which one pore volume had been injected into the injection well, is actually located at 1.1 on the horizontal axis. This is because there has been 0.1 pore volume of steam injected into the producing wells during the producer stimulation phase, and additionally, 1.0 pore volumes of steam has been injected into the injection well.

It should also be noted that the 0.1 pore volume injected into the producing wells during the producer stimulation phase was modeled as including the same mixture of steam and solvent as was subsequently injected into the injection well during each particular numerical simulation. Thus, in Case 2 represented in FIGS. 11 and 12, the 0.1 pore volume of material injected into the producing wells during the producer stimulation phase consisted of 0.1 pore volumes of a mixture of steam and 1% decane.

As previously mentined, the dat for Case 1 predicted a SOR of 7.06 bbl/bbl after injecting one pore volume of steam and four pore volumes of heat-scavenging water. To find this result in FIG. 9, we begin at data point 86 which represents the injection of one pore volume of steam and then we must follow the dashed line 88 through data points 90, 92, 94 and 96. The data point 96 represents the steam-to-oil ratio for the process after the injection of one pore volume of steam followed by four pore volumes of heat-scavenging water.

As is apparent in FIG. 9, the data point 96 represents a steam-to-oil ratio slightly over 7, and as previously mentioned, the actual data predicted a steam-to-oil ratio of 7.06 bbl/bbl after injecting one pore volume of steam and four pore volumes of heat-scavenging water.

It follows, therefore, that data point 90 for example, represents the SOR after the injection of one pore volume of steam and one pore volume of heat-scavenging water.

The data point 98 on solid line 84 represents the SOR for the process after injection of 2.0 pore volumes of steam and no pore volumes of heat-scavenging water. To add the effect of heat-scavenging water following the initial injection of two pore volumes of steam, we must follow the broken line 100. Data points 102, 104 and 106 along broken line 100 represent the SOR for the process after the injection of two pore volumes of steam followed by one, two and three pore volumes of heat-scavenging water, respectively.

The numerical model predicted a steam-to-oil ratio of 8.55 bbl/bbl after injection of two pore volumes of steam followed by three pore volumes of heat-scavenging water as is represented by the data point 106.

Referring now to FIG. 10, that figure can be similarly interpreted to find the various projections of the percentage of tar or heavy oil recovery as a percentage of the original tar in place (OTIP).

The tar recovery of 31.1% after injecting one pore volume of steam and four pore volumes of heat-scavenging water is represented by data point 108 in FIG. 10.

Similarly, the numerical model predicted a tar recovery of 49.3% after injection of two pore volumes of steam followed by three pore volumes of heat-scavenging water as is represented by data point 110 in FIG. 10.

Based upon the data obtained for Case 1 which is the base case with no solvent injection, and which is represented in FIGS. 9 and 10, the apparent incremental SOR for the second pore volume of steam has been calculated as 11.1 bbl/bbl. This implies that optimum steam injection is less than two pore volumes and probably between 1.0 and 1.5 pore volumes of steam.

The optimum value of steam injection can best be understood by looking at the solid curve 84 in FIG. 9. The optimum value of steam injection would be that which gives the lowest steam-to-oil ratio, and thus could be determined by finding the point on curve 84 having a zero slope. As curve 84 has been drawn in FIG. 9, this point would appear to be slightly below 2.0 pore volumes of injected steam. It must be recognized, however, that FIG. 9 does not provide sufficient dat points around the lowest part of curve 84 for that value to be accurately determined from the data set forth in FIG. 9.

Cases 2-5: Effect of Solvent Concentration

Decane injection concentrations of 1, 5, 10 and 15 volume percent were used to determine the effect of solvent concentration on the performance of the solvent enhanced fracture-assisted steamflood process of the present invention.

These solvent concentrations are stated in terms of a liquid solvent equivalent, even though it is understood that when the solvent is actually injected into the formation, the solvent is in a substantially vaporized form. Thus, the percentages given are the volumes of liquid solvent which would be required to provide the amounts of vaporized solvent which are actually injected into the wells. Similarly, the volumes of steam which are injected are also stated throughout this disclosure in terms of liquid volume equivalents.

In Case 2, 1% by volume of decane was injected with steam. The SOR and the percentage of heavy oil recovery for Case 2 are displayed in FIGS. 11 and 12, respectively.

In Case 3, 5% by volume of decane was injected with steam. The SOR and percentage of heavy oil recovery for Case 3 as a function of the fluid injection schedule are displayed in FIGS. 13 and 14, respectively.

In Case 4, 10% by volume of decane was injected with steam. The SOR and percentage of heavy oil recovery for Case 4, as a function of the fluid injection schedule are displayed in FIGS. 15 and 16, respectively.

In Case 5, 15% by volume of decane was injected with steam. The SOR and percentage of heavy oil recovery as a function of the fluid injection schedule for Case 5 are displayed in FIGS. 17 and 18, respectively.

The data for Cases 2, 3, 4 and 5 shows that for an example of one pore volume of steam injection followed by four pore volumes of heat-scavenging water injection, the percentage of tar recovery and the SOR improve monotonically with increasing solvent concentration, with decreasing marginal benefits as the solvent concentration was increased. The data for Cases 2, 3, 4 and 5 shows similar results when the amount of injected steam is increased beyond 1.0 pore volumes.

The tar recovery increased from 34.5% of original tar in place (OTIP) at an injected solvent concentration of 1% (Case 2, as represented by data point 112 in FIG. 12) to 62.5% recovery for 15 volume percent in the injected steam (Case 5, as represented by data point 114).

The SOR decreased from 6.37 for 1% solvent injection (Case 2, as represented by data point 116 in FIG. 11) to 3.47 for 15 volume percent solvent injection (Case 5, as represented by data point 118 in FIG. 17).

As is apparent from FIGS. 9–18, the heat-scavenging water phase of a steamflood project is typically continued for so long as there is any significant continuing oil production. Thus, referring, for example, to dashed line 88 and broken line 100 of FIG. 9, those lines are continued until they basically flatten out indicating that there is no significant further oil production even if additional heat-scavenging water is injected into the formation.

It will be appreciated that the economic cost for the heat-scavenging water is negligible as compared to the economic cost for the steam which is injected. Thus, the real determination which must be made in any steamflood project is the amount of steam which will be injected. This determination will be based upon economic considerations and basically steam will be injected for so long as the incremental oil return resulting from injection of additional amounts of steam is economically justified. As previously mentioned, the optimum steam injection volume is generally less than 2.0 pore volumes and is probably between 1.0 and 1.5 pore volumes.

Figure 29:
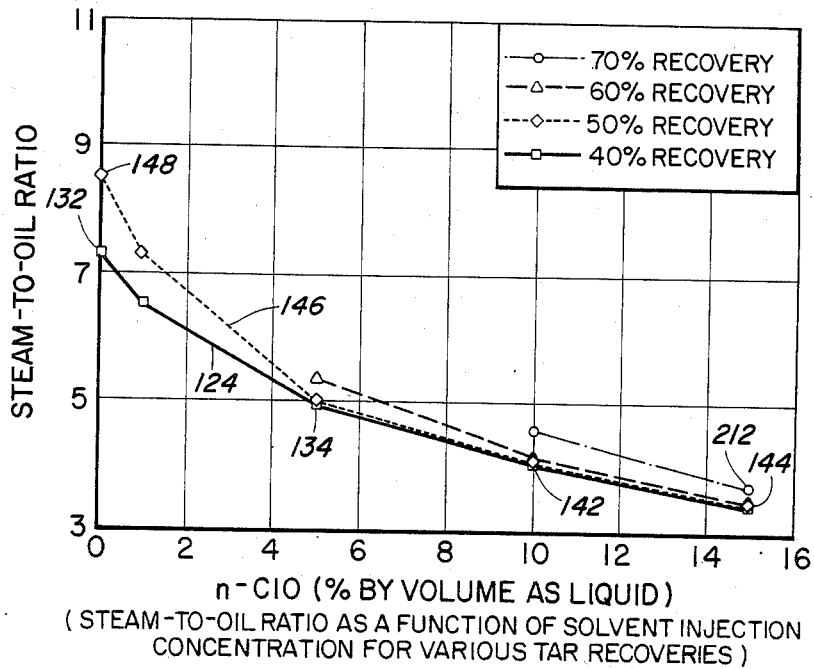

All of the data from FIGS. 9–8 is summarized in FIG. 29 which displays SOR as a function of the percentage of solvent included with the injected steam. A number of curves are shown, with each curve representing a different ultimate percentage of recovery from the formation of the oil or tar originally in place when the steamflood began. In FIG. 29, the solid line represents 40% oil recovery, the dotted line represents 50% oil recovery, the dashed line represents 60% oil recovery, and the phantom line represents 70% oil recovery.

As will be appreciated in view of the foregoing discussion, the percentage of oil recovery is basically a function of the amount of steam which is injected into the formation. It is noted that the data shown in FIG. 29 includes the effect of heat-scavenging water following the steam injection phase.

The SOR represented on the vertical axis of FIG. 29 is really a measure of the economic efficiency of the overall steamflood project, since it represents the number of barrels of steam which are injected for each barrel of oil produced.

Thus, FIG. 29 graphically illustrates the improvement (i.e., decrease in SOR, and accordingly, the improvement in the economic feasibility of the process) as a function of the percentage volume solvent which is added to the injected steam.

FIG. 29 shows tht the addition of solvent to the injected steam in the range of about 1% to about 15% by volume, there is a continuing decrease in SOR for the process as the percentage of solvent is increased. The marginal benefits from increased solvent percentages decrease as the solvent percentage becomes greater.

It is apparent from a study of FIG. 29 that the addition of solvent to the fracture-assisted steamflood process allows achievement of much higher recoveries of the original heavy oil in place than was possible without the use of solvent. This is apparent when one compares FIG. 29 to FIG. 10.

FIG. 10 graphically represents the recoveries of original oil in place for the base case fracture-assisted steamflood process without the addition of solvent. As is apparent in FIG. 10, the maximum possible recovery of original tar in place appears to be about 50%, regardless of how much additional steam is injected into the formation.

FIG. 29 illustrates that for the addition of 15% decane to the process, recovery up to 70% are certainly possible, and FIG. 18 indicates that recoveries up to approximately 80% may be achieved.

Also, it is very easily observed in FIG. 29 that for the addition of a given percentage of solvent, such as for example the data representative of 15% solvent addition, increases in overall recovery of original oil in place up to at least the 70% level can be achieved with negligible increases in SOR for the solvent enhanced process. Of course, the SOR achieved with the solvent enhanced process even for these much higher percentages of overall recovery are very much less than the SOR for the non-enhanced processes represented by the data on the left side of FIG. 29 for 0% solvent injection.

Quantitative Description of the Improvement Of Steam-To-Oil Ratio By The Addition Of Solvent To A Fracture-Assisted Steamflood Process As is apparent from the test data described above, and particularly from the results as summarized in FIG. 29, the steam-to-oil ratio for a fracture-assisted steamflood process is substantially improved, that is, substantially lowered, by the addition of solvent to injected steam. This reduction in steam-to-oil ratio can be described quantitatively by an examination of FIG. 29 as explained below.

It is recognized that the quantitative data from the numerical analysis of the solvent enhanced fracture-assisted steamflood process of the present invention is to some extent limited to the use of the inventive process in a formation similar to the one which was modeled, and which has previously been described in detail. Generally, it is believed that these quantitative results should approximately hold true for a formation wherein the heavy oil deposits have an API gravity of no greater than 10°, and wherein the formation has a reservoir permeability of at least 100 millidarcies.

Furthermore, it is believed that significant improvement will be provided to the basic fracture-assisted steamflood process by the addition of solvent in a manner such as that described in the present specification for formations wherein the heavy oil deposits have an API gravity in the range of from 10° to about 21°. The quantitative improvement, however, would be expected to be less in those reservoirs having the lighter oil deposits with an API gravity in the range of from about 10° to about 21°.

Additionally, it is generally believed that for formations wherein the oil deposits have an API gravity substantially above 21°, there will be no significant improvement due to the addition of solvent to a fracture-assisted steamflood process.

These generalizations just set forth are based upon comparative numerical anaylses conducted by the inventors. These comparative analyses were made with the model of a conventional steamflood process, wherein the API gravity of the oil deposits in place in the formation was modeled at 2°, 10°, 21° and 34°.

It is believed that the reasons for the decreasing significance of the addition of solvent to a steamflood process, in formations having lighter oil deposits, is that these lighter oil deposits themselves naturally contain increasing amounts of relatively light hydrocarbon solvents, and the injection of steam alone into such formations will vaporize these lighter hydrocarbon solvents which are naturally contained in the formations. It is believed that in formations containing oil deposits having an API gravity substantially greater than 21°, the effect of any injected solvent is overwhelmed by the effect of these naturally present solvents in the oil deposits.

With that explanation and qualification, the quantitative results of the numerical simulations set forth in the present specification can generallly be explained and summarized as follows with reference to FIG. 29.

For the process of the present invention at a 40% recovery with 0% solvent, the SOR is approximately 7.3 as represented by data point 132 in FIG. 29. For the addition of 5% solvent, the SOR drops to approximately 5.0 as represented by data point 134. This represents a 31.5% reduction in SOR for the process of the present invention at 40% recovery for the addition of 5% solvent. Thus, it can generally be said for the present invention that for the injection of a volume of mixed steam and solvent sufficient to provide a recovery of approximately 40% of the original tar in place in the formation, the process provides substantially greater than a 30% reduction in steam-to-oil ratio due to the addition of solvent if the amount of solvent added is substantially in excess of about 5% by volume.

Continuing along solid curve 124 of FIG. 29, data point 142 shows that for the addition of solvent by about 10% by volume the SOR is reduced to approximately 4.1 thus representing approximtely 43.8% decrease in SOR as compared to the SOR of 7.3 for 0% solvent as represented by data point 132.

Continuing outward along solid curve 124 in FIG. 29, the data point 144 thereon corresponding to the addition of 15% solvent shows an SOR of approximately 3.4 which represents a reduction of SOR of approximately 53.4% for the addition of 15% solvent.

An analysis of the other curves in FIG. 29 corresponding to 50%, 60% and 70% recovery of original tar in place shows similar significant decreases in SOR for the addition of solvent up to 15% by volume.

For example, the dotted line 146 corresponds to a recovery of 50% of the original tar in place.

Data point 134 on dotted line 146, corresponding to the addition of 5% solvent shows an SOR of approximately 5.0 thus representing a 41.1% reduction in SOR as compared to the original SOR of 8.5 for 0% solvent as represented by data point 148.

Data point 142 on dotted line 146, corresponding to the addition of 10% solvent shows an SOR of approximately 4.1 which compares to the original SOR of approximately 8.5 for 0% solvent as represented by data point 148. Thus, dotted curve 146 shows a decrease of approximately 51.8% in SOR for the addition of 10% by solvent in the process of the present invention where there is a 50% recovery of original tar in place.

Similarly, for data point 144 on dotted curve 146 corresponding to 50% recovery of original tar in place and the addition of 15% solvent to injected steam, an SOR of approximately 3.4 is indicated which correlates to a 60% reduction in SOR as a result of the addition of 15% solvent.

It should be noted that all of the quantitative comparisons given above are based upon data wherein the solvent is decane.

As will be further discussed below with regard to Case 6, it appears that the performance of the solvent enhanced fracture-assisted steamflood process of the present invention is likely to be improved if more volatile solvents are used. For example, Case 6 represents the addition of hexane rather than decane.

Thus, the quantitative evaluation of the reduction in SOR which can be expected through the use of the process of the present invention should be applicable for the use of decane or any solvent at least as volatile as decane. Solvents more volatile than decane should provide even greater decreases in SOR as a result of the addition of a given volume of solvent, but it must be remembered that the solvent should not be so volatile that it will not condense when it contacts the oil in the formation. Solvents less volatile than decane may not provide as great an improvement in the reduction in SOR as is indicated by the quantitative data discussed above.

Solvent Lost To The Formation

The improvement in the fracture-assisted steamflood process performance that results from solvent injection comes at an economic cost, since some of the solvent is retained in the reservoir and lost.

As previously mentioned, in the preferred embodiment of the present invention, the solvent which is recovered at the producing wells is separated from the solvent-heavy oil mixture and recycled, thus it is necessary only to replenish the solvent inventory to replace losses to the reservoir and losses incurred in the separation process.

The economic cost for the solvent retained in the formation and not recovered is, however, of considerable consequence in determining the overall economic viability of a given solvent enhanced steamflood process.

If the improvement in SOR, and the accompanying decrease in steam cost for recovery of a barrel of oil are more than offset by the cost of solvent lost to the formation, then the addition of solvent becomes uneconomical.

FIG. 31 graphically shows the amount of solvent lost to the formation as a function of the percentage solvent injected with the steam. The solvent lost is expressed in terms of barrels (bbl.) of solvent retained in the formation per barrel of tar produced.

Thus, the data of FIG. 31, and particularly curve 148 thereon, shows that solvent lost to the formation increases from about 2.6% of the produced tar at one volume percent decane injection to about 11.9% of tar production at 15 volume percent decane injection.

The solvent loss ratio, or specific solvent retention, tends to stabilize as solvent concentration is increased.

Case 6: Effect of Solvent Composition

The effect of solvent composition was investigated by injecting 6.7 volume percent (1% mol fraction) hexane with steam instead of decane.

Figure 19:
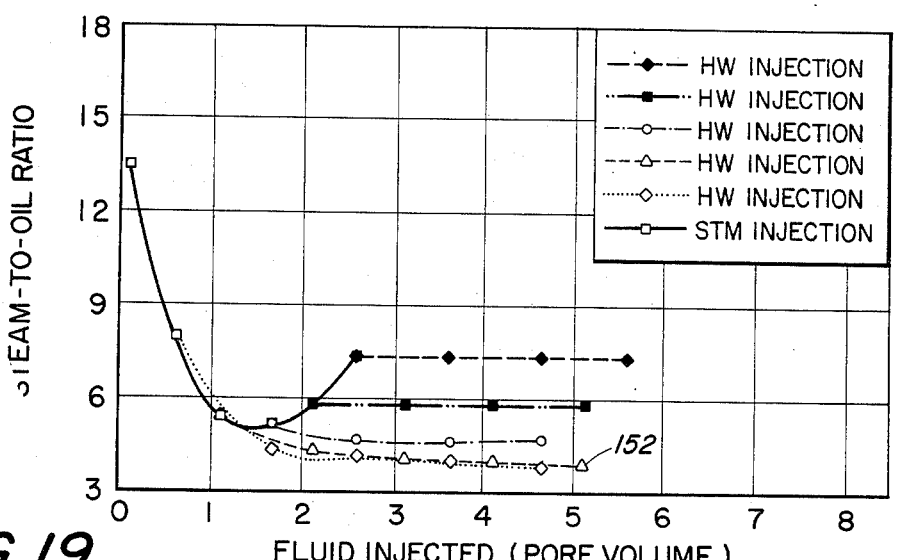
Figure 20:
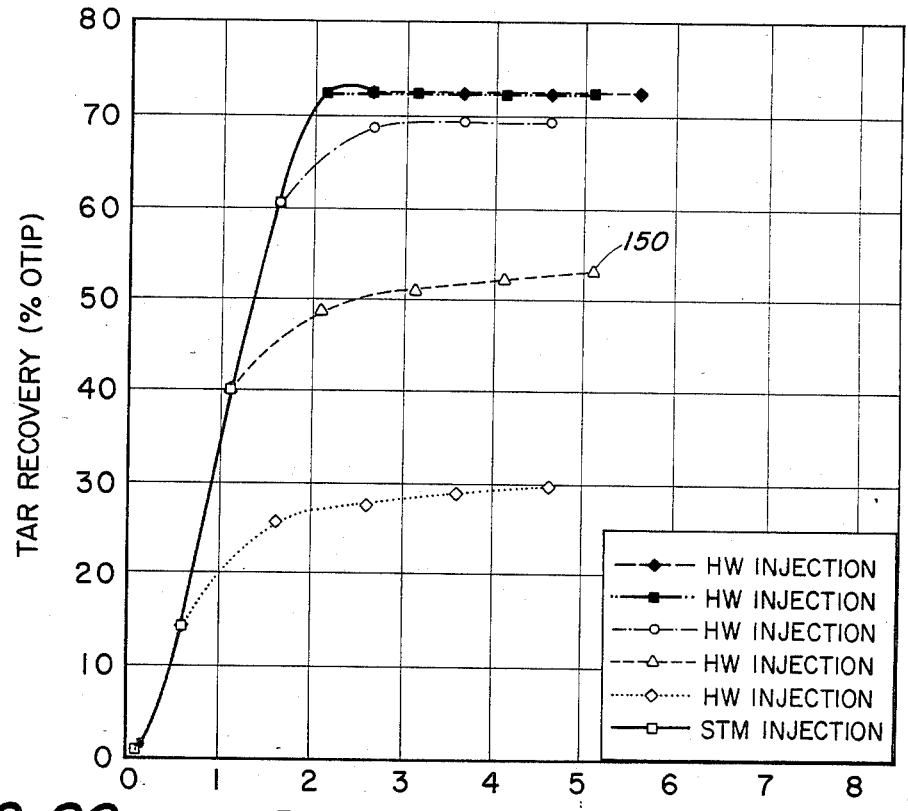

As shown in FIGS. 19 and 20, one pore volume of steam-hexane injection followed by four pore volumes of heat-scavenging water results in a tar recovery of approximately 53.6% as represented by data point 150 in FIG. 20, and a SOR of approximately 4.06 as represented by data point 152 in FIG. 19.

Figure 15:
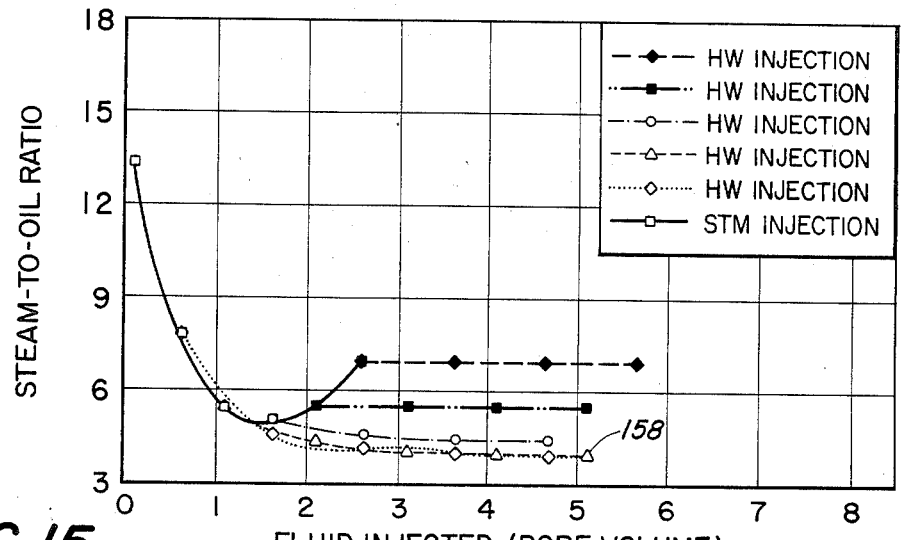
Figure 16:
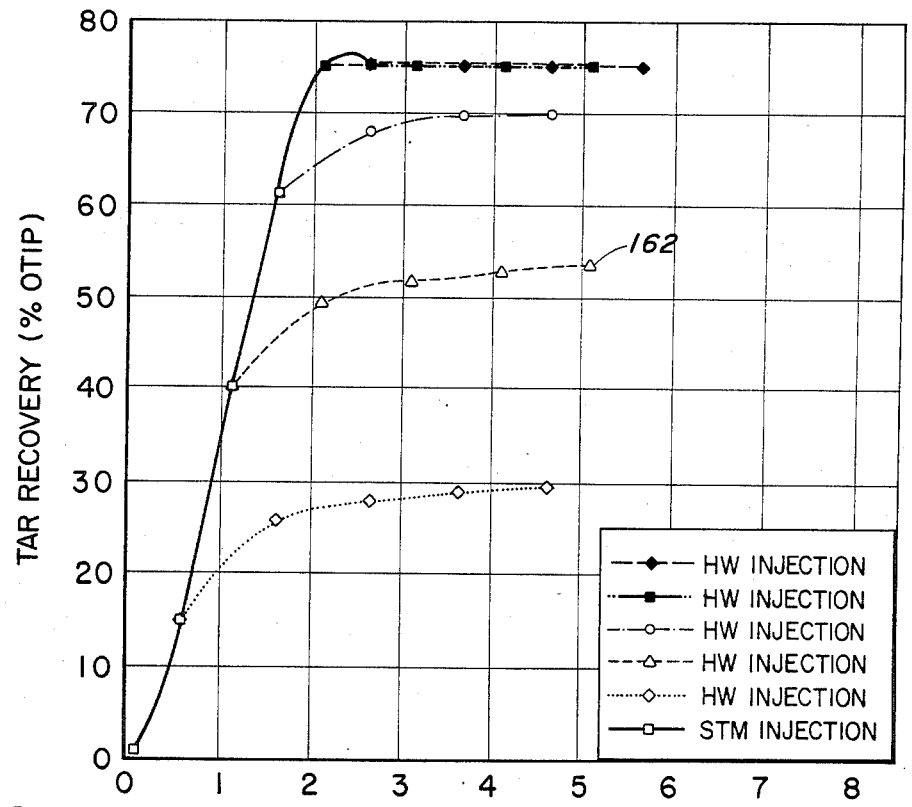

Similar results were obtained in Case 4 as shown in FIGS. 15 and 16 where 10% by volume (1% mol fraction) of n-decane was injected.

However, the net hexane retention, as predicted by the numerical simulation, was 7.3% of the tar produced, in comparison to 10.7% loss when decane was used.

These results suggest that the performance of the solvent enhanced fracture-assisted steamflood process is likely to be improved if more volatile solvents are used. However, it is important to note that using a lighter solvent will tend to increase the tendency for asphaltenes to precipitate from the tar. The net effect of this precipitation is not known, but it is conceivable that in some instances it could be damaging due to formation plugging resulting from the precipitation.

Generally, it can be stated that the solvents useful in the process of the present invention are light hydrocarbon solvents. The solvent may be a paraffinic, aromatic, or naphthenic hydrocarbon or a hydrocarbon mixture.

It should have a low liquid phase viscosity and be miscible in the tar or heavy oil.

The optimum or preferred volatility of the solvent may be dependent on the specific application, but typically, the preferred solvent will have a vapor pressure similar to that of water. That is, over the range of temperature involved, which will range from the natural temperature of the reservoir up to the temperature of the injected steam, it is desired that the solvent be similar to or more volatile than steam. Decane, for example, is relatively similar to steam in its volatility. Hexane has a much higher volatility. Generally, hydrocarbons in the $C_6$ to $C_{14}$ range are preferred.

It is important to note that in practice, a wide range of $C_6$ to $C_{14}$ refinery cuts or blends may be suitable for use. Solvent volatility, blend viscosity, compatibility with the crude oil, and cost will be of principal importance, rather than component purity.

It is preferred that the solvent not be too volatile, because an extremely volatile solvent such as for example methane would never condense when it contacts the heavy oil deposits in the formation.

In addition, as previously mentioned, the solvent selected should not result in sufficient precipitations of solids, such as asphaltenes, from the oil or tar to pose a potential formation plugging problem.

The optimum solvent injection concentration may be application specific, but in many cases it will be in the range of 1% to 15% liquid volume as represented by the graphic data previously described herein.

Case 7: Solvent Injection Schedule

In all of the previous Cases 1-6, solvent was injected throughout the steam injection phase. To determine the effect of the solvent injection schedule, Case 7 considered the situation in which 10% by volume decane was injected with steam during only the first 0.5 pore volume of steam injection.

Figure 21:
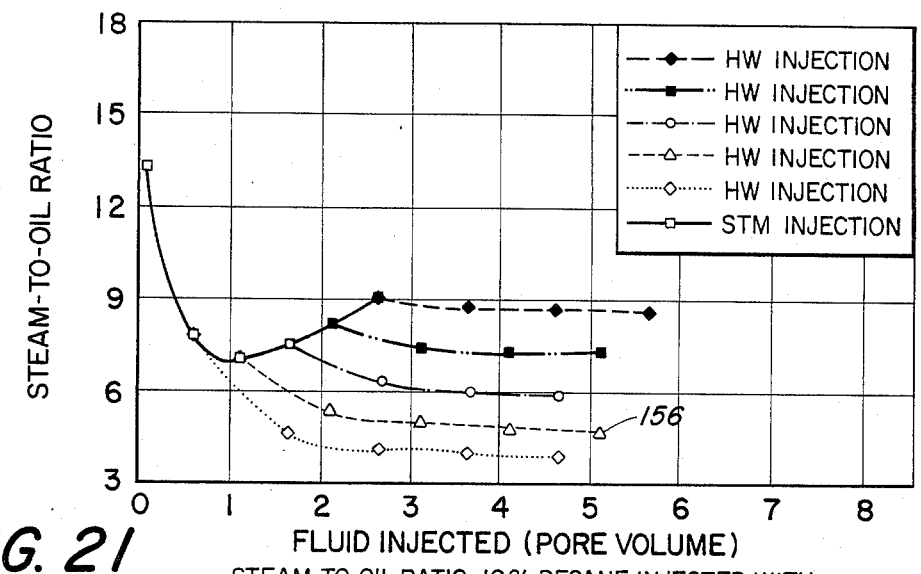
Figure 22:
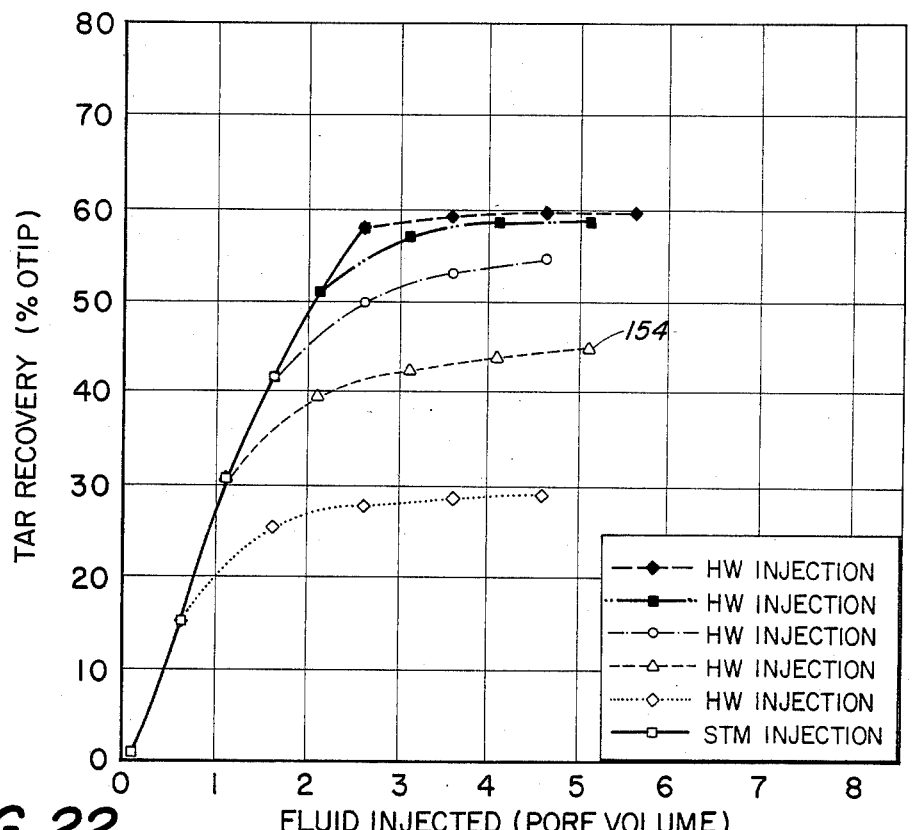

The results of Case 7 are represented by FIGS. 21 and 22. As can be observed from FIGS. 21 and 22, Case 7 resulted in a tar recovery of 45.1% OTIP as represented by data point 154 in FIG. 22, and an SOR of 4.85 as represented by data point 156 in FIG. 21 for the injection of one pore volume of steam-solvent mixture followed by four pore volumes of water.

The total solvent injection in Case 7 is equal to that obtained if solvent is injected continuously at 5 volume percent concentration during the first 1.0 pore volume of steam injection.

Figure 13:
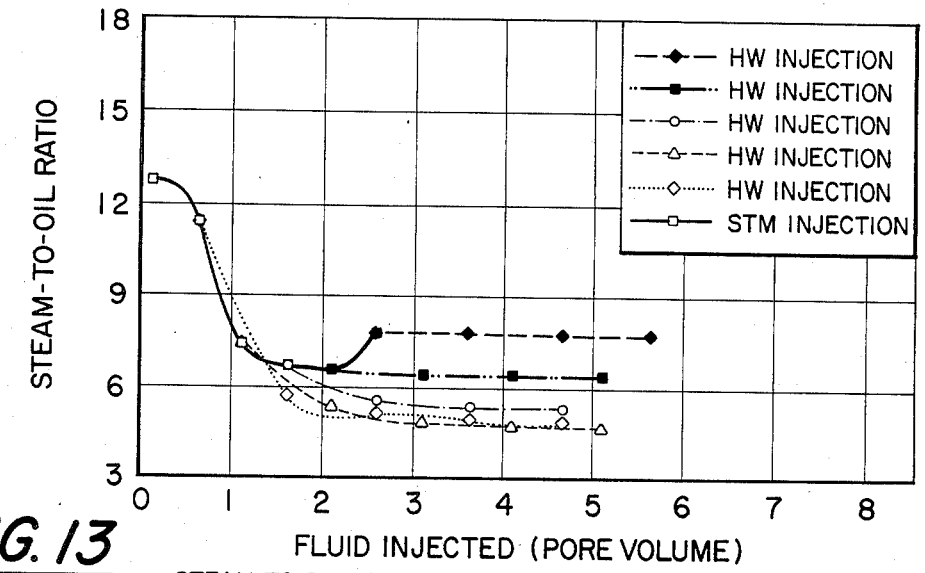
Figure 14:
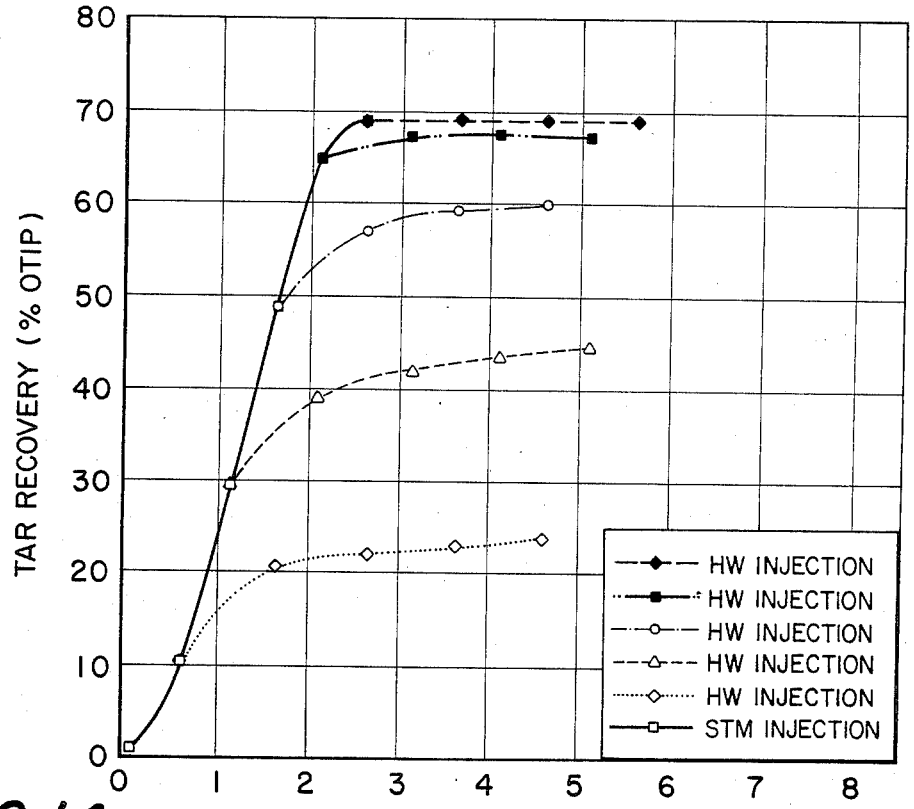

Comparison of the results in FIGS. 21 and 22 for this Case 6 with those for Case 3 in FIGS. 13 and 14 at equal volumes of solvent and steam injection shows that the performances of the two cases are similar. There is a negligible effect on tar recovery and SOR from accelerating the rate of solvent injection if the same total solvent and steam slug volumes are used.

However, the numerical modeling also indicated that the accelerated rate of solvent injection does result in a lower loss of solvent to the formation 18. The net solvent loss in Case 7 for accelerated solvent injection is about 5.1% of tar production, in contrast to the 7.9% loss predicted in Case 3 at an equal volume of steam and solvent injection.

The results of Case 7 can also be compared to those of Case 4, represented in FIGS. 15 and 16, where 10% by volume decane was injected during the first 1.0 pore volume of injection.

Solvent retention in the formation 18 was reduced from 10.7% of the tar produced for Case 4 to 5.1% for Case 7.

The corresponding increase in SOR was marginal, from 4.03 for Case 4 as represented by data point 158 in FIG. 16 to 4.85 for Case 7 as represented by data point 156 in FIG. 21.

This implies that depending upon the ratio of solvent to steam cost, it is possible to achieve an optimum solvent injection schedule which would result in minimum operating costs.

Although the numerical modeling described in the specification has, with the exception of Case 7, been based on continuous injection of a solvent and steam mixture, the present invention in its broadest aspects is not so limited. It is generally contemplated that solvent may be injected before, during, or after steam injection, and solvent may be introduced either continuously or intermittently. In any given use of the present invention, one particular steam injection schedule may be more effective than another. Generally, it is only required that the steam and solvent be injected in such a manner that the solvent will be effectively transported throughout the formation to condense and mix with the heavy oil deposits as generally described above with regard to FIGS. 1-4.

Case 8: Steam Injection Through The Fracture Only

In all the Cases 1-7 considered so far, steam and hot water were injected over the entire reservoir interval through the perforations 64 as seen in FIG. 4 which also of course included injection into the horizontal fracture system 62.

In the present Case 8, steam and 10% by volume decane were injected at the central injection well 22 only through the horizontal fracture system 62, while the heat-scavenging hot water was injected over the entire reservoir interval. In other words, this Case 8 represents a situation where the injection well 22 is not perforated until after the steam-solvent injection phase is completed.

Figure 23:
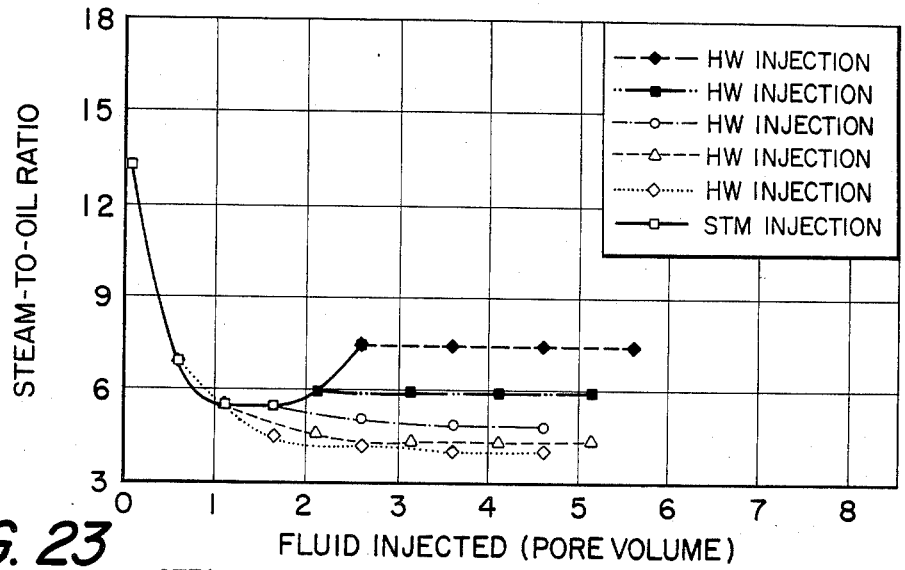
Figure 24:
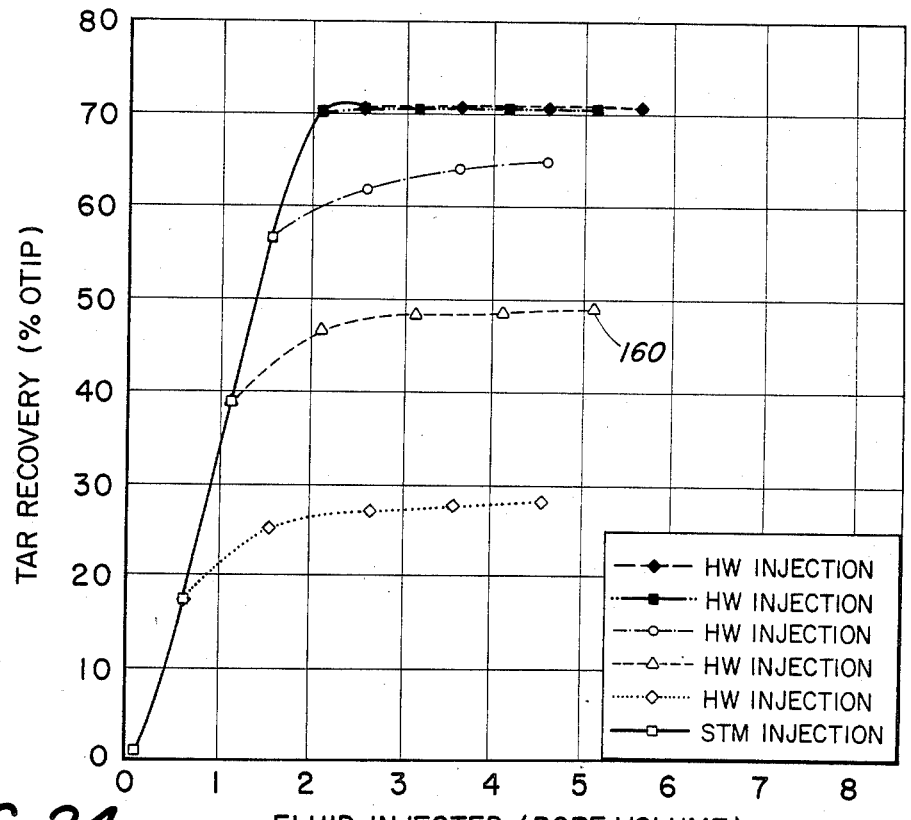

The results of Case 8 are represented in FIGS. 23 and 24. A comparison of these results with those for Case 4, seen in FIGS. 15 and 16, shows that there is approximately 10% less tar recovered when steam-solvent injection is made through the horizontal fracture system 62 only.

This is shown, for example, by comparing data point 160 in FIG. 24 which corresponds to a tar recovery of approximately 49% OTIP to data point 162 in FIG. 16 which corresponds to a recovery of approximately 54% OTIP.

Thus, it is preferable when using the process of the present invention that the injection well 22 be perforated as indicated at 64 in FIG. 4 over substantially the entire interval of the formation 18 prior to beginning the steam-solvent injection phase. As indicated, this results in an increase in production of oil as compared to the situation represented in Case 8 where the steam-solvent mixture is injected only into the horizontal fracture system 62.

Also, it should be noted that in some instances it may be desirable to only perforate the injection well 22 over a substantial portion of the entire interval of formation 18. This is particularly true in the case of a relatively thick formation, for example a formation having a thickness of 80 to 90 feet, in which case it may be desired to only perforate a substantial sub-interval near the fracture system 62.

Cases 9 and 10: Three-Dimensional Model Grid

Cases 1-8 all employed a two-dimensional reservoir model as previously described. The oil recovery predicted by the two-dimensional simulations was corrected using a 0.85 areal sweep efficiency factor.

Figure 27:
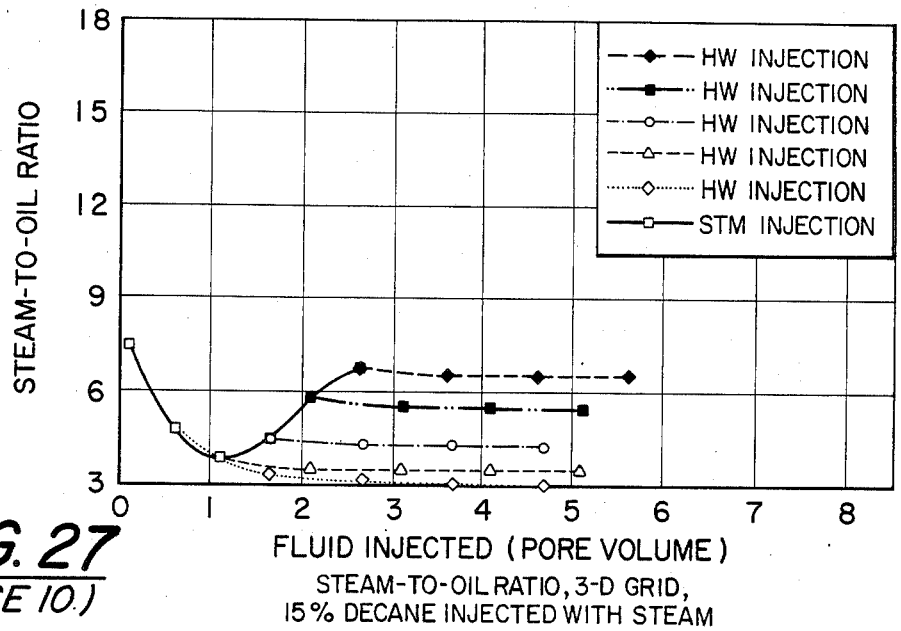
Figure 28:
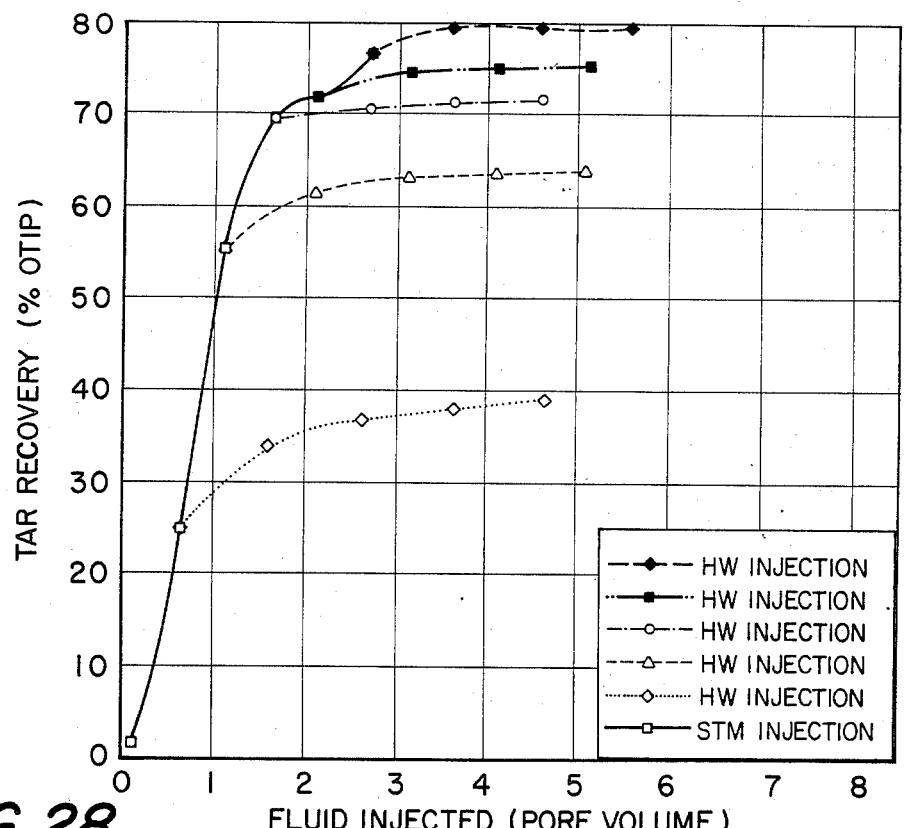

Two simulations were made with a three-dimensional reservoir model to estimate the accuracy of the areal sweep efficiency correction assumed for the two-dimensional results. The three-dimensional model results for 10% and 15% by volume decane injection with steam, corresponding to the two-dimensional simulations in Cases 4 and 5, are given in FIGS. 25, 26, 27 and 28. FIGS. 25 and 26 correspond to Case 9 for 10% decane injection, and FIGS. 27 and 28 represent Case 10 for 15% decane injection.

Comparison of these results with the corresponding two-dimensional models represented by FIGS. 15, 16, 17 and 18, show that the three-dimensional models predict higher tar recoveries and lower SOR's, than did the two-dimensional model. The three-dimensional numerical model also predicted lower solvent retentions in the reservoir than did the two-dimensional model. Thus, the corrected two-dimensional model results presented above for Cases 1-8 appear to be conservative.

Comparison Of Present Invention To Conventional Matrix Drive Type Steam Flooding The analysis of the results summarized in FIG. 29 and particularly the comparison of those results to Base Case 1 shown in FIGS. 9 and 10, shows the significant improvement obtained when solvent is included with injected steam in the basic fracture assisted steamflood technology previously developed by the assignee of the present invention.

The surprising extent of this improvement, however, is best appreciated by comparing the kind of improvements and degree of improvements achieved by the solvent-enhanced, fracture-assisted steamflood process of the present invention to the results achieved with a conventional prior art matrix drive type of steamflood process utilizing solvent.

In order to make this comparison, a conventional prior art matrix drive type of steamflood process, utilizing injected solvent, has been numerically simulated to provide comparative data.

Description Of The Numerical Modeling Of Conventional Steamflood

The numerical modeling of a conventional matrix drive type steamflood process was conducted in a fashion similar to that previously described for the numerical modeling of the process of the present invention.

This conventional matrix drive type steamflood process was, however, modeled for a different formation than the Saner Ranch formations.

It will be appreciated by those skilled in the art that a formation like that found at the Saner Ranch and previously described which has very high viscosity tar deposits is simply not significantly affected by a conventional matrix drive type steamflood process. If a conventional matrix drive type steamflood process were applied to the heavy tar formations found at the Saner Ranch, there would be essentially no improvement in production, because these formations are essentially impenetrable by a conventional matrix drive type steamflood.

In order to obtain comparative data, it was necessary to model the conventional matrix drive type steamflood process in a more permeable formation having relatively lighter hydrocarbon deposits of the type which can be effectively produced through a conventional matrix drive type steamflood. It will be appreciated that this comparison is a conservative one, because the improvement of the techniques of the process of the present invention as compared to a conventional matrix drive type steamflood process would be even greater if the conventional matrix drive type steamflood process were attempted in the heavy tar deposits like those found at the Saner Ranch.

The formation modeled for the conventional matrix drive type steamflood process was one in the Cat Canyon field in southern California.

The numerical modeling was based upon an inverted five-spot pattern. A one-eighth symmetry element was utilized for the numerical modeling.

The one-eighth symmetry element was represented by a two-dimensional, equal-volume areal grid system similar to that previously described with regard to FIGS. 6, 7 and 8.

Reservoir properties used for simulation of the thermal operations in the Cat Canyon field were employed in this study and are given in the following Table VI.

TABLE VI

| HEAVY OIL RESERVOIR PROPERTIES | |
|---|---|
| Pay Thickness | 80 feet |
| Porosity | 0.28 |
| Compressibility | $75 \times 10^{-6}$ psi$^{-1}$ |
| Permeability | |
| Horizontal | 1000 md |
| Vertical | 100 md |
| Rock Heat Capacity | 35 Btu/ft$^3$-°F. |
| Rock Thermal Conductivity | 33.6 Btu/day-ft-°F. |
| Over-/Under-Burden Heat Capacity | 35 Btu/ft$^3$-°F. |
| Over-/Under-Burden Thermal Conductivity | 33.6 Btu/day-ft-°F. |

Figure 39:
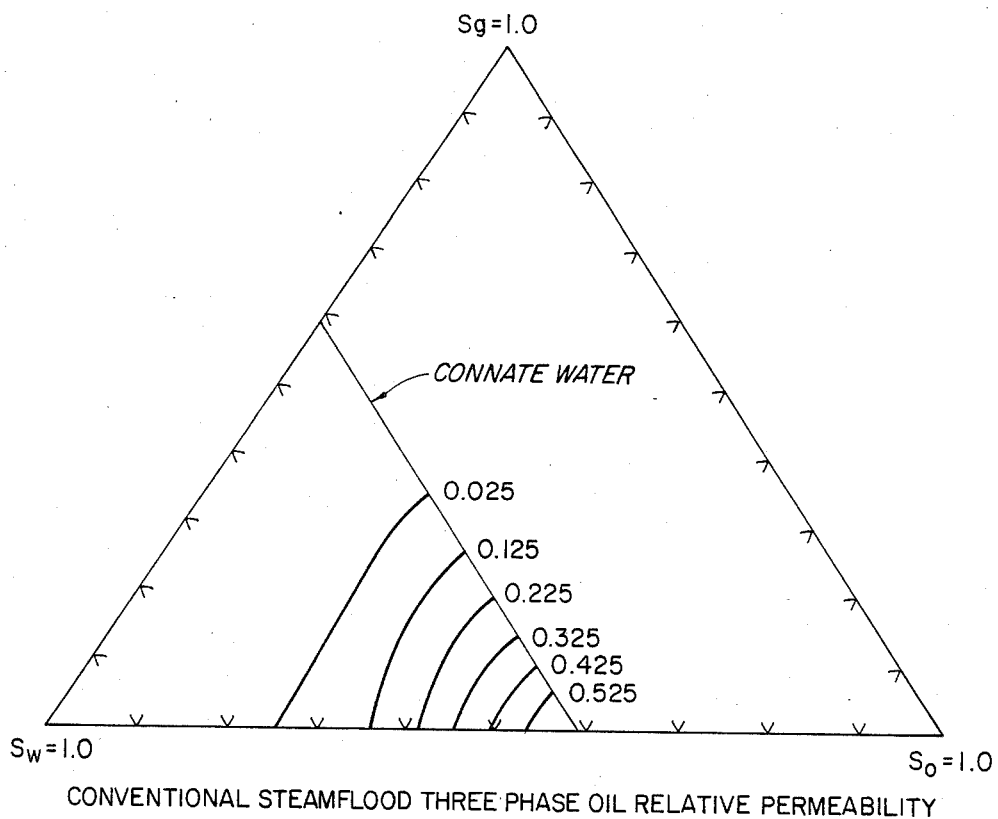
FIG. 39 is a graphical representation of the three-phase oil relative permeability for the formation upon which the numerical modeling for the conventional matrix drive type steamflood process was based.

The oil-water, gas-oil, and three-phase oil relative permeability diagrams are given in FIGS. 37-39, respectively.

These relative permeability relations represent Cat Canyon core data at 350° F. It is noted that FIG. 39 shows that a residual oil saturation (neglecting effects of oil volatility) on the order of 0.20 can be expected at steamflood conditions.

Cat Canyon field has multiple oil reservoirs stacked on top of each other. The oil properties vary considerably from interval to interval, generally decreasing in API gravity and increasing in viscosity with increasing reservoir depth. A heavy, very viscous oil, characteristic of the lower Basal Reservoirs, was used as the prototype for this study. It was modeled as a 6.8 percent volume fraction decane/tar blend with properties as shown in the following Table VII and in FIG. 36.

TABLE VII

COMPARISON OF THE PROPERTIES OF CAT CANYON CRUDE OIL AND A 6.8 VOLUME PERCENT DECANE/TAR BLEND

| | Cat Canyon Crude Oil | 6.8 Volume Percent Decane/Tar Blend |
|---|---|---|
| Gravity, °API | 9.5 | 6.2 |
| Gravity, Specific, 60/60° F. | 1.0035 | 1.027 |
| Viscosity, Kinematic, cs | | |
| at 130° F. | 8,346 | 6,907 |
| at 150° F. | 3,159 | 2,949 |
| at 210° F. | 306 | 389 |

| ASTM Distillation, 760 mm Hg. °F. at Vol % Recovered | TEMPERATURE, °F. | |
|---|---|---|
| Vol. % | Actual | Simulated |
| IBP | | |
| 5 | 492 | 540 |
| 10 | 558 | 580 |
| 15 | — | 640 |
| 20 | 713 | 700 |
| 25 | — | 750 |
| 30 | 850 | 844 |

General Explanation Of A Conventional Matrix Drive Type Steamflood Process

As will be apparent from the numerical simulation data for the conventional matrix drive type steamflood process discussed below, there are many significant and unexpected differences in the effect of the additional solvent to a fracture-assisted steamflood process as compared to the effect of adding solvent to a conventional matrix drive type steamflood process.

It is believed that these differences can be explained due to the different manner in which the vaporized solvent is transported into and the manner in which heavy oil and condensed solvent are produced from the formation by the two processes.

The process of the present invention has previously been explained in detail with reference to FIG. 4 of the present application.

Figure 40:
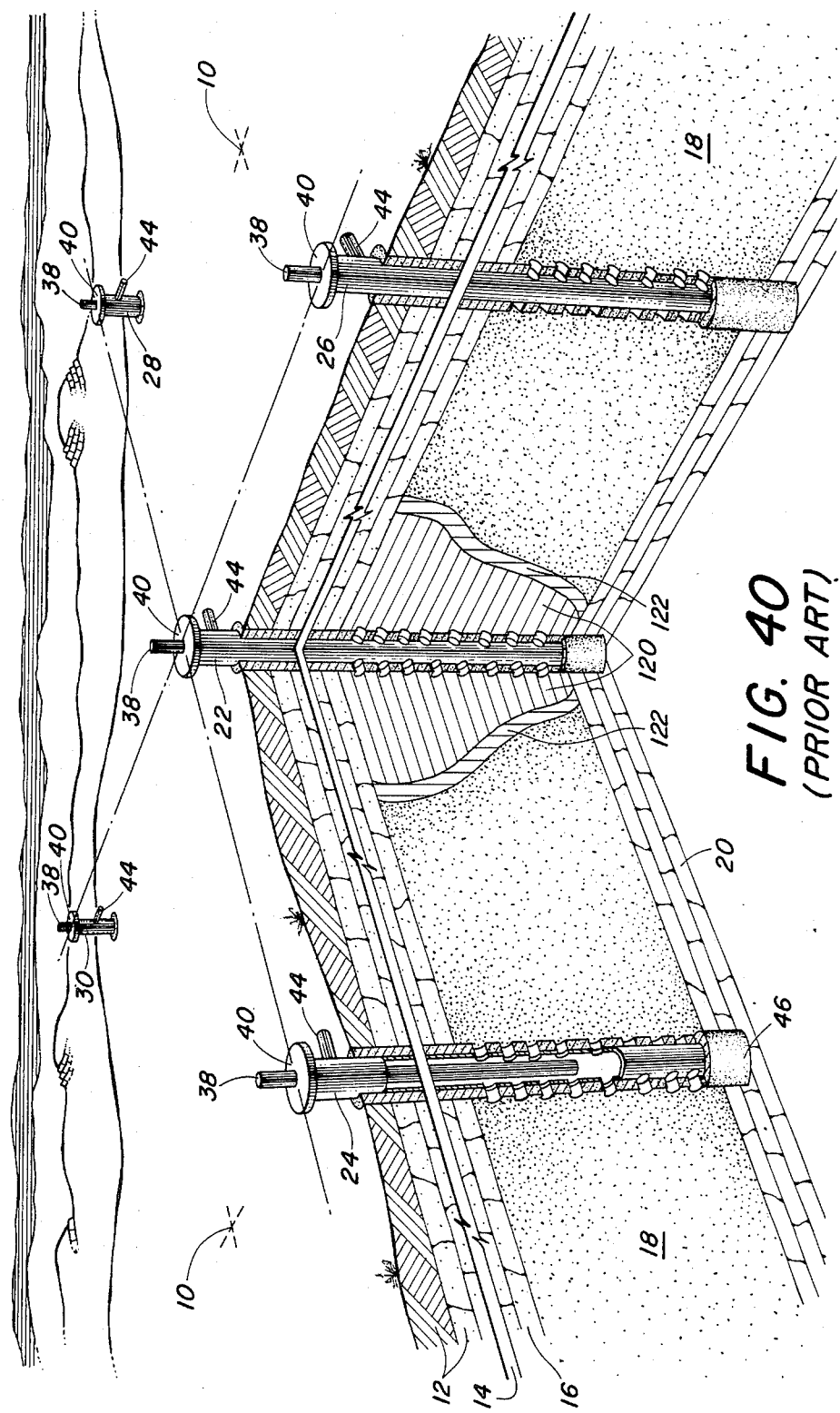
FIG. 40 illustrates in a semi-schematic fashion, similar to that of FIGS. 1-4, a conventional prior art matrix drive type steamflood process wherein solvent is injected with steam, at an early stage in the steam injection process.
Figure 41:
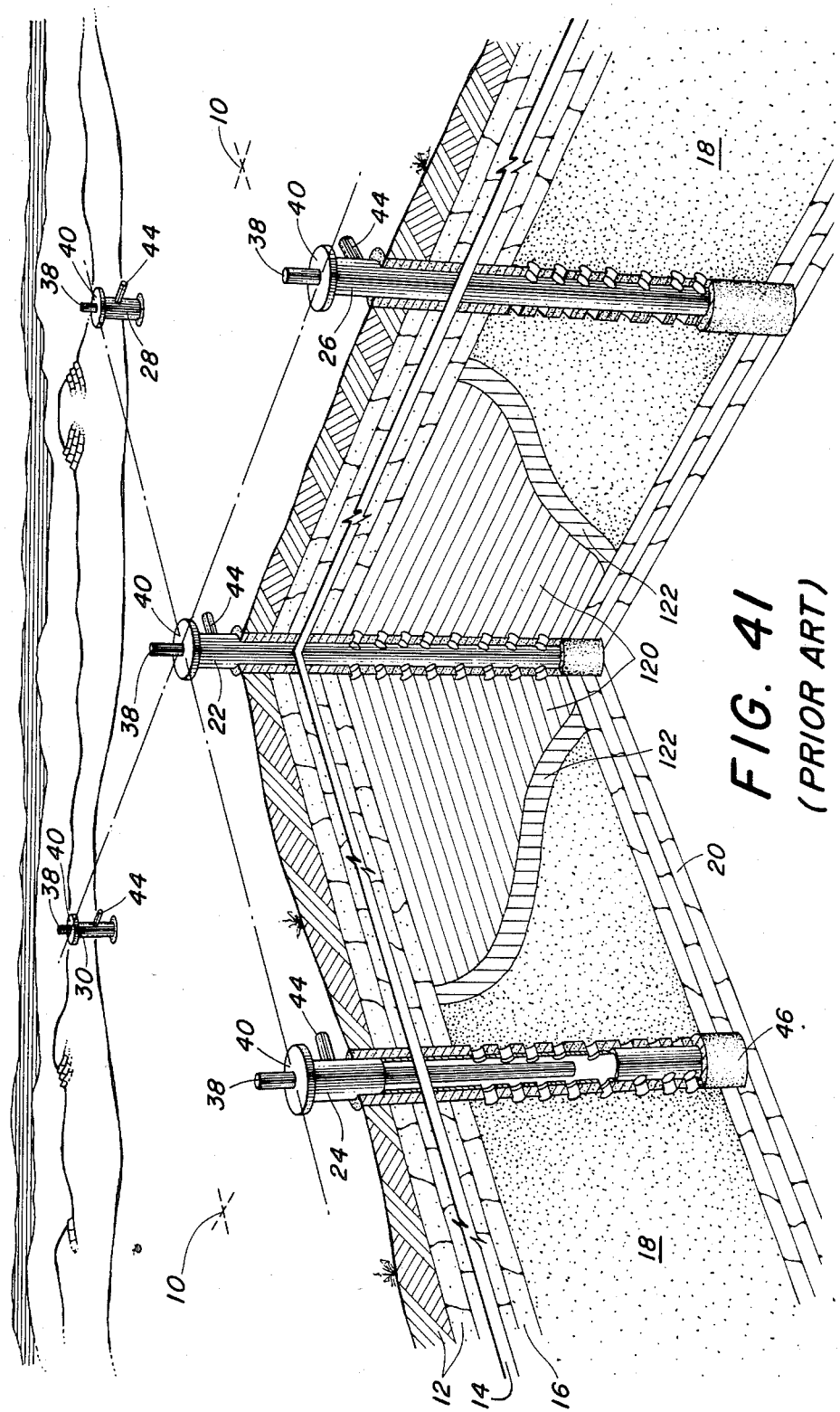
FIG. 41 illustrates the process of FIG. 40 at a more advanced intermediate stage during the steam injection.
Figure 42:
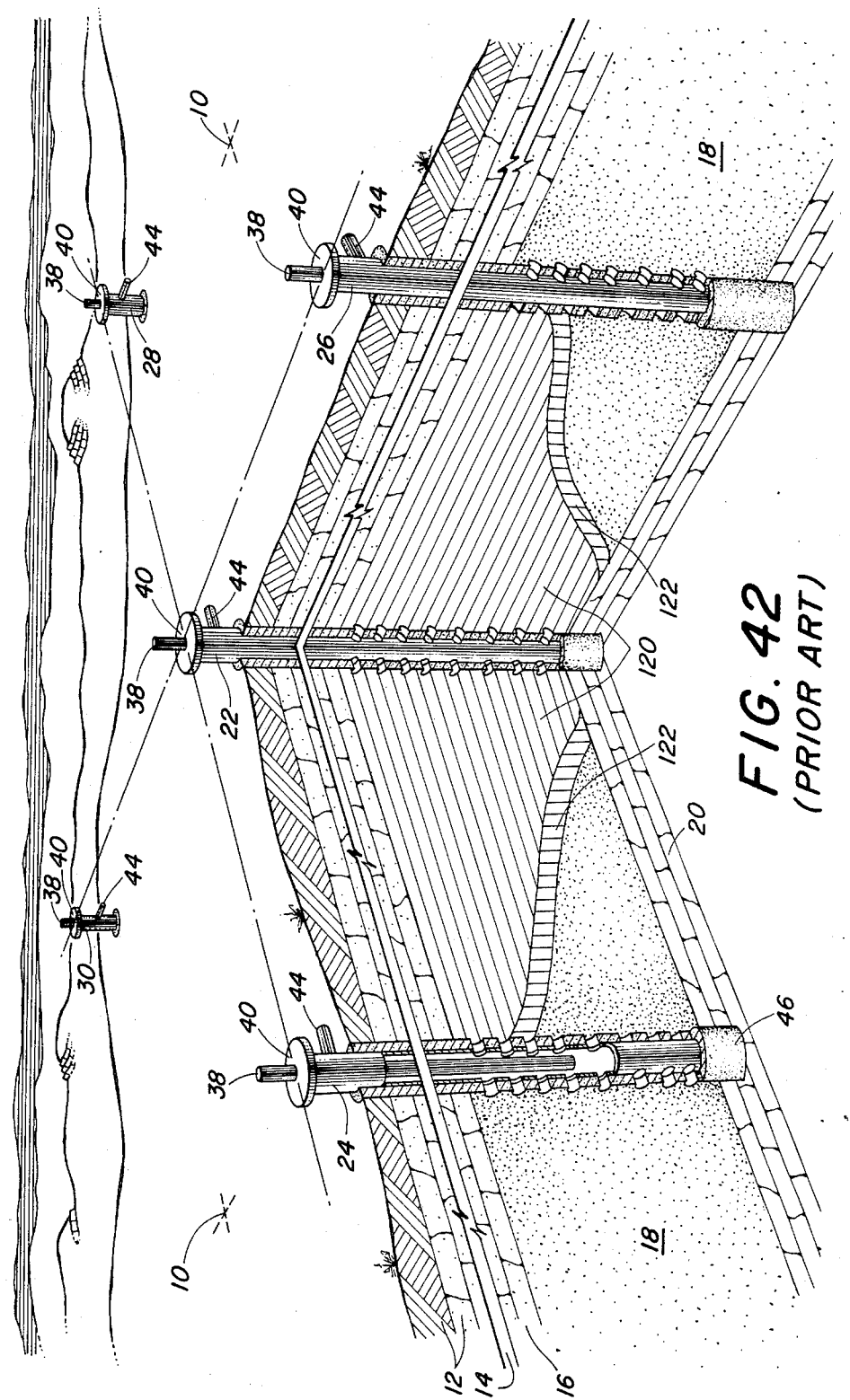
FIG. 42 illustrates the process of FIGS. 40 and 41 at a yet further advanced stage in the steam injection process wherein the steam bank has broken through to the producing wells at an upper portion of the formation.

A typical prior art matrix drive type steamflood process, on the other hand, transports solvent into the formation 18 in a very different way as is illustrated in FIGS. 40, 41 and 42.

FIG. 40 schematically represents the initial stages of a conventional matrix drive type steamflood process where vaporized solvent is being injected with steam into the central injection well 22.

Both the central injection well and all of the outlying producers have been perforated along substantially the entire vertical interval of the formation 18.

With the conventional matrix drive steamflood process, the steam and vaporized solvent injected into the formation 18 from the well 22 along the entire vertical interval of the formation 18 tend to move upward within the formation 18 due to gravitational effects forming a steam chest 120 made up of a uniform mixture of vaporous steam and solvent.

Since this vaporous mixture of steam and solvent tends to gravitate upwardly within the formation 18, the steam chest 120 tends to bulge radially outwardly from injection well 22 at its upper end as shown in FIGS. 40–42.

The solvent vapor in the steam bank 120 will condense when it contacts relatively cold heavy oil deposits in the formation 18 and forms a liquid solvent bank 122 in front of the advancing steam chest 120.

FIG. 41 schematically shows this conventional matrix drive steamflood process at an intermediate stage where the steam chest 120 has expanded radially outward, particularly in the upper regions thereof, and has also begun growing downward toward the lower portions of the formation 18.

This process continues until as shown in FIG. 42 the steam chest 120 finally breaks through to the outer production wells such as 24 and 26. At this point, the vaporous steam and solvent mixture of steam chest 120 tends to bypass the remaining portions of the formation 18 and flow directly through the upper portions of the formation 18 from the injection well 22 to the outlying production wells.

As can also be appreciated, the path of the vaporized solvent shown in zone 122 tends to be substantially entirely across the upper portions of the formation 18 so that there is relatively little contact of the solvent with the heavy oil deposits in the lower portions of the formation 18.

In the conventional matrix drive type of steamflood process illustrated in FIGS. 40–42, pressure within the subsurface formation 18 builds up, particularly within the steam chest area 120, and pushes the oil toward the producing wells. Once the upper finger or bulge portion of the steam chest 120 breaks through to the production wells as illustrated in FIG. 42, however, the pressure within the steam chest 120 drops rapidly and there is no significant further pushing of oil toward the production wells. As is apparent in FIG. 42, the lower portions of formation 18 closest to the producing wells will generally not be effectively swept by the conventional matrix type steamflood process.

Thus, the use of solvent in a conventional matrix drive type of steamflood process tends to contact the solvent with the heavy oil deposits in a very inefficient manner, particularly as compared to the present invention.

With that general explanation of the mechanism by which a conventional matrix drive type steamflood process transports solvent into the formation and produces heavy oil and solvent from the formation, the data generated by the numerical simulations for the conventional process will be presented.

After the presentation of the results of the numerical modeling of the conventional matrix drive type steamflood process, a more detailed comparison of the present invention to the conventional matrix drive type process is provided along with a further explanation as to the reasons for the differences in results achieved by the two processes based upon the different mechanisms by which the two processes transport solvent into a formation and produce heavy oil and solvent from the formation.

Results Of Numerical Simulation Of Conventional Matrix Drive Type Steamflood Process With Solvent Six different cases were modeled for the conventional matrix drive type steamflood process to show the effects of varying the amount of solvent, and also to determine the effect of varying the composition of the solvent. A summary of these six cases is shown in the following Table VIII.

TABLE VIII

SUMMARY OF STUDY OF CONVENTIONAL PROCESS

| Case | SOLVENT Concentration % | Type | Remarks |
|---|---|---|---|
| 11 | 0 | N/A | Base Case; No solvent |
| 12 | 5 | Decane | To determine effect of solvent concentration |
| 13 | 10 | Decane | |
| 14 | 15 | Decane | |
| 15 | 10 | Hexane | To study the effect of solvent composition |
| 16 | 10 | Tetradecane | |

Case 11: Base Case-No Solvent Injection (Conventional Process)

In Case 11, pure steam was injected into the formation in a conventional matrix drive type steamflood process to provide a base case. The SOR and percentage of heavy oil recovery for Case 11 are displayed in FIGS. 43 and 44, respectively.

Figure 43:
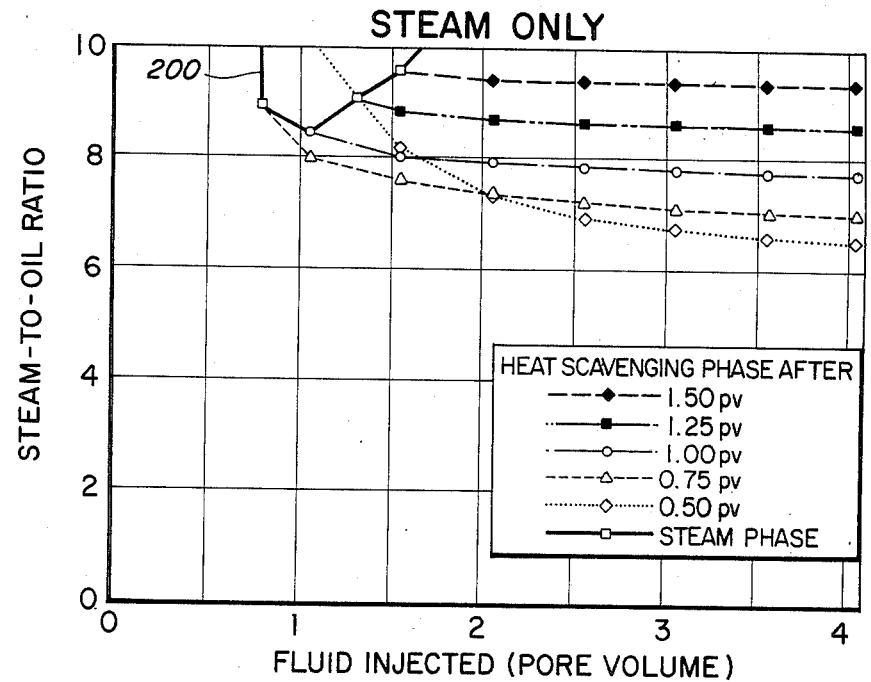
FIGS. 43-65 are graphical representations of the results of various numerical simulations of a conventional matrix drive type steamflood process utilizing solvent. These are provided for comparison to the data representative of the process of the present invention to show the dramatic and unexpected improvements achieved with the present invention.
Figure 44:
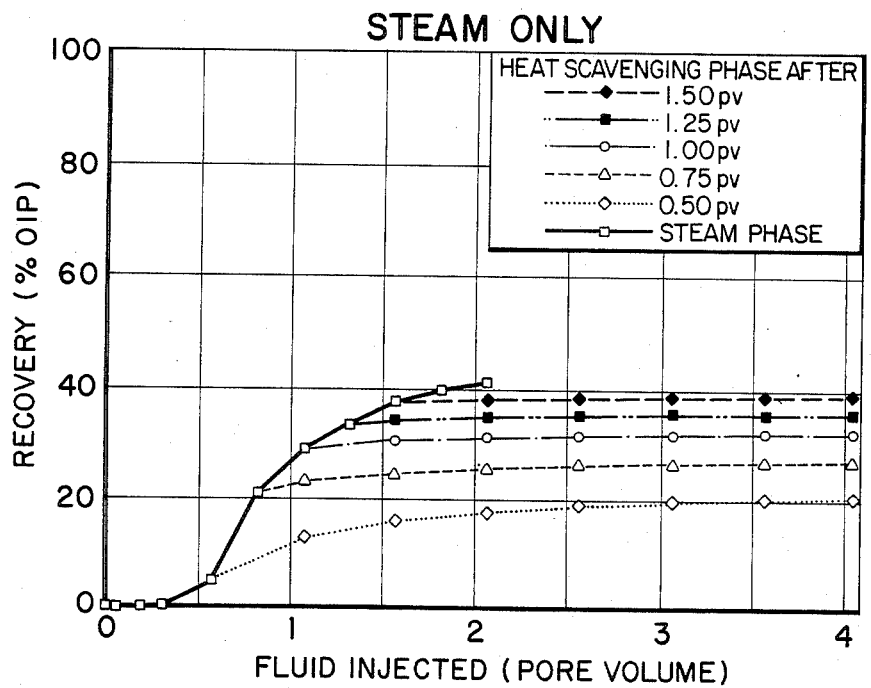
Figure 45:
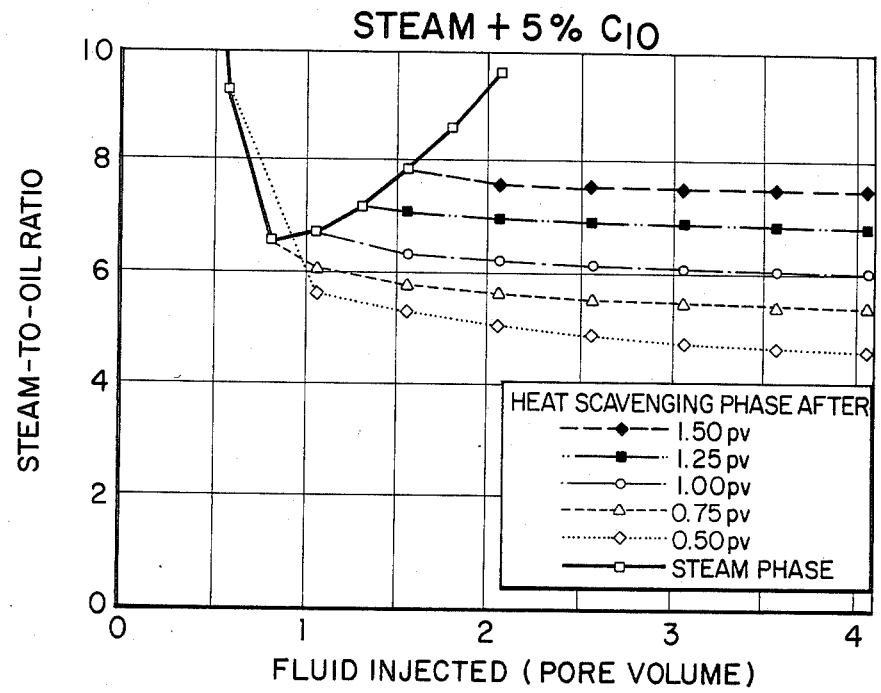
Figure 46:
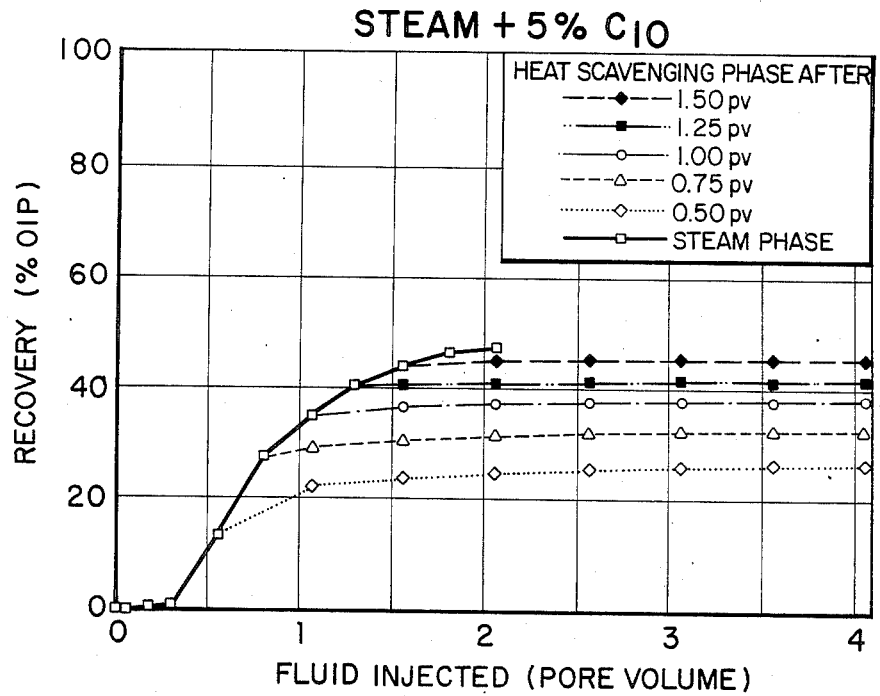

The data in FIGS. 43 and 44, and in the similar FIGS. 45-53 and 57-62 is displayed in a manner similar to that previously described for FIGS. 9-28.

Each figure displays a schedule explaining the meaning of the various data point symbols displayed on the graphs. Thus, in FIG. 43, the solid line 200 connecting the open square data points represents the steam injection phase of the process. The various dashed or broken lines connecting the other data points represent the injection of heat-scavenging water in increasing amounts after the prior injection of a designated amount of steam.

In that regard, it is noted that normally a heat-scavenging water phase is not utilized with a conventional matrix drive type steam injection process.

For the purposes of the present disclosure, in order to make certain that a fair comparison was being presented between the numerical simulations for the solvent enhanced fracture-assisted steamflood process of the present invention and the simulations for the conventional process, a heat-scavenging water injection phase was added to the conventional process after the steam injection phase. As is apparent from the data, however, there is relatively little added benefit from the heat-scavenging phase when the amount of steam injected exceeds about 0.75 to 1.0 pore volumes. There is some benefit for lower volumes of steam injection.

Cases 12-14: Effect Of Solvent Concentration

Decane injection concentrations of 5, 10 and 15 volume percent were used to determine the effect of solvent concentration on the performance of the conventional matrix drive type steamflood process utilizing solvent.

Again, these solvent concentrations are stated in terms of a liquid solvent equivalent.

In Case 12, 5% by volume of decane was injected with steam. The SOR and the percentage of heavy oil recovery for Case 12 are displayed in FIGS. 45 and 46, respectively.

Figure 47:
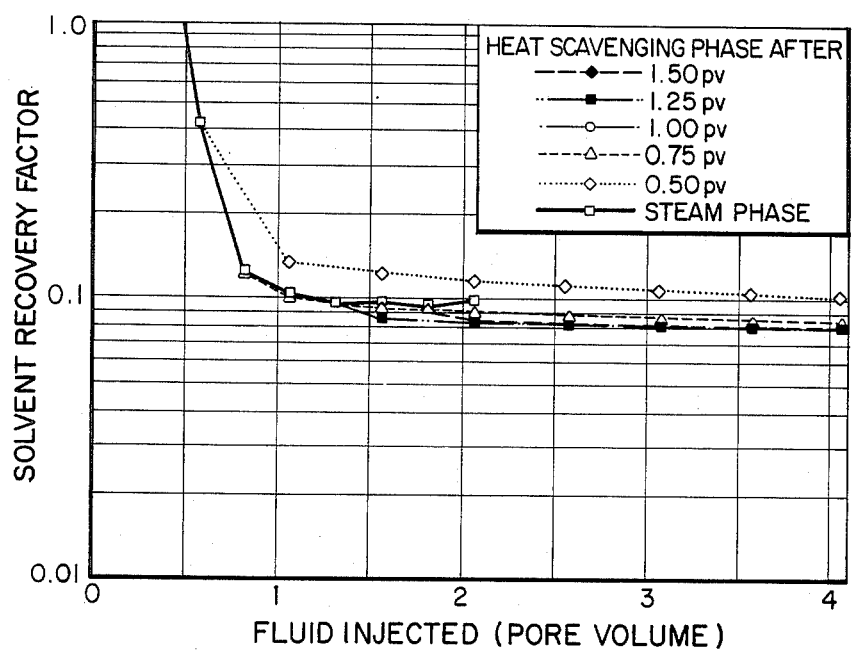
Figure 48:
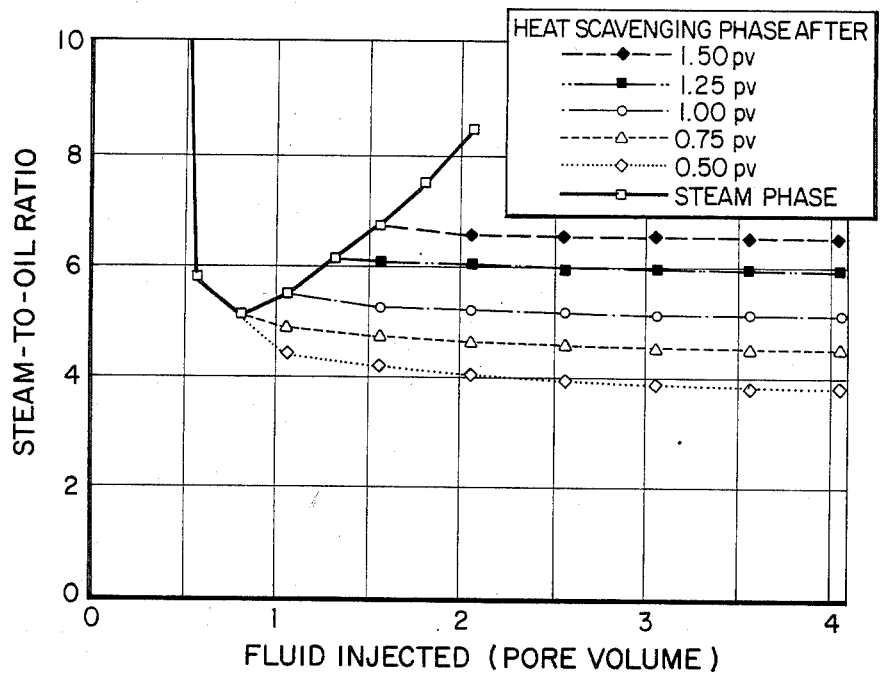
Figure 49:
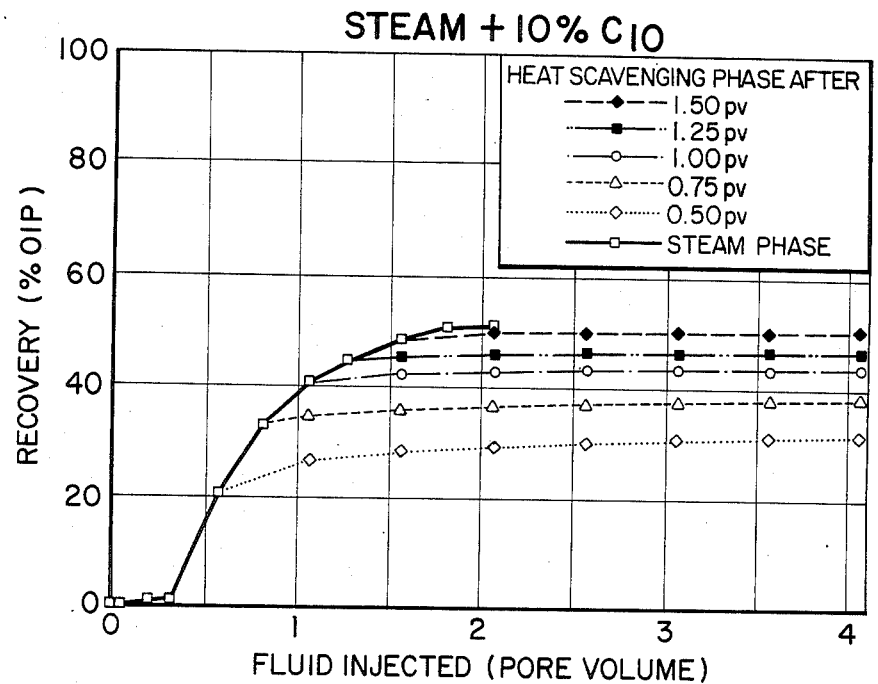
Figure 50:
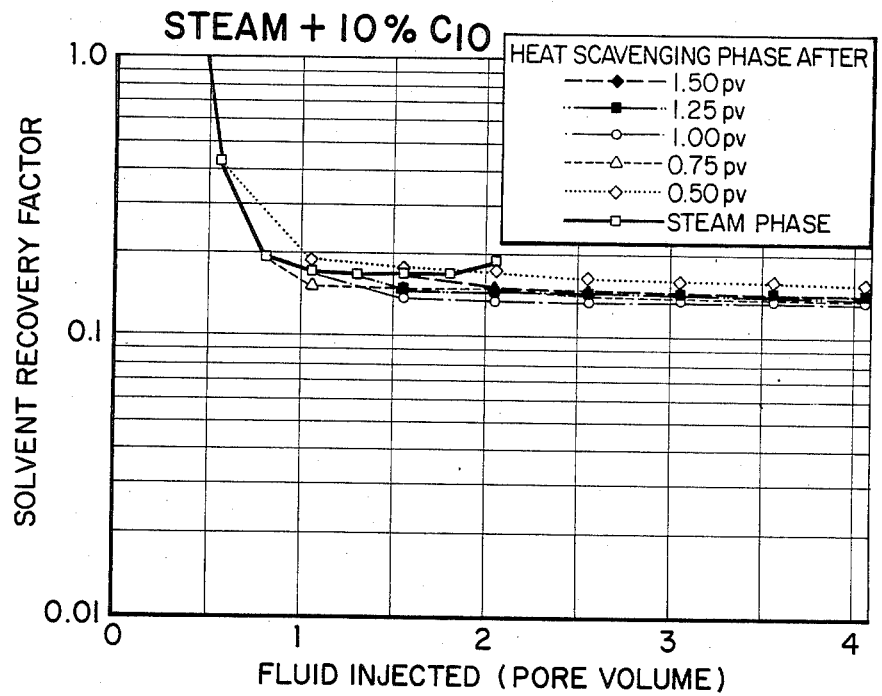
Figure 51:
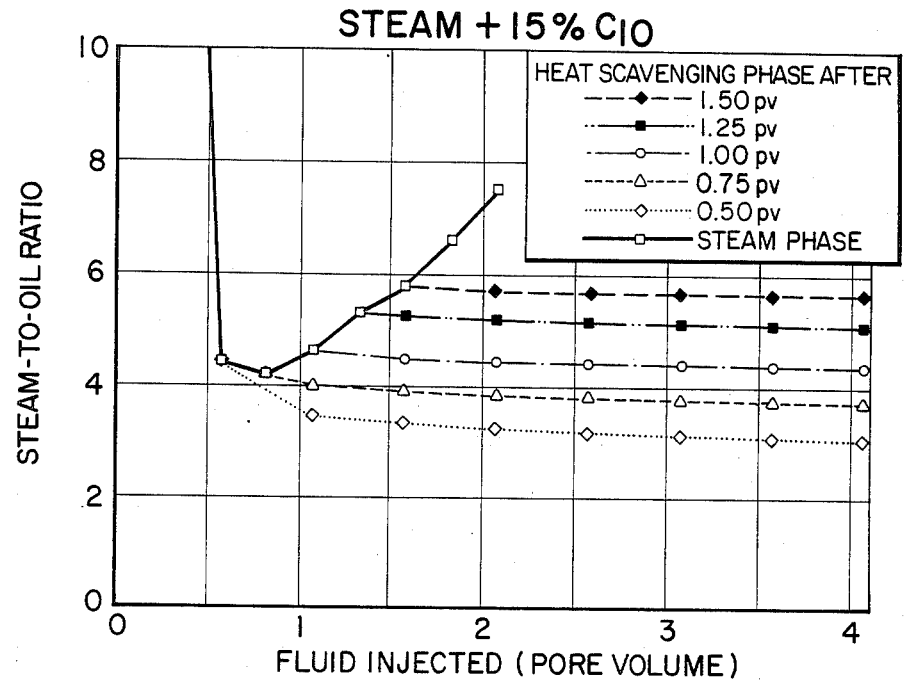
Figure 52:
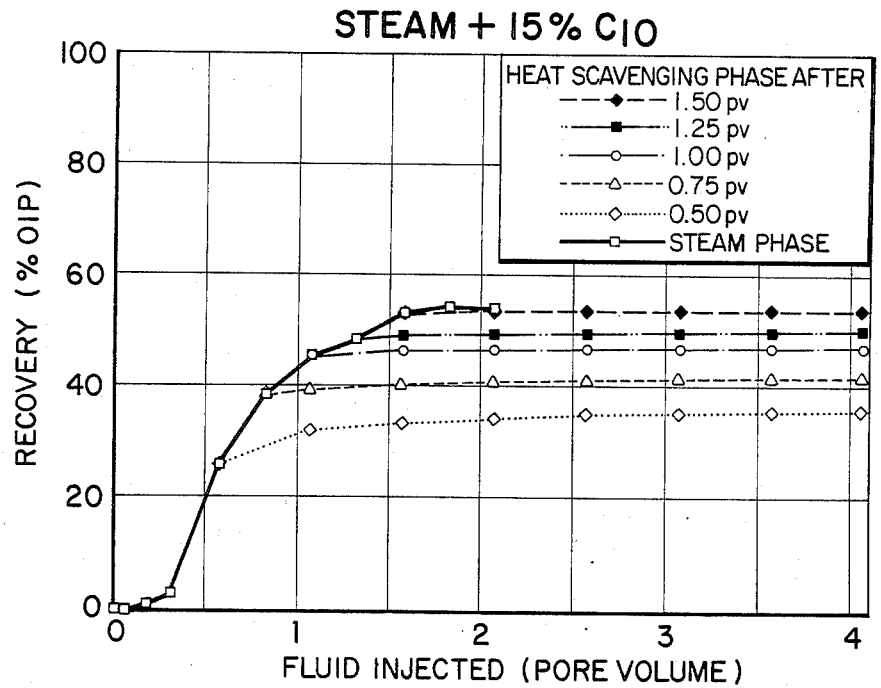
Figure 53:
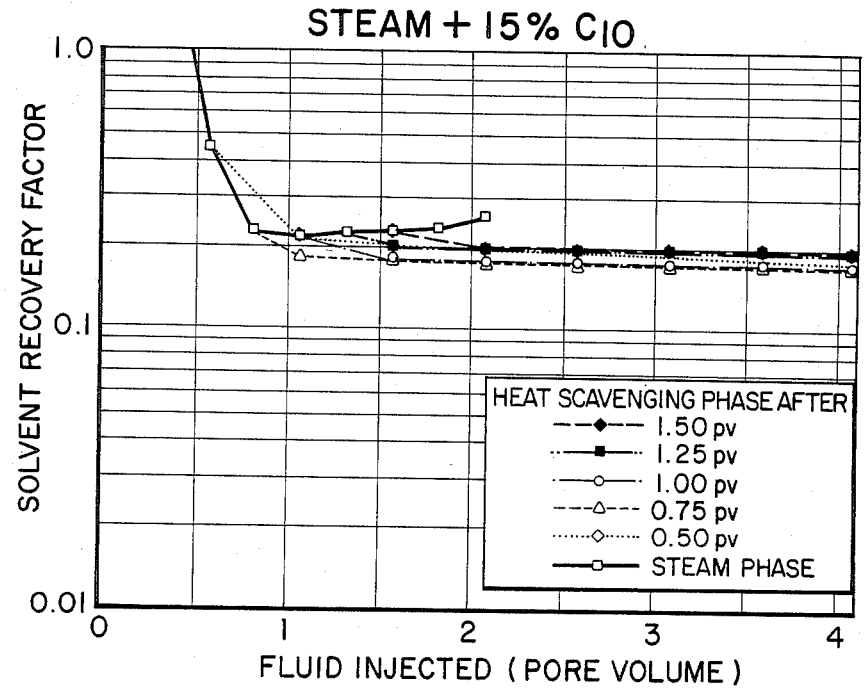

Additionally, FIG. 47 displays the solvent recovery factor for Case 12 as a function of the volumes of steam and heat-scavenging water injected. The solvent recovery factor is displayed on the vertical scale in a logarithmic fashion and represents the amount of injected solvent which is ultimately lost to the formation and not recoverable. This solvent recovery factor is expressed in terms of bbl. of solvent retained in the formation per bbl. of tar produced.

In Case 13, 10% by volume of decane was injected with steam. The SOR, percentage of heavy oil recovery, and solvent recovery factor for Case 13 as a function of the fluid injection schedule are displayed in FIGS. 48, 49 and 50, respectively.

In Case 14, 15% by volume of decane was injected with steam. The SOR, percentage of heavy oil recovery, and solvent recovery factor as a function of the fluid injection schedule for Case 14 are displayed in FIGS. 51, 52 and 53, respectively.

Figure 54:
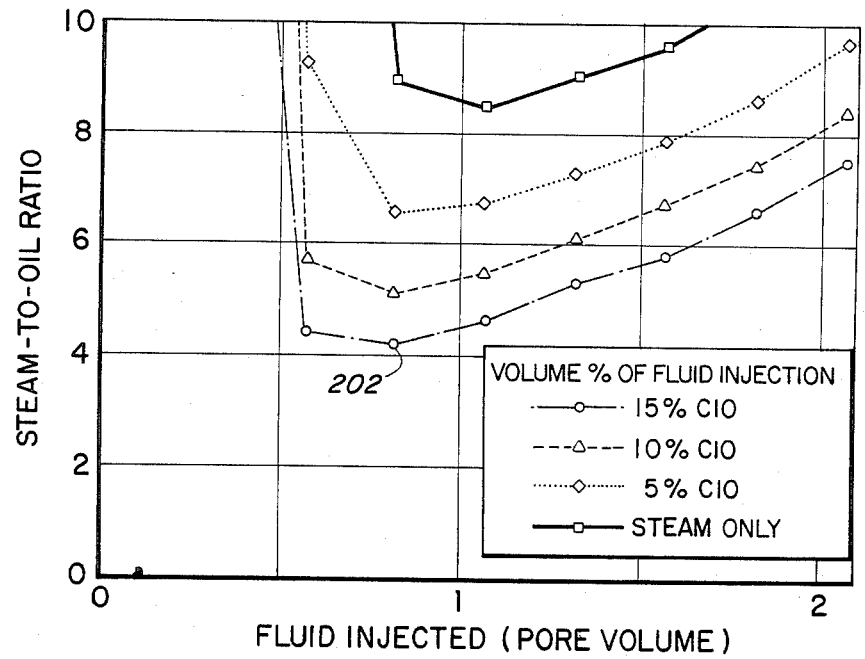
Figure 55:
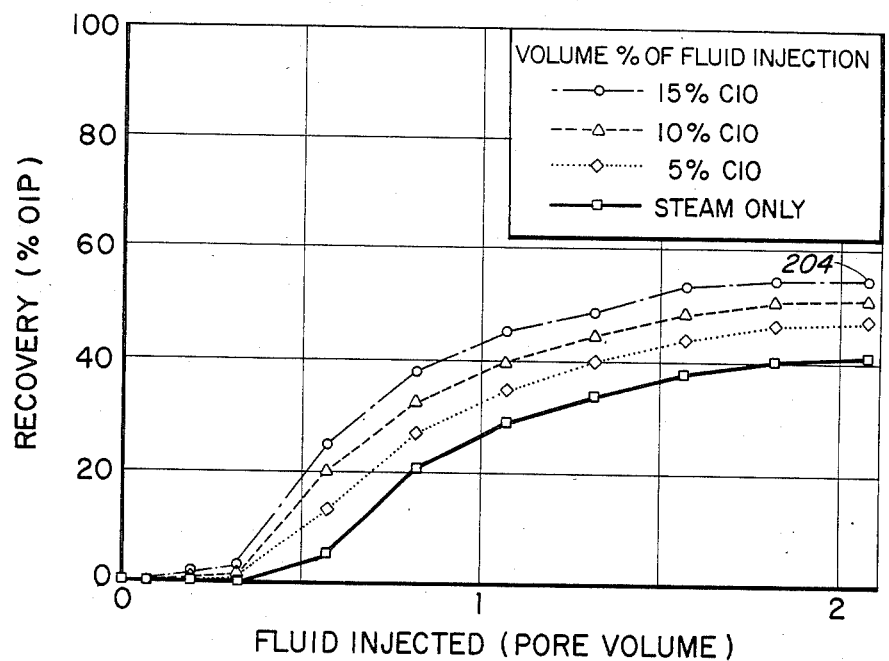
Figure 56:
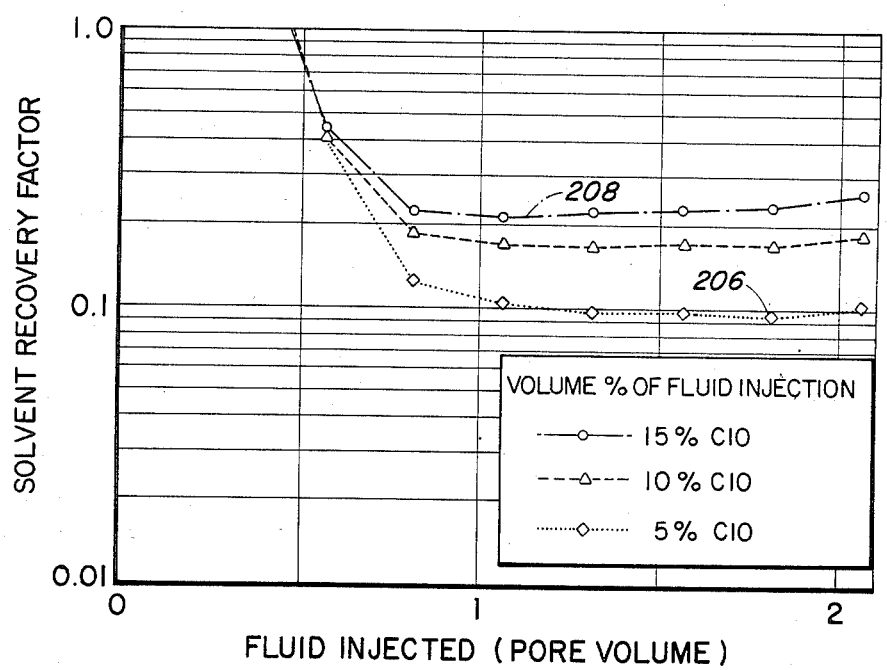
Figure 57:
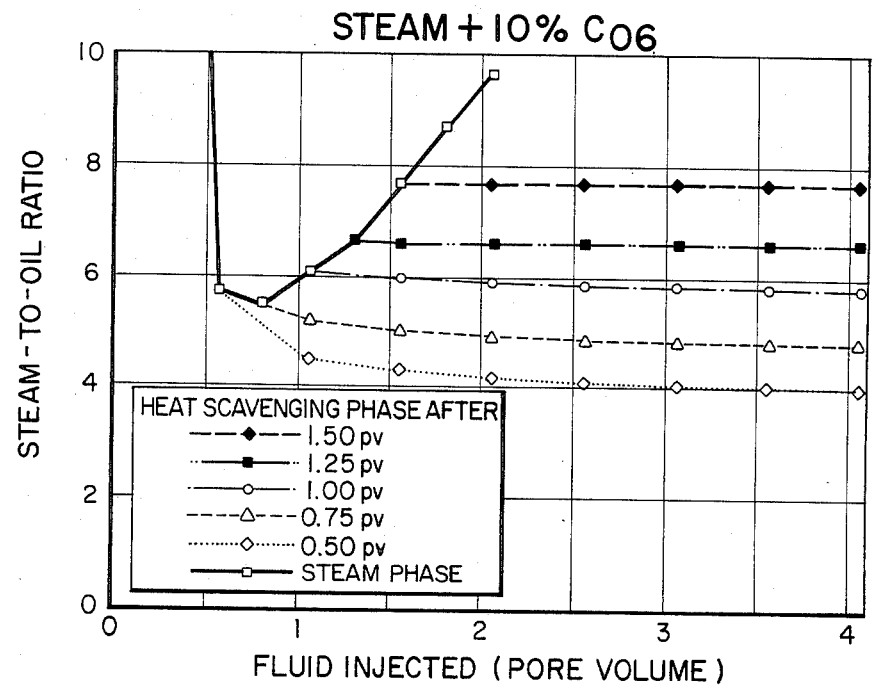
Figure 58:
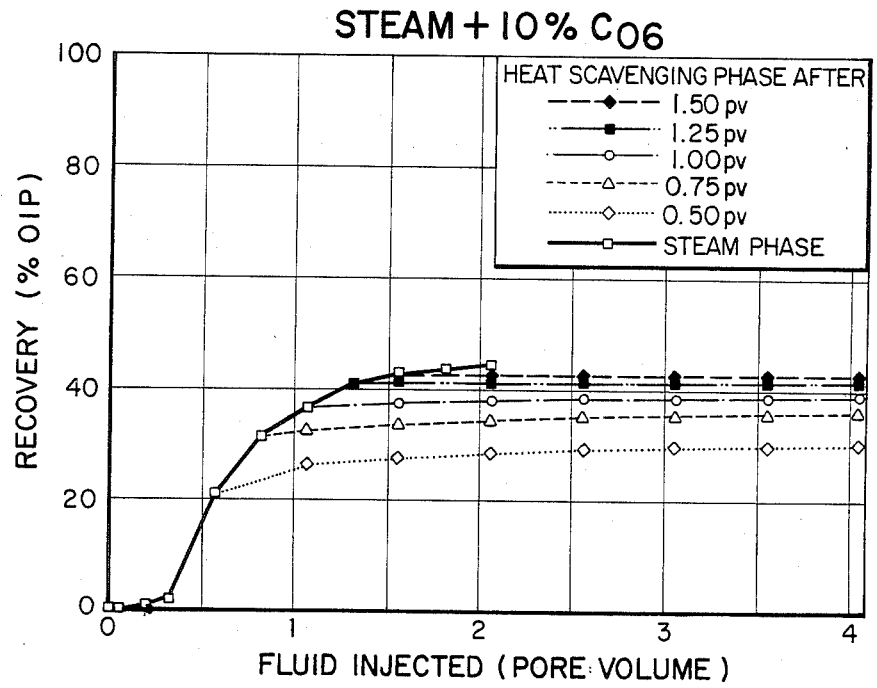
Figure 59:
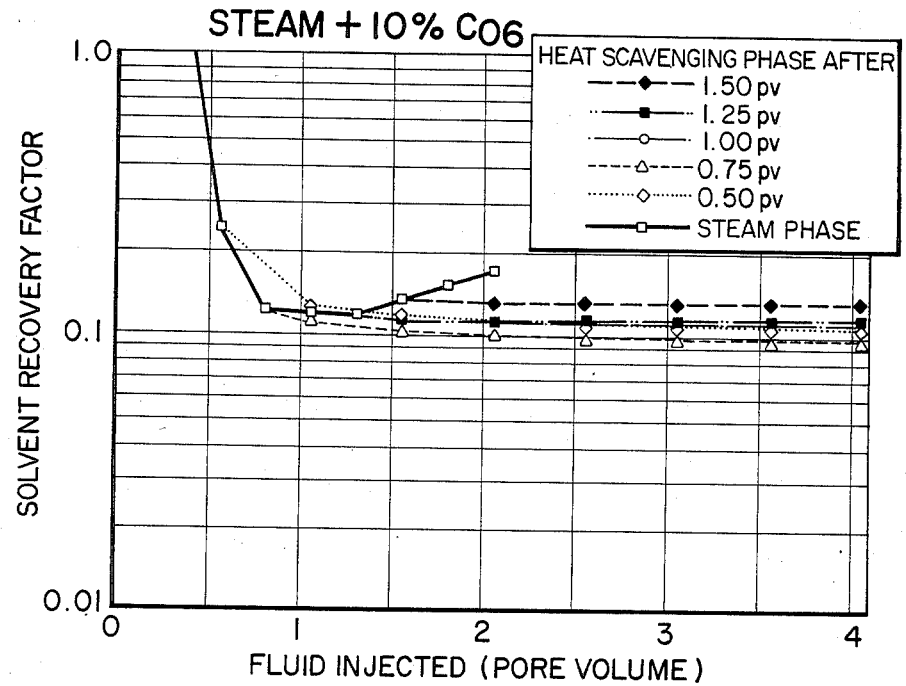

FIGS. 54, 55 and 56 summarize the data for Cases 11-14 so as to provide a graphic illustration of the effect of solvent concentration on the three measured parameters, namely SOR, percentage of heavy oil recovery, and solvent recovery factor, respectively. It is noted that for clarity, the information in FIGS. 54-56 does not include the effect of heat-scavenging water.

Figure 30:
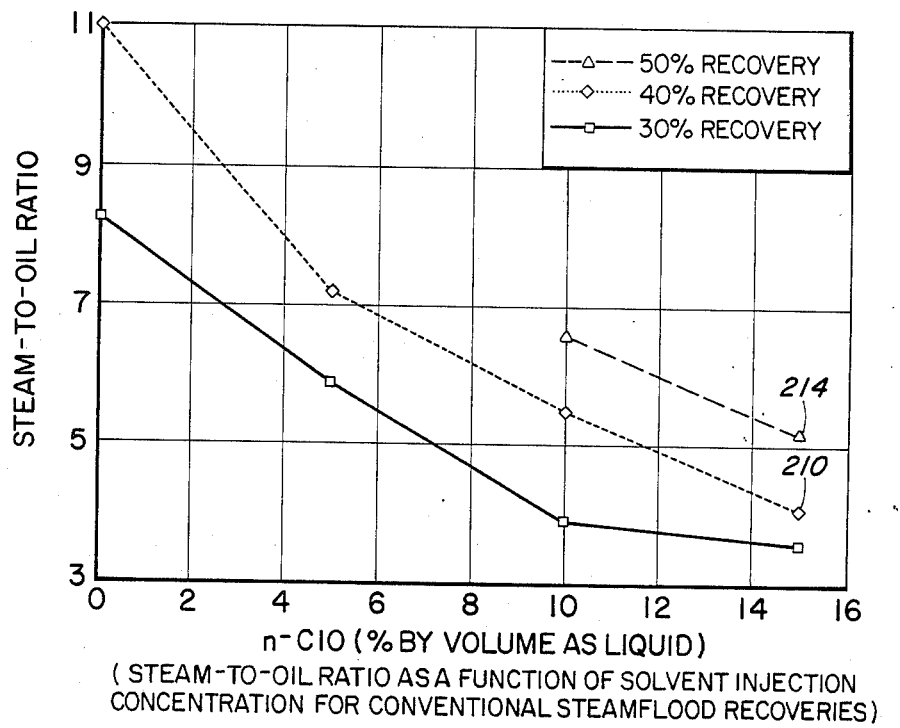
FIG. 30 graphically illustrates in a manner similar to FIG. 29 the numerically modeled result of adding solvent to a conventional prior art matrix drive type of steamflood process.

Additionally, FIG. 30 provides in graphical fashion a summary of the SOR as a function of solvent concentration at various levels of overall recovery of oil in place. FIG. 30 is in a format similar to FIG. 29 which applied to the solvent enhanced fracture assisted steamflood process of the present invention.

FIGS. 29 and 30 have been displayed side by side in the drawings for easy comparison. Those figures are further compared and discussed below in the section of this specification explaining the differences in the results obtained with the solvent enhanced fracture-assisted steamflood process of the present invention as compared to a conventional matrix drive type steamflood process of the prior art.

Similarly, FIG. 32 summarizes the data from Cases 11-14 to display the solvent recovery factor, which is identified in FIG. 32 by the heading "Solvent Retained-/Oil Prod. bbl/bbl".

FIG. 32 is in a format similar to FIG. 31 which applied to the solvent enhanced fracture-assisted steamflood process, again for ease of comparison of the two processes.

The data summarized in FIGS. 30 and 32 for the conventional matrix drive type steamflood process includes the effect of a heat-scavenging hot water drive following the steam injection phase, just as does the data in FIGS. 29 and 31 for the solvent enhanced fracture-assisted steamflood process. As previously noted, a conventional matrix drive type steamflood process normally does not utilize a follow-up heat-scavenging phase, but such a phase was added to the simulations presented in this specification in order to make the data as directly comparable as possible.

FIG. 54 shows that increasing concentrations of solvent steadily reduce the SOR for the conventional process with a minimum SOR of approximately 4.2 being achieved at 15% decane injection following approximately 0.82 pore volumes of steam and solvent injection as represented by data point 202.

FIG. 55 shows that for increasing solvent concentrations, the percentage of heavy oil in place recovered steadily increases. The maximum recovery represented by data point 204 is about 54% which corresponds to 15% decane injection and approximately 2.03 pore volumes of steam and solvent injection.

FIG. 56 shows that increasing solvent percentages result in higher percentages of solvent lost to the formation. The minimum solvent loss achieved in this testing is represented by data point 206 corresponding to 5% decane injection and approximately 1.82 pore volumes of steam and solvent injected. It is apparent that with higher solvent concentrations as shown by phantom line 208 representing 15% decane, and for practical volumes of fluid injected, the solvent loss becomes very high and lies in the range of 20% to 25% of the total oil produced.

Cases 15 and 16: Effect Of Solvent Composition

The effect of solvent composition was investigated by injecting both a lighter solvent and a heavier solvent at a 10% concentration for comparison to Case 13 in which 10% decane was injected.

In Case 15, 10% by volume of hexane was injected with steam. The SOR, percentage of heavy oil recovery, and solvent recovery factor for Case 15 are displayed in FIGS. 57, 58 and 59 respectively.

Figure 60:
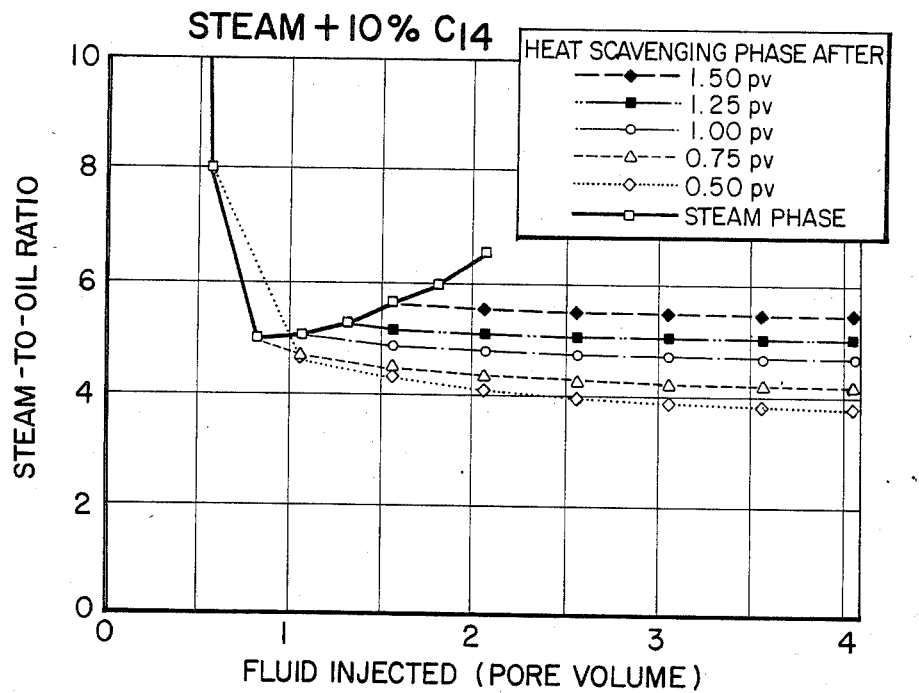
Figure 61:
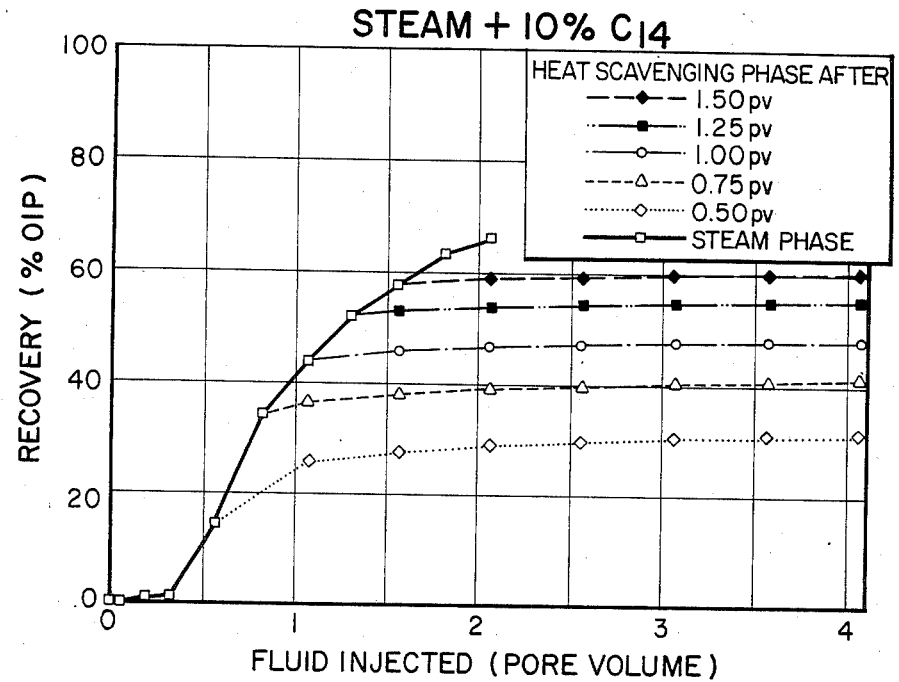
Figure 62:
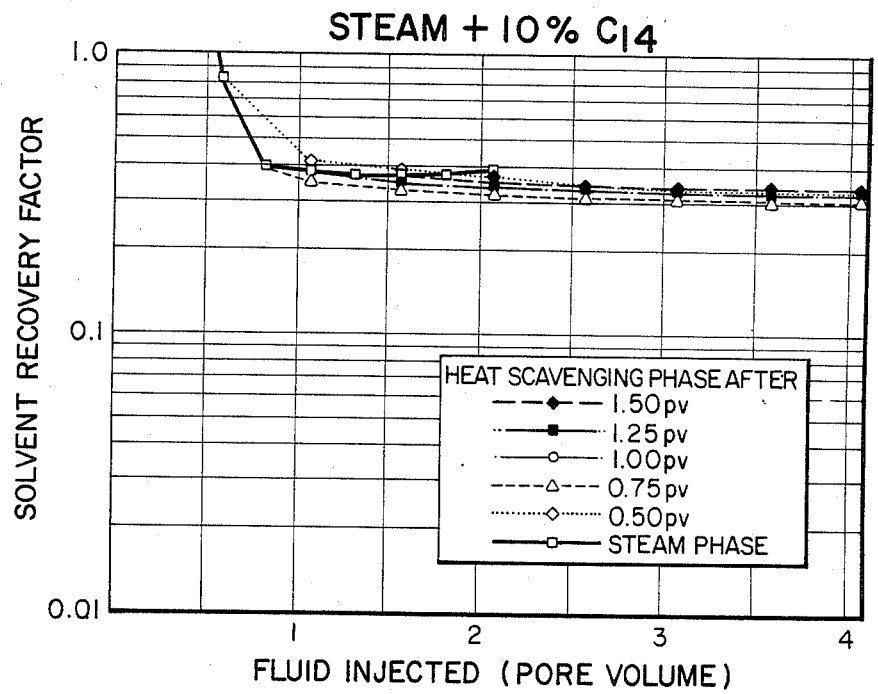

In Case 16, 10% by volume of tetradecane was injected with steam. The SOR, percentage of heavy oil recovery, and solvent recovery factor for Case 16 are shown in FIGS. 60, 61 and 62, respectively.

Figure 63:
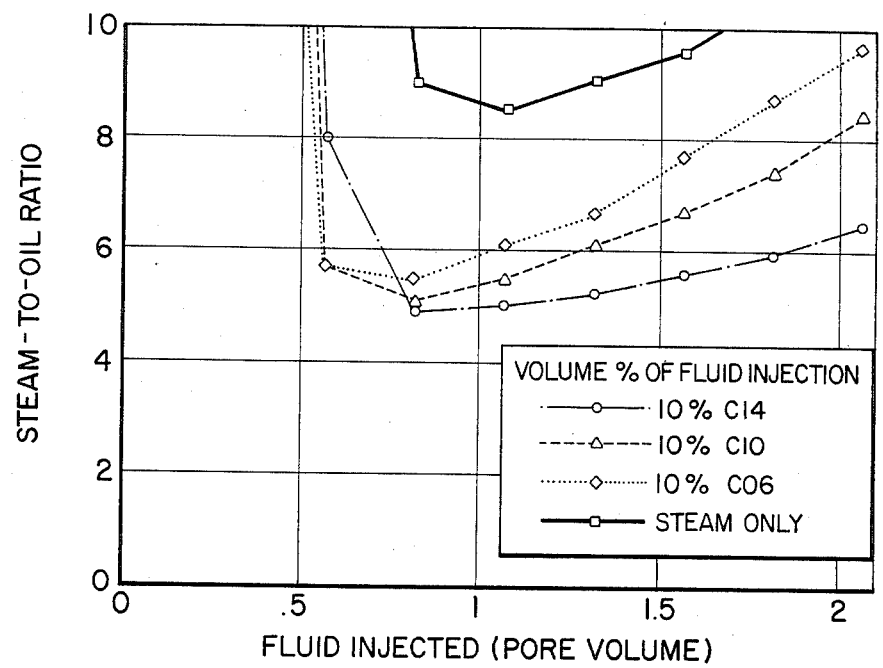
Figure 64:
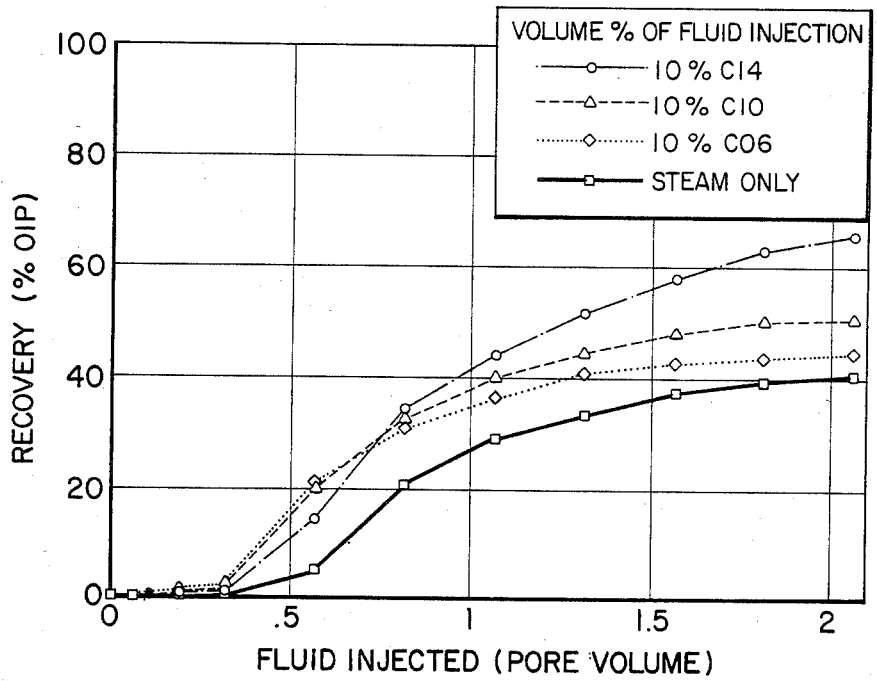
Figure 65:
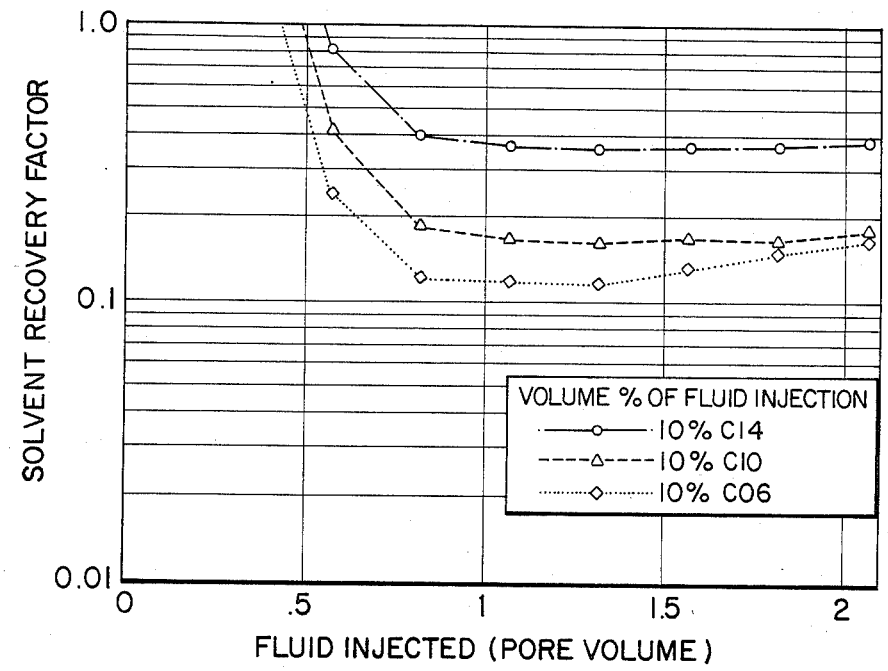

FIGS. 63, 64 and 65 provide a summary comparison of Cases 11, 13, 15 and 16 to graphically show the effect of solvent composition on the three factors being studied, namely SOR, percentage of oil recovered, and solvent recovery factor, respectively. Again, it is noted that for clarity the information shown in FIGS. 63–65 does not include the effect of heat-scavenging water.

FIG. 63 shows that the SOR for the conventional matrix drive type steamflood process utilizing solvent decreases, that is, it improves, with increasingly heavy solvents.

This is directly the opposite of the result seen for the solvent enhanced fracture-assisted steamflood process of the present invention as illustrated by Case 6 which showed that lighter solvents provided the lowest SOR for the solvent enhanced fracture-assisted steamflood process. The reasons for this directly opposite result are explained below.

FIG. 64 shows that the percentage of heavy oil recovery again improves, that is it increases, for increasingly heavy solvents.

Again, this is directly contrary to the results shown for the solvent enhanced fracture-assisted steamflood process. Case 6 discussed above shows that a lesser absolute volume percentage of decane (6.7 volume percent) provided essentially the same percentage of heavy oil recovery as 10 volume percent of decane had provided in Case 4, thus showing that the overall percentage of heavy oil recovery in the solvent enhanced fracture-assisted steamflood process would be increased by going to lighter solvents.

FIG. 65 shows that the percentage of solvent lost to the formation increases as heavier solvents are utilized. This is in accordance with what was shown in Case 6 for the solvent enhanced fracture-assisted steamflood process. But, when it is remembered that for the conventional matrix drive type steamflood process utilizing solvent, one must go to heavier solvents to optimize the total oil recovery it becomes apparent that an optimized conventional matrix drive type steamflood process utilizing solvent can generally expect to have greater percentages of solvent lost to the formation than would an optimized solvent enhanced fracture-assisted steamflood process.

Theoretical Explanation Of The Improvements Provided By The Present Invention As Compared To A Conventional Matrix Drive Type Steamflood Process It is believed that the surprising differences both in kind and degree which are seen to result from the addition of solvent to a fracture-assisted steamflood process, as compared to the much less significant effects when solvent is added to a conventional matrix drive type steamflood process can be, at least in part, explained due to the different manner in which the vaporized solvent is transported into the formation by the two processes, and the manner in which the heavy oil and condensed liquid solvent are produced from the formation by the two processes.

The process of the present invention has previously been explained in detail with reference to FIG. 4. The injected steam and vaporized solvent flow into the formation 18 primarily through transport radially outward through the generally horizontal parted fracture system 62 and then upward from the fracture system 62 to form the expanding steam chest 68 with the condensed liquid solvent bank 70 being pushed in advance of the steam chest 68. Thus, the present invention transports the vaporized solvent through the formation 18 in such a way that there is a very efficient contact with essentially all of the heavy oil deposits in the formation 18 and thus there is very effective use of the solvent. Furthermore, the liquid mixture of heavy oil and solvent produced in the vicinity of the solvent bank 70 can drain through the relatively empty pore spaces of the steam chest 68 to the heated permeable zone adjacent the fracture system 62 where it is then easily transported to the producing wells. This producing mechanism is effective even after the steam injection has stopped and the injection of heat-scavenging water has begun.

The typical prior art matrix drive type steamflood process, on the other hand, transports solvent into the formation 18 in a very different way, and produces heavy oil and condensed solvent in a very different way, as has been explained in detail with regard to FIGS. 40–42. The steam and vaporized solvent are injected into the formation 18 from the well 22 along the entire vertical interval of the formation 18 and tend to move upward within the formation 18 due to gravitational effects forming the steam chest 120 which tends to bulge radially outward from injection well 22 at its upper end. That steam chest forms a condensed liquid solvent bank 122 which is pushed in front of the advancing steam chest until such time as the upper portion of the steam chest 120 finally breaks through to the outer production wells as shown in FIG. 42. After that point, the vaporous steam and solvent mixture of the steam chest 120 tends to bypass the remaining portions of the formation 18 and flow directly through the upper portions of the formation 18. This provides relatively little contact of the injected solvent with the heavy oil deposits in the lower portion of the formation 18.

Once the upper portion of the steam chest 120 breaks through to the production wells, the pressure within the steam chest 120 drops and there is no significant force to push further oil towards the production wells.

Additionally, the injection of heat-scavenging water is not effective to significantly increase production, because once the steam chest 120 collapses, the viscosity of the heavy oil and liquid solvent mixture is sufficiently high that it cannot permeate the formation to reach the producing wells.

The mixture of heavy oil and liquid solvent cannot drain downward and then be produced through a heated permeable zone as is possible in the solvent enhanced fracture-assisted steamflood process of the present invention.

Taking in turn each of the individual differences in results between the process of the present invention and a conventional steamflood process, which differences have been observed above, it will be shown how those differences result from the different mechanisms by which vaporous solvent is transported into and by which heavy oil and liquid solvent are produced from the formations in the two processes.

Two of the most significant differences observed were the solvent loss to the formation and the absence in the conventional process of any significant effect of injecting heat-scavenging water after the steam injection phase. These two observations appear to be related.

It is apparent from comparing FIGS. 31 and 32 that for the injection of similar concentrations of the same solvent, in this instance decane, the solvent enhanced fracture-assisted steamflood process of the present invention has significantly lower percentages of solvent loss to the formation than does a conventional matrix drive type steamflood process utilizing solvent. This is particularly true at the higher solvent concentrations.

For example, for injection of 10% decane, the solvent enhanced fracture-assisted steamflood process of the present invention represented in FIG. 31 provides a solvent loss to the formation of approximately 10.4% of total oil production, whereas the conventional process represented in FIG. 32 provides a solvent loss to the formation of approximately 14% of total oil production. Similarly, for the injection of 15% decane, the process of the present invention as represented in FIG. 31 provides a solvent loss of approximately 11.8%, whereas the conventional process represented in FIG. 32 provides a solvent loss of approximately 18%.

It is believed that there are two reasons for these very significantly higher solvent losses to the formation in a conventional process. First, the mechanism for production of heavy oil and condensed solvent during the steam injection phase is less efficient than for the process of the present invention. Second, the conventional process cannot effectively utilize a heat-scavenging water follow-up phase whereas the process of the present invention can very effectively recover substantial additional amounts of both heavy oil and injected solvent by the injection of heat-scavenging water following the steam injection phase.

Production of heavy oil and condensed solvent is less efficient during the steam injection phase, because the conventional process does not provide any channel through which the liquid mixture of heavy oil and solvent can be produced; instead, the heavy oil deposits and condensed solvent must be pushed by the pressure of the expanding steam chest through the matrix of the formation to the producing wells. After the expanding steam chest breaks through to the producing wells near its upper extremities, there is of course a permeable flow path, but that flow path is positioned above the oil deposits thus preventing effective production of further heavy oil and condensed solvent after steam breakthrough occurs. For that same reason, a heat-scavenging water injection follow-up phase is not effective.

That is contrasted to the present invention wherein the mixture of heavy oil and condensed solvent can drain downward to the highly permeable zone adjacent the fracture system 62 both during the steam injection phase and during a heat-scavenging water follow-up injection phase.

These same mechanistic differences in the manner in which solvent is transported into, and the manner in which heavy oil and condensed solvent are produced from the formation in the two processes explains the directly opposite effects observed from varying solvent composition. It is recalled that for the solvent enhanced fracture-assisted steamflood process of the present invention, it was observed that the percentage of oil recovery increased with lighter solvents, whereas with a conventional steamflood process, the percentage of oil recovery increased with heavier solvents. The reason for this is believed to be that in the conventional matrix drive type steamflood process, the lighter solvents are more likely to gravitate upwards and bypass much of the heavy oil deposits in the lower portions of the formation, whereas heavier solvents will gravitate more downwardly and will be more effective in contacting the heavy oil deposits. It must be remembered, however, that in both processes the percentage of solvent lost to the formation increases with heavier solvent compositions, and thus to improve the percentage of oil recovery in a conventional matrix drive type steamflood process by going to the use of heavier solvents, a significant sacrifice is made in that much larger portions of the injected solvent are permanently lost to the formation.

Another significant difference observed between the process of the present invention and a conventional process utilizing solvent is that much lower overall steam-to-oil ratios are achievable with the solvent enhanced fracture assisted steamflood process than are achievable with a conventional process utilizing solvent. This is apparent by a comparison of FIG. 29 representing the process of the present invention with FIG. 30 which represents the conventional process.

Comparing the 40% recovery lines from FIGS. 29 and 30, it is seen that for the solvent enhanced fracture-assisted steamflood process of the present invention, a steam-to-oil ratio of approximately 3.4 is achieved with the injection of 15% decane as represented by data point 144. This is contrasted to the conventional process represented in FIG. 30 where data point 210 corresponding to the injection of 15% decane gives a steam-to-oil ratio of approximately 4.2.

The difference is much more dramatic as one goes to higher overall percentages of recovery of oil in place. When comparing the data for 50% recovery in both FIGS. 29 and 30, it is seen that the process of the present invention provides a steam-to-oil ratio of approximately 3.7 for the injection of 15% decane as represented by data point 212, whereas for the conventional process the injection of 15% decane provides an overall steam-to-oil ratio of approximately 5.2 as represented by data point 214.

Finally, the data show that under similar conditions, the solvent enhanced fracture-assisted steamflood process of the present invention provides substantially higher percentages of recovery of total oil in place in the formation. This can be seen by comparing FIGS. 16 and 49 which correspond to Cases 4 and 13, respectively. Both cases 4 and 13 utilize 10% decane. In Case 4, corresponding to the solvent enhanced fracture-assisted steamflood process of the present invention, the maximum recoveries of original oil in place exceed 70%, whereas in FIG. 49 for the conventional matrix drive type steamflood process utilizing solvent, the maximum recoveries of oil in place do not exceed about 50%.

Throughout these comparisons, every attempt has been made to provide truly comparative data for the two processes. Although it was necessary to model the conventional matrix drive type steamflood process in a different formation than was utilized for the solvent enhanced fracture-assisted steamflood process of the present invention, the difference in formations was a very conservative one because the formation in which the conventional process was modeled was a more permeable formation having relatively lighter hydrocarbon deposits. This would tend to minimize the improvements shown with the present invention, and thus this comparison of the two models is a very conservative one.

Thus it is seen that the methods of the present invention readily achieve the ends and advantages mentioned as well as those inherent therein. While certain preferred embodiments of the invention have been illustrated and described for the purposes of the present disclosure, numerous changes in the arrangement and execution of steps of the method can be made by those skilled in the art which changes are encompassed within the scope and spirit of the present invention as defined by the appended claims.

What is claimed is:

1. A process for establishing a zone of increased fluid mobility between an injection well and a production well penetrating a subsurface formation containing heavy oil deposits, comprising:
   (a) stimulating said production well by injecting a hot aqueous fluid at a temperature above 100° C. into the production well to impart heat to the formation surrounding the production well and to thereby create a preheated zone surrounding said production well;
   (b) fracturing from the injection well thus providing a generally horizontal fracture system extending into a vicinity of said preheated zone;
   (c) injecting a hot aqueous fluid at a temperature above 100° C. and a substantially vaporized volatile solvent into said injection well and into said fracture system, said hot aqueous fluid being injected at a very high rate and a pressure sufficient to part the fracture system for a substantial portion of a distance from said injection well to said production well while producing fluids from the production well, such as to form a heated permeable zone between the wells containing a mobilizable mixture of heavy oil and liquid solvent; and
   (d) producing said mixture of heavy oil and liquid solvent from said production well, whereby a steam-to-oil ratio of said process is substantially lower than would be a steam-to-oil ratio for a similar process not including the injection of solvent in step (c).

2. The process of claim 1, wherein:
a total water volume equivalent of the hot aqueous fluid injected in step (c) is less than 2.0 pore volumes of a portion of said formation swept by the fluid injected in step (c).

3. The process of claim 2, wherein:
said total water volume equivalent is in the range of about 1.0 to about 1.5 pore volumes.

4. The process of claim 1, wherein:
said step (c) is further characterized in that said hot aqueous fluid and said substantially vaporized volatile solvent are injected together as a mixture of hot aqueous fluid and solvent.

5. The process of claim 4, wherein:
said step (c) is further characterized in that said solvent is present in said mixture of hot aqueous fluid and solvent in a liquid solvent equivalent proportion in the range of about 1% to about 15% by volume.

6. The process of claim 1, wherein:
said step (c) is further characterized in that an amount of solvent injected into said injection well, on a liquid solvent equivalent basis, comprises a proportion of a total liquid equivalent amount of hot aqueous fluid and solvent injected into said injection well substantially in excess of about 5% by volume.

7. The process of claim 6, wherein:
said solvent is at least as volatile as decane; and
for the injection during step (c) of a total volume of hot aqueous fluid and solvent sufficient to provide a recovery of approximately 40% of total oil in place in said formation, said process provides substantially greater than a 30% reduction in steam-to-oil ratio due to the addition of solvent in step (c).

8. The process of claim 1 wherein:
said step (c) is further characterized in that an amount of solvent injected into said injection well, on a liquid solvent equivalent basis, comprises a proportion of a total liquid equivalent amount of hot aqueous fluid and solvent injected into said injection well substantially in excess of about 10% by volume.

9. The process of claim 8, wherein:
said solvent is at least as volatile as decane; and
for the injection during step (c) of a total volume of hot aqueous fluid and solvent sufficient to provide a recovery of approximately 40% of total oil in place in said formation, said process provides at least a 40% reduction in steam-to-oil ratio due to the addition of solvent in step (c).

10. The process of claim 1, wherein:
said step (c) is further characterized in that an amount of solvent injected into said injection well, on a liquid solvent equivalent basis, comprises a proportion of a total liquid equivalent amount of hot aqueous fluid and solvent injected into said injection well substantially in excess of about 15% by volume.

11. The process of claim 10, wherein:
said solvent is at least as volatile as decane; and
for the injection during step (c) of a total volume of hot aqueous fluid and solvent sufficient to provide a recovery of approximately 40% of total oil in place in said formation, said process provides at least a 50% reduction in steam-to-oil ratio due to the addition of solvent in step (c).

12. The process of claim 1, wherein:
an amount of solvent injected into said injection well on a liquid solvent equivalent basis, comprises a proportion of a total liquid equivalent amount of hot aqueous fluid and solvent injected into said injection well of at least about 10% by volume;
said solvent is at least as volatile as decane; and
for the injection during step (c) of a total volume of hot aqueous fluid and solvent sufficient to provide a recovery of approximately 50% of total oil in place in said formation, said process provides at least a 50% reduction in steam-to-oil ratio due to the addition of solvent in step (c).

13. The process of claim 1, wherein:
an amount of solvent injected into said injection well on a liquid solvent equivalent basis, comprises a proportion of a total liquid equivalent amount of hot aqueous fluid and solvent injected into said injection well of at least about 15% by volume;
said solvent is at least as volatile as decane; and
for the injection during step (c) of a total volume of hot aqueous fluid and solvent sufficient to provide a recovery of approximately 50% of total oil in place in said formation, said process provides at least approximately a 60% reduction in steam-to-oil ratio due to the addition of solvent in step (c).

14. The process of each of claims 7, 9, and 11 through 13, inclusive, wherein:
said formation has a permeability of at least 100 millidarcies; and
said heavy oil deposits have an API gravity of no greater than about 10°.

15. The process of claim 1, wherein:
said step (c) is further characterized in that an amount of solvent injected into said injection well, on a liquid solvent equivalent basis, is in a range of about 1% to about 15% by volume of a total liquid equivalent amount of hot aqueous fluid and solvent injected into said injection well.

16. The process of claim 1, further comprising the step of:
(e) after step (d), separating said liquid solvent from said mixture of heavy oil and liquid solvent.

17. The process of claim 1, wherein:
said step (c) is further characterized in that said substantially vaporized solvent is injected with said hot aqueous fluid as a mixture of hot aqueous fluid and solvent substantially continuously throughout an entire time period of injection of said hot aqueous fluid.

18. The process of claim 1, wherein:
said step (c) is further characterized in that said substantially vaporized solvent is injected with said hot aqueous fluid for only a first portion of a time period of injection of said hot aqueous fluid, and subsequently hot aqueous fluid at a temperature above 100° C. is injected without solvent for a second portion of said time period.

19. The process of claim 18, wherein:
as a result of step (c), a loss of injected solvent to the formation is reduced as compared to a similar process wherein the same cumulative volume of solvent is injected continuously over the entire time period of injection of said hot aqueous fluid at a temperature above 100° C.

20. The process of claim 1, wherein:
said solvent includes primarily light hydrocarbons.

21. The process of claim 20, wherein:
said solvent is at least as volatile as decane; and
for an amount of solvent injected into said injection well in step (c), on a liquid solvent equivalent basis, of up to 10% of a total liquid equivalent amount of hot aqueous fluid and solvent injected into said injection well, an amount of solvent retained in said formation is no greater than about 0.11 bbl. per bbl. of heavy oil produced in step (d).

22. The process of claim 20, wherein:
said solvent is at least as volatile as decane; and
for an amount of solvent injected into said injection well in step (c), on a liquid solvent equivalent basis, of up to 15% of a total liquid equivalent amount of hot aqueous fluid and solvent injected into said injection well, an amount of solvent retained in said formation is no greater than about 0.12 bbl. per bbl. of heavy oil produced in step (d).

23. The process of claim 20, wherein:
said solvent is a mixture of hydrocarbon solvents in the $C_6$ to $C_{14}$ molecular weight range.

24. The process of claim 1, wherein:
said solvent has a vapor pressure similar to that of water.

25. The process of claim 1, wherein:
said solvent is compatible with said heavy oil deposits in that mixing of said solvent with said heavy oil deposits does not result in a significant damaging precipitation of solids from said heavy oil deposits.

26. The process of claim 1, wherein:
said solvent includes primarily light hydrocarbons;
said solvent has a vapor pressure similar to that of water;
said solvent is compatible with said heavy oil deposits in that mixing of said solvent with said heavy oil deposits does not result in a significant damaging precipitation of solids from said heavy oil deposits; and
from about 1% to about 15% by volume of a total amount of hot aqueous fluid and solvent injected into said injection well is solvent, on a liquid equivalent basis.

27. The process of claim 1, further comprising the step of:
prior to step (c), perforating said injection well over a substantial portion of an entire interval of said formation, whereby when hot aqueous fluid and solvent are subsequently injected during step (c), they are injected over said substantial portion of said entire interval of said formation.

28. The process of claim 27, wherein:
as a result of said perforating and of injecting said hot aqueous fluid and solvent over said substantial portion of the entire interval of said formation, the production of heavy oil in step (d) is increased as compared to a similar process wherein said hot aqueous fluid and solvent are injected only through said parted fracture system.

29. The process of claim 1, wherein:

said step (c) is further characterized in that said hot aqueous fluid and solvent are injected from said injection well into said formation substantially solely through said parted fracture system during a substantial initial portion of a time period during which said hot aqueous fluid is injected at a rate and pressure sufficient to maintain the fracture system parted.

30. The process of claim 1, wherein:
said step (c) is further characterized in that said aqueous fluid is steam and step (c) includes steps of:
transporting said vaporized solvent with said steam outward along and up from said parted generally horizontal fracture system thus forming a steam chest advancing through said formation;
contacting said vaporized solvent with relatively cold heavy oil in said formation along a front of said steam chest;
upon contact of said vaporized solvent with said relatively cold heavy oil, condensing said vaporized solvent into a liquid solvent bank in front of said advancing steam chest;
forming said mixture of heavy oil and liquid solvent which mixture has a viscosity less than an initial viscosity of said heavy oil; and
draining said mixture of heavy oil and liquid solvent toward said parted fracture system.

31. The process of claim 30, wherein:
the use of solvent in said step (c) results in reduction in viscosity of said heavy oil at locations in advance of a portion of said formation which has been significantly heated by said advancing steam chest.

32. The process of claim 30, further comprising the step of:
subsequent to step (c), injecting liquid water into said injection well and into said formation thereby collapsing said steam chest and generally lowering temperatures within said formation;
sometime prior to said step of injecting liquid water, perforating said injection well over a substantial portion of an entire interval of said formation;
maintaining heavy oil, in said mixture of heavy oil and liquid solvent remaining in place in said formation, at a substantially lower viscosity than said heavy oil initially had prior to step (c); and
driving said remaining mixture of heavy oil and liquid solvent to said production well with said injected liquid water.

33. The process of claim 32, wherein:
said injection well is perforated over said substantial portion of said entire interval of said formation prior to step (c).

34. The process of claim 30, wherein:
step (b) is further characterized in that said generally horizontal fracture system is located substantially closer to a bottom than to a top of said subsurface formation.

35. The process of claim 1, further comprising the step of:
subsequent to step (c), injecting liquid water into said injection well and into said formation;
sometime prior to said step of injecting liquid water, perforating said injection well over a substantial portion of an entire interval of said formation;
maintaining heavy oil, in said mixture of heavy oil and liquid solvent remaining in place in said formation, at a substantially lower viscosity than said heavy oil initially had prior to step (c); and
driving said remaining mixture of heavy oil and liquid solvent to said production well with said injected liquid water.

36. The process of claim 35, wherein:
said injection well is perforated over said substantial portion of said entire interval of said formation prior to step (c).

37. The process of claim 35, wherein:
as a result of said step of injecting liquid water into said injection well and into said formation, the steam-to-oil ratio of said process is substantially lower than would be a steam-to-oil ratio for a similar process not including said step of injecting liquid water.

38. The process of claim 35, wherein:
as a result of said step of injecting liquid water into said injection well and into said formation, a solvent recovery factor for said process is substantially lower than would be a solvent recovery factor for a similar process not including said step of injecting liquid water.

39. The process of claim 1, wherein:
said solvent and said hot aqueous fluid are premixed prior to being introduced into said injection well.

40. The process of claim 1, wherein:
step (c) is further characterized in that for substantially an entirety of a time period during which hot aqueous fluid at a temperature above 100° C. is injected, it is injected at a very high rate and a pressure sufficient to part the fracture system.

41. The process of claim 1, wherein:
step (c) is further characterized in that after said fracture system has been maintained in a parted state for a substantial time and said heated permeable zone containing said mobilizable mixture of heavy oil and liquid solvent has been formed, said hot aqueous fluid at a temperature above 100° C. is injected at a lower rate and pressure less than that required to part the fracture system and said mobilizable mixture of heavy oil and liquid solvent is moved toward said producing well by a matrix drive means; and
said process further includes a step of, at some time prior to injecting said hot aqueous fluid at said lower rate and pressure to provide said matrix drive means, perforating said injection well over a substantial portion of an entire interval of said formation.

42. The process of claim 1, wherein:
step (a) is further characterized in that it includes a step of fracturing said production well to create a fracture therefrom, and said hot aqueous fluid is injected into said fracture.

43. The process of claim 42, wherein:
step (a) is further characterized in that it includes a step of perforating said production well over a substantial portion of an entire interval of said formation, subsequent to said step of fracturing said production well, and said hot aqueous fluid is injected through perforations into said formation over said substantial portion of said entire interval thereof.

44. The process of claim 42, wherein:
step (a) is further characterized in that said hot aqueous fluid at a temperature above 100° C. is mixed with a substantially vaporized volatile solvent and a mixture of said hot aqueous fluid and solvent is injected into said production well.

45. The process of claim 42, further comprising:
during step (a), producing fluid from said injection well.

46. The process of claim 1, wherein:
said step (c) is further characterized in that a parted portion of said generally horizontal fracture system terminates short of said production well.

47. The process of claim 46, wherein:
said substantial portion of said distance from said injection well toward said production well corresponding to said parted portion of said generally horizontal fracture system is in a range from about 30% to about 90% of said distance from said injection well to said production well.

48. The process of claim 47, wherein:
said substantial portion of said distance from said injection well toward said production well corresponding to said parted portion of said generally horizontal fracture system is in a range from about 67% to about 75% of said distance from said injection well to said production well.

49. The process of claim 1, wherein:
said heavy oil deposits have an API gravity of no greater than about 21°.

50. The process of claim 1, wherein:
said heavy oil deposits have an API gravity of no greater than about 10°.

51. The process of claim 1, wherein:
said step (c) is further characterized in that said hot aqueous fluid and said solvent are injected into said injection well separately at different times.

52. A process for recovering heavy oil deposits from a subsurface formation penetrated by an injection well and a production well, comprising:
(a) fracturing the formation from said injection well toward said production well to create a generally horizontally extending fracture system;
(b) injecting steam and a substantially vaporized solvent into said injection well and into said fracture system, said steam being injected at a rate and pressure sufficient to part the fracture system while producing fluids from the production well;
(c) transporting said vaporized solvent with said steam outward along and up from said parted generally horizontal fracture system thus forming a steam chest advancing through said formation;
(d) contacting said vaporized solvent with relatively cold heavy oil in said formation along a front of said steam chest;
(e) upon contact of said vaporized solvent with said relatively cold heavy oil, condensing said vaporized solvent into a liquid solvent bank in front of said advancing steam chest;
(f) forming a mixture of heavy oil and liquid solvent which mixture has a viscosity less than an initial viscosity of said heavy oil;
(g) draining said mixture of heavy oil and liquid solvent toward said parted fracture system; and
(h) producing said mixture of heavy oil and liquid solvent from said production well.

53. The process of claim 52, wherein:
the use of solvent in said step (b) results in reduction in viscosity of said heavy oil at locations in advance of a portion of said formation which has been significantly heated by said advancing steam chest.

54. The process of claim 52, further comprising the step of:
subsequent to step (b), injecting liquid water into said injection well and into said formation thereby collapsing said steam chest and generally lowering temperatures within said formation;
sometime prior to said step of injecting liquid water, perforating said injection well over a substantial portion of an entire interval of said formation;
maintaining heavy oil, in said mixture of heavy oil and liquid solvent remaining in place in said formation, at a substantially lower viscosity than said heavy oil initially had prior to step (b); and
driving said remaining mixture of heavy oil and liquid solvent to said production well with said injected liquid water.

55. The process of claim 54, wherein:
said perforating step is further characterized in that said injection well is perforated over said substantial portion of said entire interval of said formation prior to step (b).

56. The process of claim 54, wherein:
as a result of said step of injecting liquid water into said injection well and into said formation, a steam-to-oil ratio of said process is substantially lower than would be a steam-to-oil ratio for a similar process not including said step of injecting liquid water.

57. The process of claim 54, wherein:
as a result of said step of injecting liquid water into said injection well and into said formation, a solvent recovery factor for said process is substantially lower than would be a solvent recovery factor for a similar process not including said step of injecting liquid water.

58. The process of claim 52, wherein:
said step (b) is further characterized in that an amount of solvent injected into said injection well on a liquid solvent equivalent basis is in a range of about 1% to about 15% by volume of a total liquid equivalent amount of hot aqueous fluid and solvent injected into said injection well.

59. The process of claim 52, further comprising the step of:
after step (h), separating said liquid solvent from said mixture of heavy oil and liquid solvent.

60. The process of claim 52, wherein:
said solvent includes primarily light hydrocarbons; and
said solvent is compatible with said heavy oil deposits in that mixing of said solvent with said heavy oil deposits does not result in a significant damaging precipitation of solids from said heavy oil deposits.

61. The process of claim 52, wherein:
step (a) is further characterized in that said generally horizontal fracture system is located substantially closer to a bottom than to a top of said subsurface formation.

62. The process of claim 52, wherein:
said step (b) is further characterized in that said hot aqueous fluid and said substantially vaporized volatile solvent are injected together as a mixture of hot aqueous fluid and solvent.

63. The process of claim 52, wherein:
said step (b) is further characterized in that a parted portion of said generally horizontal fracture system terminates short of said production well.

64. The process of claim 63, wherein:
said parted portion of said generally horizontal fracture system extends in a range from about 30% to about 90% of a distance from said injection well to said production well.

65. The process of claim 64, wherein:
said parted portion of said generally horizontal fracture system extends in a range from about 67% to about 75% of said distance from said injection well to said production well.

66. The process of claim 52, wherein:
said step (b) is further characterized in that said steam and said solvent are injected into said injection well separately at different times.

67. A process for recovering petroleum deposits from a subsurface formation penetrated by an injection well and a production well, comprising:
 (a) fracturing the formation from said injection well toward said projection well to create a generally horizontally extending fracture system;
 (b) perforating said injection well over a substantial portion of an entire interval of said formation, thereby creating a plurality of perforations communicating said well with said formation;
 (c) after steps (a) and (b), injecting steam and a substantially vaporized solvent into said injection well and into said formation through said perforations and said fracture system, said steam being injected at a rate and pressure sufficient to part the fracture system for a substantial portion of a distance from said injection well to said production well; and
 (d) producing a mixture of said petroleum deposits and liquid solvent from said production well.

68. The process of claim 67, wherein:
as a result of step (b), the production of petroleum deposits in step (d) is increased as compared to a similar process wherein steam and solvent are injected only through said parted fracture system.

69. The process of claim 67, wherein:
said step (b) is further characterized in that an amount of solvent injected into said injection well, on a liquid solvent equivalent basis, is in a range of about 1% to about 15% by volume of a total liquid equivalent amount of steam and solvent injected into said injection well.

70. The process of claim 67, further comprising the steps of:
after step (d), separating said liquid solvent from said mixture of heavy oil and liquid solvent.

71. The process of claim 67, wherein:
said step (c) is further characterized in that said steam and said substantially vaporized volatile solvent are injected together as a mixture of steam and solvent.

72. The process of claim 67, wherein:
said step (c) is further characterized in that said steam and said solvent are injected into said injection well separately at different times.

73. The process of claim 67, wherein:
said step (c) is further characterized in that a parted portion of said generally horizontal fracture system terminates short of said production well.

74. The process of claim 73, wherein:
said parted portion of said generally horizontal fracture system extends in a range from about 30% to about 90% of a distance from said injection well to said production well.

75. The process of claim 74, wherein:
said parted portion of said generally horizontal fracture system extends in a range from about 67% to about 75% of said distance from said injection well to said production well.

76. A process for establishing a zone of increased fluid mobility between an injection well and a production well penetrating a subsurface formation containing oil deposits, comprising:
 (a) stimulating said production well by injecting a hot aqueous fluid at a temperature above 100° C. into the production well to impart heat to the formation surrounding the production well and to thereby create a preheated zone surrounding said production well;
 (b) fracturing from the injection well thus providing a generally horizontal fracture system extending into a vicinity of said preheated zone;
 (c) perforating said injection well thereby forming perforations over a substantial portion of an entire interval of said formation;
 (d) injecting a hot aqueous fluid at a temperature above 100° C. into said injection well and into said formation through said fracture system and through said perforations over said substantial portion of said entire interval of said formation, said hot aqueous fluid being injected at a very high rate and a pressure sufficient to part the fracture system for a substantial portion of a distance from said injection well to said production well while producing fluids from the production well, such as to form a heated permeable zone between the wells containing a mobilizable oil; and
 (e) producing said mobilizable oil from said production well, whereby as a result of said perforating and of injecting said hot aqueous fluid over said substantial portion of the entire interval of said formation, the production of oil in step (d) is increased as compared to a similar process wherein said hot aqueous fluid is injected only through said parted fracture system.

77. The process of claim 76, wherein:
step (d) is further characterized in that for substantially an entirety of a time period during which hot aqueous fluid at a temperature above 100° C. is injected, it is injected at a very high rate and a pressure sufficient to part the fracture system.

78. The process of claim 76, wherein:
step (a) is further characterized in that it includes a step of fracturing said production well to create a fracture therefrom, and said hot aqueous fluid is injected into said fracture.

79. The process of claim 78, wherein:
step (a) is further characterized in that it includes a step of perforating said production well over a substantial portion of an entire interval of said formation, subsequent to said step of fracturing said production well, and said hot aqueous fluid is injected through perforations into said formation over said substantial portion of said entire interval thereof.

80. The process of claim 78, further comprising:
during step (a), producing fluid from said injection well.

81. The process of claim 76, wherein:
said step (d) is further characterized in that a parted portion of said generally horizontal fracture system terminates short of said production well.

82. The process of claim 81, wherein:
said substantial portion of said distance from said injection well toward said production well corresponding to said parted portion of said generally horizontal fracture system is in a range from about 30% to about 90% of said distance from said injection well to said production well.

83. The process of claim 82, wherein:
said substantial portion of said distance from said injection well toward said production well corresponding to said parted portion of said generally horizontal fracture system is in a range from about 67% to about 75% of said distance from said injection well to said production well.

84. The process of claim 76, wherein: step (b) is further characterized in that said generally horizontal fracture system is located substantially closer to a bottom than to a top of said subsurface formation.

85. The process of claim 76, further comprising the step of:
subsequent to step (d), injecting liquid water into said injection well and into said formation through said perforations; and
driving additional oil to said production well with said injected liquid water.

* * * * *